United States Patent
Maeda et al.

(10) Patent No.: US 8,746,423 B2
(45) Date of Patent: Jun. 10, 2014

(54) SHOCK ABSORBER

(75) Inventors: Atsushi Maeda, Fujisawa (JP); Masaru Kouyama, Ayase (JP); Mikio Yamashita, Yokohama (JP); Fumiyuki Yamaoka, Sagamihara (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 280 days.

(21) Appl. No.: 13/036,555

(22) Filed: Feb. 28, 2011

(65) Prior Publication Data

US 2011/0214953 A1 Sep. 8, 2011

(30) Foreign Application Priority Data

Mar. 2, 2010 (JP) .............................. P2010-045727
Nov. 30, 2010 (JP) .............................. P2010-267390
Dec. 28, 2010 (JP) .............................. P2010-291644

(51) Int. Cl.
*F16F 9/34* (2006.01)

(52) U.S. Cl.
USPC ............ 188/322.15; 188/322.13; 188/322.16; 188/313; 277/587

(58) Field of Classification Search
USPC .................. 188/266, 322.13, 322.15, 322.16, 188/322.18, 322.22, 313, 316, 317, 319.1, 188/288; 277/436–439, 586, 587
See application file for complete search history.

(56) References Cited

U.S. PATENT DOCUMENTS

| | | | | | |
|---|---|---|---|---|---|
| 3,260,275 | A | * | 7/1966 | Armstrong et al. | 137/219 |
| 4,544,049 | A | * | 10/1985 | Shellhause | 188/364 |
| 4,765,446 | A | * | 8/1988 | Murata et al. | 188/282.4 |
| 4,768,627 | A | * | 9/1988 | Taylor | 188/280 |
| 5,261,677 | A | * | 11/1993 | Gotoh et al. | 277/438 |
| 6,220,409 | B1 | * | 4/2001 | Deferme | 188/322.15 |
| 6,918,473 | B2 | * | 7/2005 | Deferme | 188/322.15 |
| 7,100,750 | B2 | * | 9/2006 | Drees | 188/322.15 |
| 8,522,935 | B2 | * | 9/2013 | Cadeddu | 188/345 |
| 2011/0214955 | A1 | * | 9/2011 | Maeda et al. | 188/280 |
| 2012/0160624 | A1 | * | 6/2012 | Katayama et al. | 188/314 |

FOREIGN PATENT DOCUMENTS

| | | | | |
|---|---|---|---|---|
| IT | WO2009077190 | * | 6/2009 | |
| JP | 57001865 A | * | 1/1982 | 277/511 |
| JP | H07-019642 | | 1/1995 | |
| JP | H07-077233 | | 3/1995 | |

* cited by examiner

*Primary Examiner* — Thomas J Williams
*Assistant Examiner* — Mariano Sy
(74) *Attorney, Agent, or Firm* — Nixon & Vanderhye P.C.

(57) ABSTRACT

A shock absorber has an inclined surface that is inclined to a moving direction of the free piston in at least one of a free piston contact surface of a free surface with which an elastic body is in contact and a housing contact surface of a housing with which the elastic body is in contact. A shortest distance between the free piston contact surface and the housing contact surface is changed by movement of the free piston.

18 Claims, 16 Drawing Sheets

SHOCK ABSORBER

BACKGROUND OF THE INVENTION

1. Field of the Invention

The present invention relates to a shock absorber.

This application claims priority to and the benefits of Japanese Patent Application Nos. 2010-045727 filed on Mar. 2, 2010, 2010-267390 filed on Nov. 30, 2010, and 2010-291644 filed on Dec. 28, 2010, the disclosures of which are incorporated herein by reference.

2. Description of Related Art

In some shock absorbers, a damping force characteristic varies in response to a vibrating state (e.g. see Japanese Unexamined Utility Model Application, First Publication No. H07-019642).

In general, when changing a damping force characteristic in response to a vibrating state, shock absorbers are required to set characteristics, for instance, to change the damping force characteristic more smoothly.

SUMMARY OF THE INVENTION

The present invention is directed to provide a shock absorber capable of setting characteristics, for instance, more smoothly changing a damping force characteristic in response to a vibrating state.

According to a first aspect of the present invention, there is provided a shock absorber, in which at least one of the free piston contact surface of a free piston with which an elastic body is in contact and the housing contact surface of a housing with which the elastic body is in contact includes an inclined surface that is inclined to a moving direction of the free piston. A shortest distance between a portion of the free piston contact surface that is in contact with the elastic body and a portion of the housing contact surface that is in contact with the elastic body is changed by movement of the free piston.

According to a second aspect of the present invention, there is provided a shock absorber, which includes a moving direction deformation region where the elastic body undergoes elastic deformation in a moving direction of the free piston on a downstream side end within a moving region of the free piston. Further, the shock absorber includes a moving region where the elastic body moves in the moving direction of the free piston in the state where the elastic body is in contact with both the housing and the free piston at a position separated from the downstream side end.

According to a third aspect of the present invention, there is provided a shock absorber, which includes first and second passages to which the working fluid flows out from one of the chambers of the interior of the cylinder by movement of the piston, a damping valve that is installed in the first passage and regulates a flow of the working fluid, which is generated by sliding of the piston, to generate a damping force, and a free piston installed in the second passage and partitions the second passage into an upstream side and a downstream side. A passage area varying mechanism that makes a passage area of the second passage adjustable is installed in the second passage.

According to the aspects of the present invention, the shock absorber can smoothly change the damping force.

DETAILED DESCRIPTION OF THE INVENTION

Figure 1:
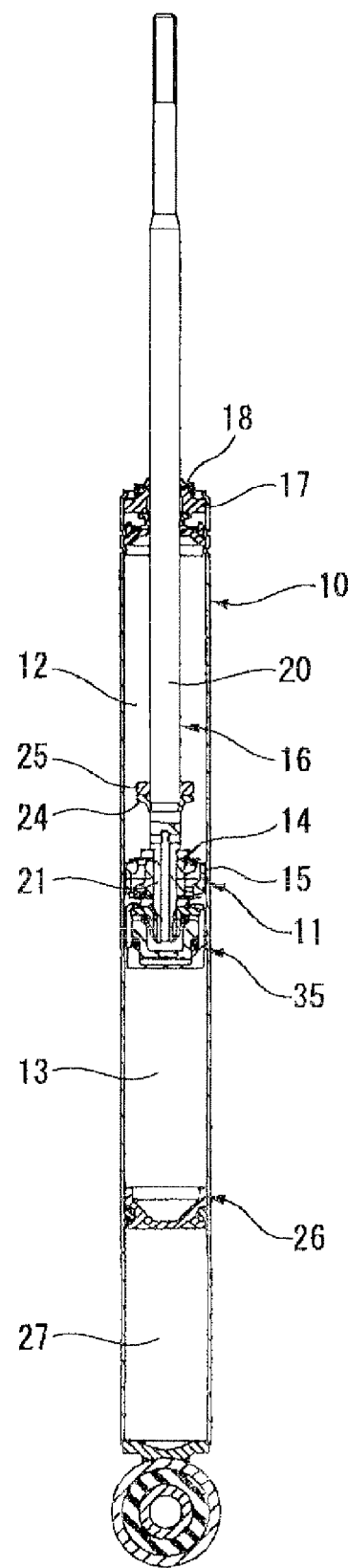
FIG. 1 is a cross-sectional view showing a shock absorber according to a first embodiment of the present invention.

Embodiments described below are not limited to the content described in the section entitled "Summary of the Invention," and solve various problems to produce effects. Main problems to be solved by the following embodiments are enumerated below including the content described in the section entitled "Summary of the Invention."

[Improvement of characteristics] When changing a damping force characteristic (a damping force relative to a piston speed) in response to a vibrating state, characteristic setting including more smoothly changing the damping force characteristic is required. This is based on the following reasons. When a characteristic of generating a low damping force and a characteristic of generating a high damping force are abruptly switched, a damping force actually generated is also switched abruptly. For this reason, a ride comfort of a vehicle is degraded. Especially, when the switching of the damping force occurs during steering of the vehicle, the movement of the vehicle becomes unstable, and there is a possibility of causing discomfort to a driver in steering. Thus, as disclosed in Japanese Unexamined Utility Model Application, First Publication No. H07-019642, the characteristic setting of more smoothly changing is reviewed, but additional characteristic improvement is desired.

[Restraint of increase in size] As disclosed in Japanese Unexamined Utility Model Application, First Publication No. H07-019642, a variety of cylinder apparatuses, in which improvement is attempted such that a damping force characteristic covering a wide range of vibration frequencies is obtained, have been developed in such a way that to install a free piston on the side of one end of the piston and moving up and down in a housing is provided, in addition to a piston that partitions the interior of a cylinder into two chambers and has a mechanism for generating a damping force. Thereby, a damping force characteristic covering a wide range of vibration frequencies is obtained in the cylinder apparatuses. An increase in axial length is cited as a problem that these cylinder apparatuses have in common, because a region where the free piston moves up and down is needed. When the cylinder apparatus is enlarged, a degree of mounting freedom for a vehicle body is reduced. For this reason, the increase of the axial length of the cylinder apparatus is a major problem.

[Reduction in number of components] As disclosed in Japanese Unexamined Utility Model Application, First Publication No. H07-019642, since components such as a housing or a free piston are provided in addition to a piston, the number of components increases. If the number of components increases, this has an influence on productivity, durability, reliability, and so on. As such, it is required to reduce number of components while obtaining a desired characteristic, i.e. a damping force characteristic covering a wide range of vibration frequencies. Hereinafter, each embodiment of the present invention will be described with reference to the drawings.

First Embodiment

A first embodiment of the present invention will be described with reference to FIGS. 1 through 4. To facilitate understanding of the following description, a lower side of the figure is defined as one side, and contrastively, an upper side of the figure is defined as the other side.

As shown in FIG. 1, a shock absorber of the first embodiment is a mono-tube type hydraulic shock absorber, and includes a bottomed cylindrical cylinder 10 in which oil is enclosed as a working fluid. A piston 11 is slidably fitted into the cylinder 10, and the cylinder 10 is partitioned into two chambers, i.e. an upper chamber 12 and a lower chamber 13, by the piston 11. The piston 11 is configured of a piston body 14, an annular sliding member 15 mounted on an outer circumferential surface of the piston body 14, and an insertion portion of a piston rod 16 connected to the piston body 14 wherein the insertion portion is inserted into the piston body 14.

The piston body 14 is formed by sintering, and is connected to one end of the piston rod 16. The other end of the piston rod 16 is inserted through a rod guide 17 and an oil seal 18 mounted on an opening side of the cylinder 10, and extends to the outside of the cylinder 10.

The piston rod 16 includes a main shaft part 20, and an attaching shaft part 21 having a smaller diameter than the main shaft part 20. The piston body 14 is attached at one end of the attaching shaft part 21. A part of the main shaft part 20 of the piston rod 16 between the piston body 14 and the rod guide 17 is provided with a rebound stopper 24 and a buffer 25 into which the piston rod 16 is inserted. A partition 26 for partitioning the lower chamber 13 on the side of the piston 11 is slidably installed in the cylinder 10 on a side closer to a bottom of the cylinder 10 than the piston 11. Oil is enclosed in the upper and lower chambers 12 and 13 of the cylinder 10, and a chamber 27 partitioned from the lower chamber 13 by the partition 26 is enclosed with high-pressure gas (of about 20 to 30 atm). For example, one side of the aforementioned shock absorber is supported by the body of a vehicle, and a wheel side is fixed to the other side of the shock absorber. In contrast, the other side of the shock absorber may be supported by the vehicle body, and the wheel side may be fixed to one side of the shock absorber. When the wheel is vibrated during traveling, positions of the cylinder 10 and the piston rod 16 are relatively changed by such vibration. This change is suppressed by fluid resistance of a flow passage formed in the first piston 11. As will be described below in detail, the fluid resistance of the flow passage formed in the first piston 11 is adapted to be varied by a speed or amplitude of the vibration, so that ride comfort is improved by suppressing the vibration. In addition to the vibration generated from the wheel, an inertial force or a centrifugal force generated from the vehicle body during the traveling of the vehicle is also applied between the cylinder 10 and the piston rod 16. For example, a traveling direction is changed by steering, and thus the centrifugal force is generated from the vehicle body. A force based on this centrifugal force is applied between the cylinder 10 and the piston rod 16. As will be described below, the shock absorber of the present embodiment provides good characteristics with respect to the vibration based on the force generated from the vehicle body during the traveling of the vehicle, and secures high stability in connection with the traveling of the vehicle.

Figure 2:
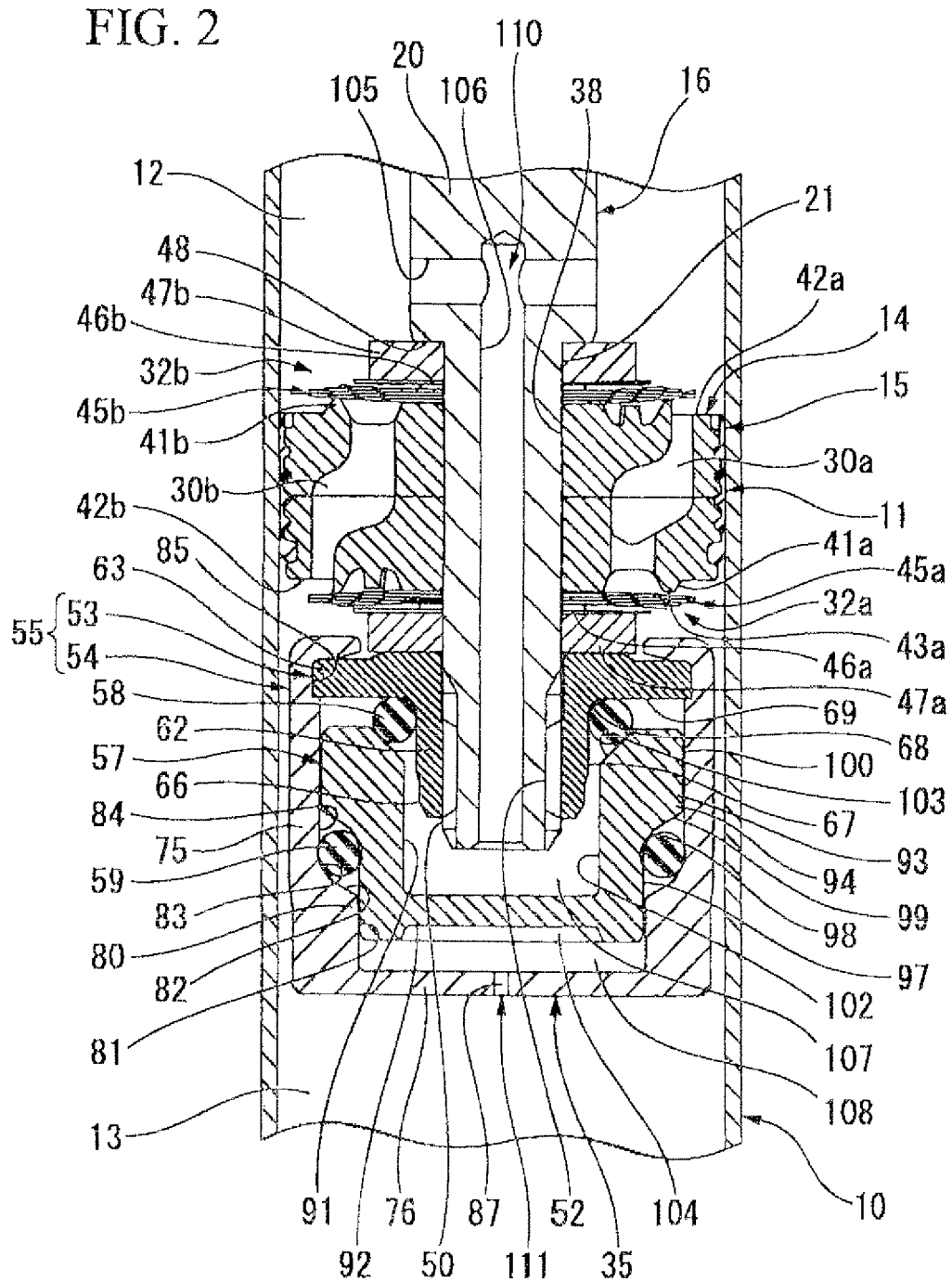
FIG. 2 is a cross-sectional view showing important parts of the shock absorber according to a first embodiment of the present invention.

As shown in FIG. 2, the piston body 14 is provided with a plurality of passages (first passages) 30a (only one of them is shown in FIG. 2, because they are shown in a cross-sectional view) through which oil flows out from the upper chamber 12 to the lower chamber 13 in connection with movement toward the upper chamber 12 of the piston 11, i.e. an expansion stroke, and a plurality of passages (first passages) 30b (only one of them is shown in FIG. 2, because they are shown in a cross-sectional view) through which oil flows out from the lower chamber 13 to the upper chamber 12 in connection with movement toward the lower chamber 13 of the piston 11, i.e. a contraction stroke, both of which allow the upper chamber 12 and the lower chamber 13 to communicate with each other. The passages 30a made up of half of these passages are formed at an equal pitch in a circumferential direction with each passage 30b interposed between every two of the passages 30a. One axial side of the piston 11 (an upper side of FIG. 1) is open to the outside in a radial direction, and the other axial side of the piston 11 (a lower side of FIG. 1) is open to the inside in a radial direction. Alternatively, the passages 30a and 30b may be formed outside the cylinder 10 by, for example, pipes.

Further, a damping force generation mechanism 32a for generating a damping force is installed on half 30a of these passages. The damping force generation mechanism 32a is disposed on the side of the lower chamber 13 of the axial direction of the piston 11, and is attached to the attaching shaft part 21 of the piston rod 16. The passages 30a configure expansion-side passages through which oil flows when the piston 11 moves to the expansion side where the piston rod 16 moves out of the cylinder 10, and the damping force generation mechanism 32a provided for these passages configures an expansion-side damping force generation mechanism that regulates the oil flow of the expansion-side passages 30a to generate a damping force.

The passages 30b made up of the remaining half are formed at an equal pitch in a circumferential direction with each passage 30a interposed between every two of the passages 30b. The other axial side of the piston 11 (a lower side of FIG. 1) is open to the outside in a radial direction, and the one axial side of the piston 11 (an upper side of FIG. 1) is open to the inside in a radial direction.

A damping force generation mechanism 32b for generating a damping force is installed on the remaining half 30b of these passages. The damping force generation mechanism 32b is disposed on the side of the upper chamber 12 of the axial direction of the piston 11, and is attached to the attaching shaft part 21 of the piston rod 16. The passages 30b configure contraction-side passages through which oil flows when the piston 11 moves to the contraction side where the piston rod 16 moves into the cylinder 10, and the damping force generation mechanism 32b provided for these passages configures a contraction-side damping force generation mechanism that controls the oil flow of the contraction-side passages 30b to generate a damping force.

A damping force varying mechanism 35 is attached to the piston rod 16 on an end of the attaching shaft part 21 which is still farther from the piston 11.

The piston body 14 has substantially a disc shape, and is provided with an insertion hole 38 in the center thereof which passes in an axial direction and into which the attaching shaft part 21 of the piston rod 16 is inserted.

At the end of the piston body 14 on the side of the lower chamber 13, a seat part 41a constituting the damping force generation mechanism 32a is formed on the openings of one ends of the expansion-side passages 30a in an annular shape. At the end of the piston body 14 on the side of the upper chamber 12, a seat part 41b constituting the damping force generation mechanism 32b is formed on the openings of one ends of the contraction-side passages 30b in an annular shape.

The piston body 14 is provided with an annular step part 42b, which has a lower axial height than the seat part 41a, on the opposite side of the seat part 41a from the insertion hole 38. The other ends of the contraction-side passages 30b are open to a position of the step part 42b. The seat part 41a is provided with passage grooves (orifices) 43a recessed in an axial direction to extend outwardly from the respective passages 30a in a radial direction of the piston 11 to run to the step part 42b. Similarly, the piston body 14 is provided with an annular step part 42a, which has a lower axial height than the seat part 41b, on the opposite side of the seat part 41b from the insertion hole 38. The other ends of the expansion-side passages 30a are open to a position of the step part 42a. Further, although not shown, the seat part 41b is also provided with passage grooves (orifices) recessed in an axial direction to extend outwardly from the respective passages 30b in a radial direction of the piston 11 to run to the step part 42a.

The damping force generation mechanism 32a includes an annular disc valve 45a that can be seated on the entire seat part 41a at the same time, an annular spacer 46a that has a smaller diameter than the disc valve 45a and is disposed on the opposite side of the disc valve 45a from the piston body 14, and an annular valve regulating member 47a that has a larger diameter than the spacer 46a and is disposed on the opposite side of the spacer 46a from the piston body 14. The disc valve 45a is constructed by superimposing a plurality of annular discs. The disc valve 45a is separated from the seat part 41a, thereby opening the passages 30a. The valve regulating member 47a regulates deformation of the disc valve 45a exceeding a normal range in an opening direction. The disc valve 45a is installed on the passages 30a, and serves as a damping valve that regulates the oil flow caused by sliding of the piston 11 to generate a damping force.

Similarly, the damping force generation mechanism 32b includes an annular disc valve 45b that can be seated on the entire seat part 41b at the same time, an annular spacer 46b that has a smaller diameter than the disc valve 45b and is disposed on the opposite side of the disc valve 45b from the piston body 14, and an annular valve regulating member 47b that has a larger diameter than the spacer 46b and is disposed on the opposite side of the spacer 46b from the piston body 14. The valve regulating member 47b is in contact with a shaft step part 48 at the end of the main shaft part 20 of the piston rod 16 on the side of the attaching shaft part 21. The disc valve 45b is constructed by superimposing a plurality of annular discs. The disc valve 45b is separated from the seat part 41b, thereby opening the passages 30b. Further, the valve regulating member 47b regulates deformation of the disc valve 45b exceeding a normal range in an opening direction. The disc valve 45b is installed on the passages 30b, and serves as a damping valve that regulates the oil flow caused by sliding of the piston 11 to generate a damping force.

In the present embodiment, the damping force generation mechanism 32a or 32b is shown as a disc valve of an inner circumferential clamp as an example. However, the damping force generation mechanism is not limited thereto, and may be any mechanism that generates a damping force. For example, the disc valve may be either a lift type valve biased by a coil spring or a poppet valve.

A male thread 50 is formed at a leading end of the piston rod 16. The damping force varying mechanism 35 (a frequency sensitive part) that varies a damping force without being controlled from the outside by a frequency (a vibration state) is screwed on the male thread 50. The damping force varying mechanism 35 is configured of a housing 55 having a lid member 53 and a housing body 54, a free piston 57 slidably fitted into the housing 55, a contraction-side O-ring (an elastic body, one elastic body) 58 that is interposed between the free piston 57 and the lid member 53 of the housing 55 and undergoes compressive deformation when the free piston 57 moves in one direction, and an expansion-side O-ring (an elastic body, the other elastic body) 59 that is interposed between the free piston 57 and the housing body 54 of the housing 55 and undergoes compressive deformation when the free piston 57 moves in the other direction. The lid member 53 is provided with a female thread 52 into which the mate thread 50 of the piston rod 16 is screwed. The housing body 54 has a bottomed cylindrical shape, and is attached to the lid member 53 such that an opening side of the housing body 54 is closed. Further, in FIG. 2, the O-rings 58 and 59 are shown in a natural state for the sake of convenience. Particularly, since the O-ring 59 functions as a seal, the O-ring 59 is preferably disposed to usually be deformed (a non-circular cross section) in a mounted state. The O-ring 58 serves as a resistance element that is subjected to compressive deformation when the free piston 57 moves in one direction and generates resistance to displacement of the free piston 57. The O-ring 59 serves as a resistance element that is subjected to compressive deformation when the free piston 57 moves in the other direction and generates resistance to displacement of the free piston 57.

Since the lid member 53 is formed mainly by cutting, the lid member 53 includes a lid cylinder part (an extension part) 62 having an approximately cylindrical shape, and a disc-shaped lid flange part 63 that extends from an axial end of the lid cylinder part 62 in a radial outward direction.

The female thread 52 is formed on an inner circumference of the lid cylinder part 62, and protrudes inwardly from an axial intermediate position of the lid cylinder part 62 to an end position of the lid cylinder part 62 which is opposite to the lid flange part 63. A step part 66 is formed on an outer circumference of the lid cylinder part 62 on the opposite side of the lid flange part 63. A cylindrical surface part 67 and a curved surface part 68 are formed on an outer circumferential surface of the lid cylinder part 62 on the side closer to the lid flange part 63 than the step part 66. The cylindrical surface part 67 has a constant diameter, and the curved surface part 68 connected to the cylindrical surface part 67 is formed in an annular shape such that its diameter increases with the distance from the cylindrical surface part 67 in an axial direction, and is connected to a flange surface part 69 of the lid flange part 63 on the side of the lid cylinder part 62. The curved surface part 68 is formed so that its cross section including a central axis of the lid member 53 has an arcuate shape.

The housing body 54 is formed mainly by cutting. The housing body 54 includes a housing cylinder part 75 having an approximately cylindrical shape, and a housing bottom part 76 that closes an axial end of the housing cylinder part 75.

An inner annular protrusion 80 (a housing-side annular protrusion) of an annular shape which protrudes in a radial inward direction is formed on an inner circumference of an end of the housing cylinder part 75 on the side of the housing bottom part 76. A small-diameter cylindrical surface part 81, a tapered surface part (an inclined surface) 82, a curved surface part (an inclined surface) 83, a large-diameter cylindrical surface part 84, and a large-diameter fitting cylindrical surface part 85 are sequentially formed on the inner circumference of the housing cylinder part 75 starting from the side of the housing bottom part 76. The small-diameter cylindrical surface part 81 has a constant diameter. The tapered surface part 82 connected to the small-diameter cylindrical surface part 81 is configured so that its diameter increases with the distance from the small-diameter cylindrical surface part 81. The curved surface part 83 connected to the tapered surface part 82 is formed in an annular shape such that its diameter increases with the distance from the tapered surface part 82. The large-diameter cylindrical surface part 84 connected to the curved surface part 83 has a constant diameter that is greater than a diameter of the small-diameter cylindrical surface part 81. The fitting cylindrical surface part 85 adjacent to the large-diameter cylindrical surface part 84 in an axial direction has a greater diameter than the large-diameter cylindrical surface part 84. The curved surface part 83 is formed so that its cross section including a central axis of the housing body 54 has an arcuate shape. The small-diameter cylindrical surface part 81, the tapered surface part 82, and the curved surface part 83 are formed on the inner annular protrusion 80.

Meanwhile, the housing has been described as a cylinder, although the inner circumferential surface thereof preferably has a circular cross section, the outer circumferential surface thereof may have a non-circular cross section such as a polygonal cross section.

The lid member 53 is inserted into the housing body 54 from the opening side of the housing body 54 with the lid cylinder part 62 directed to a destination. At this time, the lid member 53 makes the lid flange part 63 to be fitted into the fitting cylindrical surface part 85. In this state, the opening end of housing cylinder part 75 is swaged toward the inside. Thereby, the lid member 53 is fixed to the housing body 54 as one body, thus constructing the housing 55. The housing bottom part 76 is provided with a communicating hole (an orifice) 87 in the center thereof which passes through in an axial direction.

The free piston 57 is formed mainly by cutting, the free piston 57 includes a piston cylinder part (a cylinder part) 91 of an approximately cylindrical shape, a piston bottom part 92 closing one axial end of the piston cylinder part 91, and a piston flange part (flange part) 94 having an outer annular protrusion (a piston-side annular protrusion) 93 of an annular shape which extends outwardly from the other axial end of the piston cylinder part 91 in a radial direction.

A small-diameter cylindrical surface part 97, a curved surface part (an inclined surface) 98, a tapered surface part (an inclined surface) 99, and a large-diameter cylindrical surface part 100 are sequentially formed on outer circumferential surfaces of the piston cylinder part 91 and the piston flange part 94 starting from the side of the piston bottom part 92. The small-diameter cylindrical surface part 97 is formed on the piston cylinder part 91. The curved surface part 98, the tapered surface part 99, and the large-diameter cylindrical surface part 100 are formed on the piston flange part 94. The small-diameter cylindrical surface part 97 has a constant diameter, and the curved surface part 98 connected to the small-diameter cylindrical surface part 97 is formed in an annular shape such that its diameter increases with the distance from the small-diameter cylindrical surface part 97. The tapered surface part 99 connected to the curved surface part 98 is configured so that its diameter increases with the distance from the curved surface part 98. The large-diameter cylindrical surface part 100 connected to the tapered surface part 99 has a constant diameter that is greater than a diameter of the small-diameter cylindrical surface part 97. The curved surface part 98 is formed so that its cross section including a central axis of the free piston 57 has an arcuate shape.

A cylindrical surface part 102 and a tapered surface part (an inclined surface) 103 are sequentially formed on an inner circumferential surface of the piston cylinder part 91 starting from the piston bottom part 92. The cylindrical surface part 102 on the side of the piston bottom part 92 is formed on the piston cylinder part 91. Both the cylindrical surface part 102 on the opposite side of the piston bottom part 92 and the tapered surface part 103 are formed on the piston flange part 94. The cylindrical surface part 102 has a constant diameter, and the tapered surface part 103 connected to the cylindrical surface part 102 is configured so that its diameter increases with the distance thereof from the cylindrical surface part 102.

The piston bottom part 92 on the opposite side of the piston cylinder part 91 is provided with a recessed part 104 in the center thereof which is recessed in an axial direction.

The large-diameter cylindrical surface part 100 of the free piston 57 is slidably fitted on the large-diameter cylindrical surface part 84 of the housing body 54. Further, the small-diameter cylindrical surface part 97 of the free piston 57 is slidably fitted on the small-diameter cylindrical surface part 81 of the housing body 54. In this state, a position of the tapered surface part 82 of the housing body 54 and a position of the curved surface part 98 of the free piston 57 are superimposed on each other in radial directions thereof, and a position of the curved surface part 83 of the housing body 54 and a position of the tapered surface part 99 of the free piston 57 are superimposed on each other in radial directions thereof. Thus, both the tapered surface part 82 and the curved surface part 83 of the housing body 54 are opposite to both the curved surface part 98 and the tapered surface part 99 of the free piston 57 in a moving direction of the free piston 57. Further, the flange surface part 69 of the lid member 53 is opposite to the tapered surface part 103 of the free piston 57 in a moving direction of the free piston 57. The tapered surface part 82 of the housing body 54 and the tapered surface part 99 of the free position 57 are inclined to the axes thereof at the same angle. The curved surface part 98 of the free piston 57 has the same cross-sectional curvature as the curved surface part 83 of the housing body 54. Furthermore, the curved surface parts 83 and 98 have radii of curvature greater than a cross-sectional radius of the O-ring 59 having the circular cross section.

Thus, the O-ring 59 is disposed between the small-diameter cylindrical surface part 97, the curved surface part 98, and the tapered surface part 99 of the free piston 57 and the tapered surface part 82, the curved surface part 83, and the large-diameter cylindrical surface part 84 of the housing body 54, in other words, between the outer annular protrusion 93 of the free piston 57 and the inner annular protrusion 80 of the housing body 54. In a natural state, the O-ring 59 is configured so that its cross section including a central axis has a circular shape, an inner diameter being smaller than the small-diameter cylindrical surface part 97 of the free piston 57, and an outer diameter being greater than the large-diameter cylindrical surface part 84 of the housing body 54. That is, the O-ring 59 is fitted in interference with both the free piston 57 and the housing body 54 in a radial direction.

Further, the O-ring 58 is disposed between the cylindrical surface part 67, the curved surface part 68, and the flange surface part 69 of the lid member 53 and the tapered surface part 103 of the free piston 57. In a natural state, the O-ring 58 is configured so that its cross section including a central axis has a circular shape, and the same inner diameter as the cylindrical surface part 67 of the lid member 53. Both of the O-rings 58 and 59 maintain the free piston 57 at a neutral position with respect to the housing 55, and allow the free piston 57 to axially move toward the upper chamber 12 and the lower chamber 13 relative to the housing 55. The free piston 57 located at the neutral position is axially separated from the housing bottom part 76 of the housing body 54 and the lid flange part 63 of the lid member 53 in order to move in an axial direction, and has a gap from the lid cylinder part 62 in a radial direction.

In the free piston 57, the O-ring 59 is in contact with the small-diameter cylindrical surface part 97, the curved surface part 98, and the tapered surface part 99. Among them, the curved surface part 98 and the tapered surface part 99 are inclined to the moving direction of the free piston 57. Further, in the free piston 57, the O-ring 58 is in contact with the tapered surface part 103 that is inclined to the moving direction of the free piston 57.

In the housing 55, the O-ring 59 is in contact with the tapered surface part 82, the curved surface part 83, and the large-diameter cylindrical surface part 84. Among them, the tapered surface part 82 and the curved surface part 83 are inclined to the moving direction of the free piston 57. Further, in the housing 55, the O-ring 58 is in contact with the cylindrical surface part 67, the curved surface part 68, and the flange surface part 69.

Thus, a free piston contact surface, on which the small-diameter cylindrical surface part 97, the curved surface part 98 and the tapered surface part 99 of the free piston 57 are in contact with the O-ring 59, and a housing contact surface, on which the large-diameter cylindrical surface part 84, the curved surface part 83 and the tapered surface part 82 of the housing 55 are in contact with the O-ring 59, are constructed so that the shortest distance between the portions that are in contact with the O-ring 59 is changed by the movement of the free piston 57, and that the direction of a segment connecting the portions forming the shortest distance is changed. In other words, shapes of the small-diameter cylindrical surface part 97, the curved surface part 98 and the tapered surface part 99 and shapes of the large-diameter cylindrical surface part 84, the curved surface part 83 and the tapered surface part 82 are set so that the direction of the segment, which represents the shortest distance between the portions where the O-ring 59 is in contact with the free piston contact surface of the free piston 57 and the housing contact surface of the housing 55, is changed. In detail, when the free piston 57 is positioned on the side of the axial upper chamber 12 with respect to the housing 55, the shortest distance between the portions where the O-ring 59 is in contact with the free piston contact surface and the housing contact surface is a difference in radius between the large-diameter cylindrical surface part 84 and the small-diameter cylindrical surface part 97 (because a difference in radius between the outer and inner diameters of the O-ring 59 is greater than the difference in radius between the large-diameter cylindrical surface part 84 and the small-diameter cylindrical surface part 97, the O-ring 59 is compressive deformed by the difference, and the deformed portion, i.e. the segment of the shortest distance, has an inclined angle equal to zero (0)). On the other hand, when the free piston 57 moves toward the axial lower chamber 13 relative to the housing 55, the portions contacted with the O-ring 59 are the curved surface part 98 and the curved surface part 83, and the position where the O-ring 59 is deformed to the maximum extent, i.e. the segment of the shortest distance, has an inclined angle other than zero (0).

The piston flange part 94 is formed on one end of the free piston 57. The piston flange part 94 has the tapered surface part 103 inclined on an inner circumference thereof, and the curved surface part 98 and the tapered surface part 99 inclined on an outer circumference thereof. The lid cylinder part 62, which extends into the piston cylinder part 91 of the free piston 57; is formed on a part of the lid member 53 of the housing 55. The O-ring 58 is disposed to be in contact with the tapered surface part 103 on the inner circumferential surface of the piston flange part 94 and the lid cylinder part 62. The O-ring 59 is disposed to be in contact with the small-diameter cylindrical surface part 97, the curved surface part 98, and the tapered surface part 99, all of which are the outer circumferential surface of the piston flange part 94, and the tapered surface part 82, the curved surface part 83, and the large-diameter cylindrical surface part 84, all of which are part of the inner circumferential surface of the housing 55.

The damping force varying mechanism 35 is assembled by inserting the O-ring 59 into the housing body 54 up to a position of the curved surface part 83, fitting the free piston 57 on the inside of the housing body 54 and the O-ring 59, disposing the O-ring 58 on the tapered surface part 103 of the free piston 57, fitting the lid member 53 into the housing body 54 while inserting the lid cylinder part 62 on the inside of the O-ring 58, and swaging the housing body 54. Thus, the damping force varying mechanism 35 pre-assembled in this way is attached by screwing the female thread 52 of the housing 55 onto the male thread 50 of the attaching shaft part 21 of the piston rod 16. At this time, the lid flange part 63 of the housing 55 comes into contact with the valve regulating member 47a of the damping force generation mechanism 32a, and the damping force generation mechanism 32a, the piston body 14, and the damping force generation mechanism 32b are held between the shaft step part 48 of the piston rod 16 and the lid flange part 63 of the housing 55. That is to say, the damping force varying mechanism 35 also serves as a fastening member that fastens the damping force generation mechanism 32a, the piston body 14, and the damping force generation mechanism 32b to the piston rod 16. The outer diameter of the damping force varying mechanism 35, i.e. the outer diameter of the housing body 54, is set to be smaller than the inner diameter of the cylinder 10 to an extent that it does not serve as flow passage resistance.

The piston rod 16 has a passage hole 105 formed in the end of the main shaft part 20 on the side of the attaching shaft part 21 in a radial direction. The attaching shaft part 21 has a passage hole 106 formed in an axial direction to communicate with the passage hole 105. Accordingly, the upper chamber 12 communicates with the housing 55 of the damping force varying mechanism 35 by means of the passage holes 105 and 106. In detail, the upper chamber 12 communicates with an upper chamber communicating chamber 107 defined by the housing 55, the O-ring 58, and the free piston 57. Further, the lower chamber 13 communicates with the housing 55 via a communicating hole 87 formed in the housing bottom part 76 of the housing 55. In detail, the lower chamber 13 communicates with a lower chamber communicating chamber 108 defined by the housing 55, the O-ring 59, and the free piston 57. Further, the O-ring 59 disposed between the housing body 54 and the free piston 57 is disposed to always seal between the housing 55 and the free piston 57, and blocks the communication between the upper chamber communicating chamber 107 and the lower chamber communicating chamber 108 at all times.

The passage holes 105 and 106 and the upper chamber communicating chamber 107 constitute a passage (a second passage) 110, to which oil flows out from the upper chamber 12 of the cylinder 10 by means of the movement of the piston 11 toward the upper chamber 12. The communicating hole 87 and the lower chamber communicating chamber 108 constitute a passage (a second passage) 111 to which oil flows out from the lower chamber 13 of the cylinder 10 by means of the movement of the piston 11 toward the lower chamber 13. Thus, a flow passage corresponding to a part of the passage 110 and a flow passage corresponding to the entirety of the passage 111 are formed in the housing 55. The free piston 57 is installed to be movable in the housing 55, and partitions the passages 110 and 111 into an upstream side and a downstream side. The passages 30a and 30b and the passage 110 are formed in the piston 11 including a part of the piston rod 16. Here, the second passages are partitioned by the free piston 57, and substantially generate a flow, because although a flow of oil replaced between the upper chamber 12 and the lower chamber 13 does not occur, the oil of the upper chamber 12 flows into the upper chamber communicating chamber 107 while the free piston 57 is moving relative to the housing 55, and thus the same amount of oil flows toward the lower chamber 13 under pressure.

In the expansion stroke in which the piston rod 16 moves to an expansion side, the oil flows from the upper chamber 12 to the lower chamber 13 via the passages 30a. When a piston speed is within a minute low-speed region, the oil flowing from the upper chamber 12 into the passages 30a basically flows to the lower chamber 13 via a constant orifice defined by the passage grooves 43a formed in the piston 11 and the disc valve 45a that comes into contact with the seat part 41a. At this time, a damping farce having an orifice characteristic is generated (where the damping force is approximately proportional to the square of the piston speed). When the piston speed increases to reach a low-speed region, the oil flowing from the upper chamber 12 into the passages 30a basically continues to open the disc valve 45a, and flows between the disc valve 45a and the seat part 41a to the lower chamber 13. As such, a damping force having a valve characteristic is generated (where the damping force is approximately proportional to the piston speed).

In the contraction stroke in which the piston rod 16 moves to a contraction side, the oil flows from the lower chamber 13 to the upper chamber 12 via the passages 30b. When a piston speed is within a minute low-speed region, the oil flowing from the lower chamber 13 into the passages 30b basically flows to the upper chamber 12 via a constant orifice defined by the passage grooves (not shown) formed in the piston 11 and the disc valve 45b that comes into contact with the seat part 41b. At this time, a damping force having an orifice characteristic is generated (where the damping force is approximately proportional to the square of the piston speed). When the piston speed increases to reach a low-speed region, the oil flowing from the lower chamber 13 into the passages 30b basically continues to open the disc valve 45b, and flows between the disc valve 45b and the seat part 41b to the upper chamber 12. As such, a damping force having a valve characteristic is generated (where the damping force is approximately proportional to the piston speed).

Here, a region where a frequency when the piston speed is slow, i.e. a frequency of the minute low-speed region (e.g., 0.05 m/s), is relatively high (e.g., more than 7 Hz) is, for instance, vibration generated from fine surface unevenness of a road surface. In this situation, it is preferable to lower the damping force. Further, similarly, even when the piston speed is slow, a region where the frequency is relatively low (e.g. less than 2 Hz) contrary to the above is vibration such as a shake caused by rolling of a vehicle body. In this situation, it is preferable to increase the damping force.

Correspondingly, the aforementioned damping force varying mechanism 35 varies the damping force corresponding to the frequency even when the piston speed is slow in the same way. That is, when the piston speed is slow, if a reciprocating frequency of the piston 11 becomes high, a pressure of the upper chamber 12 becomes high in the expansion stroke of the piston 11, and thus the oil is caused to flow from the upper chamber 12 into the upper chamber communicating chamber 107 of the damping force varying mechanism 35 via the passage holes 105 and 106 of the piston rod 16. Simultaneously, the oil is caused to flow from the lower chamber communicating chamber 108 of the damping force varying mechanism 35 into the lower chamber 13 via the communicating hole 87 constituting the orifice of the downstream side of the passage 111. In the meantime, the free piston 57 moves toward the axial lower chamber 13 against a biasing force of the O-ring 59 located on the side of the axial lower chamber 13. In this way, as the free piston 57 moves toward the axial lower chamber 13, the oil flows from the upper chamber 12 into the upper chamber communicating chamber 107, and a flow rate of the oil that flows from the upper chamber 12 into the passages 30a and then flows through the damping force generation mechanism 32a into the lower chamber 13 is reduced. Thereby, the damping force is reduced.

In the following contraction stroke, since a pressure of the lower chamber 13 becomes high, the oil is caused to flow from the lower chamber 13 into the lower chamber communicating chamber 108 of the damping force varying mechanism 35 via the communicating hole 87 constituting the orifice of the downstream side of the passage. Simultaneously, the oil is caused to flow from the upper chamber communicating chamber 107 into the upper chamber 12 via the passage holes 105 and 106 of the piston rod 16. In the meantime, the free piston 57, which has moved toward the axial lower chamber 13 up to that time, moves toward the axial upper chamber 12 against a biasing force of the O-ring 58 located on the side of the axial upper chamber 12. In this way, as the free piston 57 moves toward the axial upper chamber 12, the oil flows from the lower chamber 13 into the lower chamber communicating chamber 108, and a flow rate of the oil that flows from the lower chamber 13 into the passages 30b and then flows through the damping force generation mechanism 32b into the upper chamber 12 is reduced. Thereby, the damping force is reduced.

In the region where the frequency of the piston 11 is high, a frequency of the movement of the free piston 57 also becomes high in proportion to the high frequency. As a result, in each aforementioned expansion stroke, the oil flows from the upper chamber 12 into the upper chamber communicating chamber 107. In each contraction stroke, the oil flows from the lower chamber 13 to the lower chamber communicating chamber 108. Thereby, as described above, the damping force is maintained in a lowered state.

On the other hand, when the piston speed is slow, if the frequency of the piston 11 becomes low, the frequency of the movement of the free piston 57 is also reduced in proportion to the low frequency. As such, in the initial stage of the expansion stroke, the oil flows from the upper chamber 12 to the upper chamber communicating chamber 107. Afterwards, the free piston 57 compresses the O-ring 59, and is stopped on the side of the axial lower chamber 13, and the oil does not flow from the upper chamber 12 to the upper chamber communicating chamber 107. As such, the flow rate of the oil that flows from the upper chamber 12 into the passages 30a and then flows through the damping force generation mechanism 32a into the lower chamber 13 is in an unreduced state, and thus the damping force is increased.

Even in the following contraction stroke, in its initial stage, the oil flows from the lower chamber 13 to the lower chamber communicating chamber 108. Afterwards, the free piston 57 compresses the O-ring 58, and is stopped on the side of the axial upper chamber 12, and the oil does not flow from the lower chamber 13 to the lower chamber communicating chamber 108. As such, the flow rate of the oil that flows from the lower chamber 13 into the passages 30b and then flows through the damping force generation mechanism 32b into the upper chamber 12 is in an unreduced state, and thus the damping force is increased.

Thus, in the present embodiment, as described above, as a component for applying a biasing force to the free piston 57 so as to return it to its neutral position, the O-rings 58 and 59 formed of a rubber material are used. At the neutral position of the free piston 57, the O-ring 59 located between the free piston 57 and the housing body 54 is positioned between the large-diameter cylindrical surface part 84 of the housing 55 and the small-diameter cylindrical surface part 97 of the free piston 57.

For example, in the expansion stroke, when the free piston 57 moves from its neutral position toward the axial lower chamber 13 relative to the housing 55, the large-diameter cylindrical surface part 84 of the housing 55 and the small-diameter cylindrical surface part 97 of the free piston 57 mutually roll the O-ring 59, i.e., rotate the O-ring 59 such that the inner diameter side and the outer diameter side of the O-ring 59 move in opposite directions, and to move toward the axial lower chamber 13 relative to the housing 55. Afterwards, the curved surface part 83 and the tapered surface part 82 of the housing 55 on the side of the axial upper chamber 12 and the curved surface part 98 and the tapered surface part 99 of the free piston 57 on the side of the axial lower chamber 13 roll the O-ring 59, and at the same time, compress the O-ring 59 in the axial and radial directions of the free piston 57. Continuously, the curved surface part 83 and the tapered surface part 82 of the housing 5S on the side of the axial lower chamber 13 and the curved surface part 98 and the tapered surface part 99 of the free piston 57 on the side of the axial upper chamber 12 compress the O-ring 59 in the axial and radial directions of the free piston 57.

At this time, a region where the O-ring 59 is rolled between the large-diameter cylindrical surface part 84 of the housing 55 and the small-diameter cylindrical surface part 97 of the free piston 57 and a region where the O-ring 59 is rolled between the curved surface part 83 and the tapered surface part 82 of the housing 55 and the curved surface part 98 and the tapered surface part 99 of the free piston 57 are a rolling region where the O-ring 59 is rolled at a position separated from a downstream side end within a moving region of the free piston 57. Further, at the position separated from the downstream side end, the rolling region is a moving region where the O-ring 59 moves in a moving direction of the free piston 57 in the state where the O-ring 59 is in contact with both the housing 55 and the free piston 57. The term "moving" is defined that at least a downstream end position (a lower end position in FIG. 2) of the O-ring 59 in the moving direction of the free piston is changed.

Further, a region where the O-ring 59 is compressed between the curved surface part 83 and the tapered surface part 82 of the housing 55 and the curved surface part 98 and the tapered surface part 99 of the free piston 57 is a moving direction deformation region where the O-ring 59 undergoes elastic deformation in the moving direction of the free piston 57 on the downstream side end within the moving region of the free piston 57. The term "elastic deformation in the moving direction deformation region" is defined as deformation when an upstream end position (an upper end position in FIG. 2) of the O-ring 59 in the moving direction of the free piston is changed but a downstream end position is not changed. In the present embodiment, the rolling region and the moving region are partially overlapped on the moving direction deformation region.

In the following contraction stroke, when the free piston 57 moves toward the axial upper chamber 12 relative to the housing 55, the curved surface part 83 and the tapered surface part 82 of the housing 55 on the side of the axial lower chamber 13 and the curved surface part 98 and the tapered surface part 99 of the free piston 57 on the side of the axial upper chamber 12 release the compression of the O-ring 59. Then, the curved surface part 83 and the tapered surface part 82 of the housing 55 on the side of the axial upper chamber 12 and the curved surface part 98 and the tapered surface part 99 of the free piston 57 on the side of the axial lower chamber 13 roll the O-ring 59, and simultaneously release the compression of the O-ring 59. Then, the large-diameter cylindrical surface part 84 of the housing 55 and the small-diameter cylindrical surface part 97 of the free piston 57 mutually roll the O-ring 59, and simultaneously move the O-ring 59 toward the axial upper chamber 12 relative to the housing 55. Thus, in the state where the O-ring 58 is held on the cylindrical surface part 67, the curved surface part 68 and the flange surface part 69 of the housing 55, the free piston 57 compresses the O-ring 58 between the lid member 53 and the free piston 57 in the axial and radial directions of the free piston 57 in the proximity of its neutral position by means of the cylindrical surface part 67, the curved surface part 68, and the flange surface part 69, and the tapered surface part 103 of the free piston 57.

In the following expansion stroke, the cylindrical surface part 67, the curved surface part 68 and the flange surface part 69 of the housing 55, and the tapered surface part 103 of the free piston 57 release the compression of the O-ring 58 by relative movement in a separating direction. The large-diameter cylindrical surface part 84 of the housing 55 and the small-diameter cylindrical surface part 97 of the free piston 57 mutually roll the O-ring 59, and simultaneously move the O-ring 59 toward the axial lower chamber 13 relative to the housing 55. When the free piston 57 passes through its neutral position, it operates the O-ring 59 in the same way as described above.

With this construction, the O-ring 58 is compressive deformed in the moving direction in the moving direction deformation region, and the other O-ring 59 moves in the moving direction of the free piston 57 in the moving region.

Figure 3:
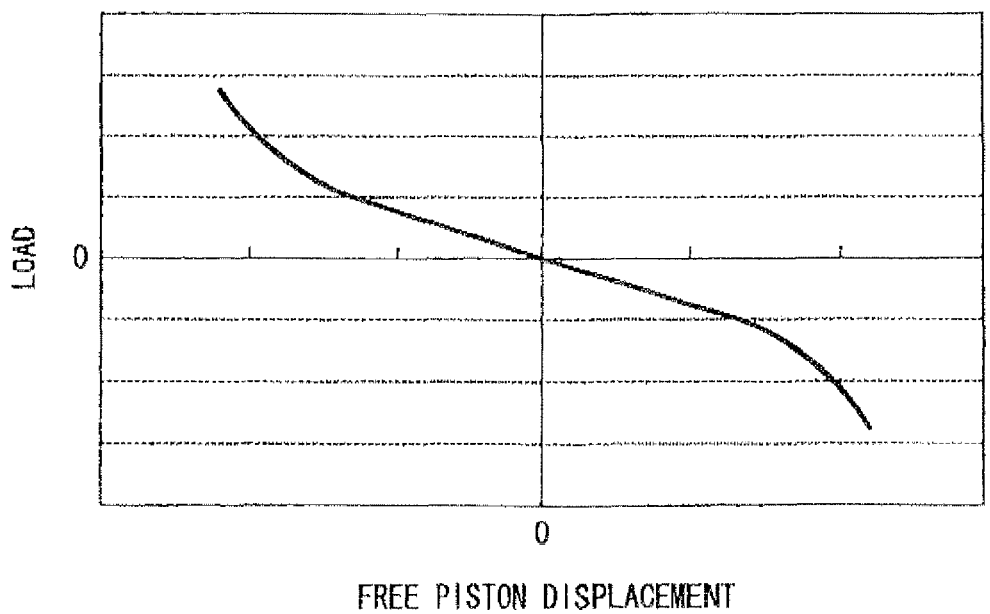
FIG. 3 is a characteristic diagram showing a characteristic of a load over free piston displacement of an O-ring in the shock absorber according to a first embodiment of the present invention.

The characteristic of a load over the displacement of the free piston 57 caused by the O-rings 58 and 59 formed of a rubber material has a nonlinear characteristic as shown in FIG. 3. That is, the load characteristic approaches a linear characteristic within a predetermined range in front of and behind the neutral position of the free piston 57. When beyond the predetermined range, an increasing rate of the load smoothly increases depending on the displacement. As described above, since amplitude of the piston 11 is also small in the region where the operating frequency of the piston 11 is high, the displacement of the free piston 57 also becomes small, and the free piston 57 operates within the linear characteristic range in front of and behind its neutral position. Thereby, the free piston 57 is easy to move, vibrates in resonance with the vibration of the piston 11, and contributes to reducing the damping force generated from the damping force generation mechanisms 32a and 32b.

On the other hand, since amplitude of the piston 11 becomes high in the region where the operating frequency of the piston 11 is low, the displacement of the free piston 57 becomes large, and the free piston 57 operates within the nonlinear characteristic range shown in FIG. 3. Thereby, the free piston 57 gradually becomes difficult to operate smoothly, and has difficulty in reducing the damping force generated from the damping force generation mechanisms 32a and 32b.

In the shock absorber disclosed in Japanese Unexamined Utility Model Application, First Publication No. H07-019642, movement of a spool partitioning the inside of a housing into two chambers is regulated by an elastic body (corresponding to only the moving direction deformation region of the first embodiment), and a damping force is smoothly changed. However, since resistance to the movement of the spool sharply increases, there is a need for improvement of this characteristic (when rubber is compressed in an axial direction, a spring constant sharply increases).

Figure 4:
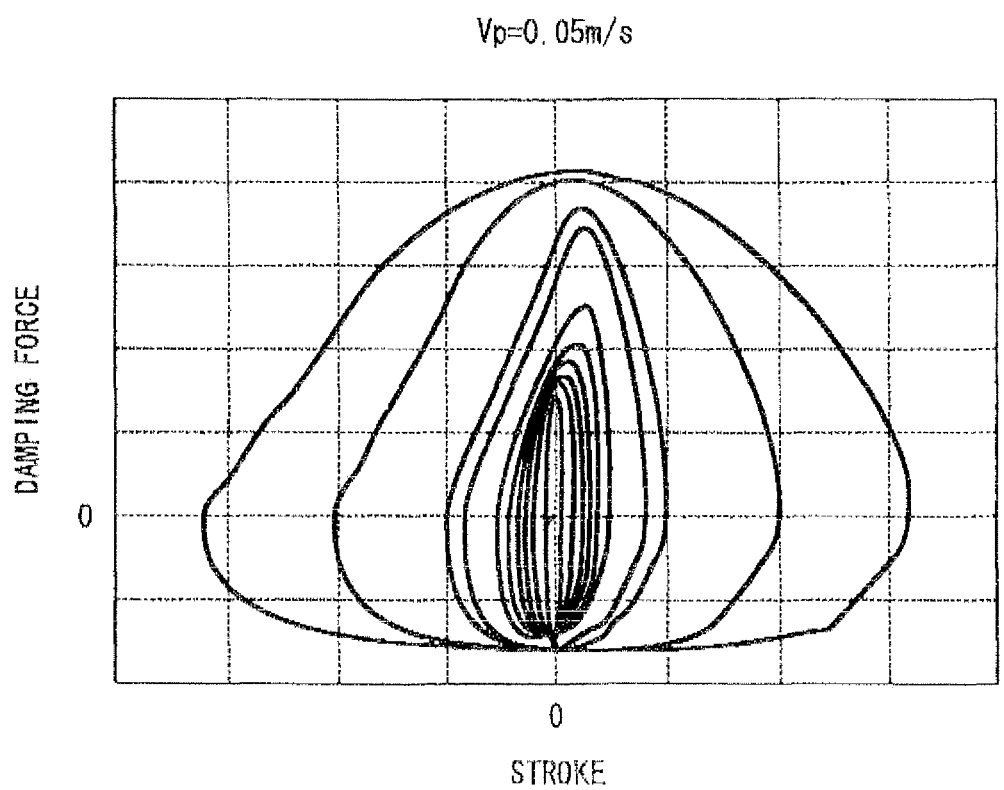
FIG. 4 is a characteristic diagram showing a characteristic of a damping force over a piston stroke in the shock absorber according to a first embodiment of the present invention.

In contrast, according to the first embodiment described above, among the small-diameter cylindrical surface part 97, the curved surface part 98, and the tapered surface part 99 of the free piston 57 which are in contact with the O-ring 59, the curved surface part 98 and the tapered surface part 99 are inclined to the moving direction of the free piston 57. Among the tapered surface part 82, the curved surface part 83, and the large-diameter cylindrical surface part 84 of the housing 55 which are in contact with the O-ring 59, the tapered surface part 82 and the curved surface part 83 are inclined to the moving direction of the free piston 57. Due to the movement of the free piston 57, the shortest distance between the free piston contact surface of the small-diameter cylindrical surface part 97, the curved surface part 98, and the tapered surface part 99 which is in contact with the O-ring 59 and the housing contact surface of the tapered surface part 82, the curved surface part 83, and the large-diameter cylindrical surface part 84 which is in contact with the O-ring 59 is changed. As such, when the damping force is changed depending on the frequency, it is possible to smoothly change the damping force. For example, in the shock absorber of the first embodiment, when the speed of the piston 11 is 0.05 m/s, and when the operating frequencies of the piston are 0.50 Hz, 0.80 Hz, 1.59 Hz, 1.99 Hz, 3.18 Hz, 3.98 Hz, 4.97 Hz, 6.12 Hz, 7.96 Hz, 9.95 Hz, 15.92 Hz, and 19.89 Hz in sequence from the outside, a relationship between a piston stroke and a damping force is shown in FIG. 4. It can be seen from FIG. 4 that the damping force is very smoothly changed at each frequency. Further, it can be seen that it is possible to increase the damping force at a low frequency in the proximity of 0 where a stroke of the piston 11 is small, for instance at 0.05 Hz, and to reduce the damping force at a relatively high frequency of, for instance, 4.97 Hz or more. Meanwhile, at least one of the small-diameter cylindrical surface part 97, the curved surface part 98 and the tapered surface part 99; and the large-diameter cylindrical surface part 84, the curved surface part 83 and the tapered surface part 82 may be configured so that their shapes change the shortest distance between the portion of the free piston contact surface which is in contact with the elastic body and the portion of the housing contact surface which is in contact with the elastic body.

The inclined tapered surface part 99 and the curved surface part 98 of the free piston 57 include the curved surface part 98. The inclined tapered surface part 82 and the curved surface part 83 of the housing 55 include the curved surface part 83. As such, it is possible to change the damping force more smoothly. Further, even in this case, at least one of the curved surface parts 83 and 98 may be provided.

Since the radii of curvature of the curved surface parts 83 and 98 are greater than the cross-sectional radius of the O-ring 59, it is possible to change the damping force more smoothly.

The tapered surface part 99 and the curved surface part 98 of the free piston 57 and the tapered surface part 82 and the curved surface part 83 of the housing 55 are opposite to the moving direction of the free piston 57. As such, it is possible to compress the O-ring 59 adequately.

Since the O-ring 58 that undergoes compressive deformation when the free piston 57 moves in one direction and the O-ring 59 that undergoes compressive deformation when the free piston 57 moves in the other direction are provided, it is possible to smoothly change the damping force in both of the expansion stroke and the contraction stroke. Thereby, since the damping force is smoothly changed even in the event of a change in frequency, a change in piston speed, etc., no ride discomfort is caused by the change of the damping force. Particularly, in the event of a change in posture, the damping force gradually increases, and it is possible to suppress the change of posture without causing discomfort to a driver. Thereby, it is possible to provide a higher level of vehicle along with ride comfort and steering stability, compared to the shock absorber disclosed in Japanese Unexamined Utility Model Application, First Publication No. H07-019642.

In the present embodiment, the piston flange part 94 is installed on one end of the free piston 57. The piston flange part 94 is made up of the tapered surface part 103 inclined on the inner circumference thereof, and the curved surface part 98 and the tapered surface part 99 inclined on the outer circumference thereof. The lid cylinder part 62, which extends into the piston cylinder part 91 of the free piston 57, is installed on a part of the housing 55. The O-ring 58 is disposed to come into contact with the tapered surface part 103 of the inner circumference of the piston flange part 94 and the lid cylinder part 62. The O-ring 59 is disposed to come into contact with the curved surface part 98 and the tapered surface part 99 of the outer circumference of the piston flange part 94 and the inner circumferential surface of the housing part 55. To this end, the O-ring 59 is disposed in the housing body 54, and the free piston 57 is disposed inside the housing body 54 and the O-ring 59. The O-ring 58 is disposed on the free piston 57. The lid cylinder part 62 is inserted into the O-ring 58. In the meantime, the lid member 53 is fixed to the housing body 54. Thereby, the shock absorber is assembled. Accordingly, assembly efficiency of each component can be improved.

The O-ring 59 disposed between the housing body 54 and the free piston 57 functions as a spring that generates a biasing force in the opposite direction when the free piston 57 is displaced, and seals between the housing body 54 and the free, piston 57. As such, the O-ring 59 functions as a seal that always blocks the communication between the upper chamber communicating chamber 107 and the lower chamber communicating chamber 108, and can reduce the number of components.

Further, since the O-ring 59 is rolled between the free piston 57 and the housing 55, it is possible to change the damping force more smoothly. In addition, even when an O-ring having a small cross-sectional diameter is used, the O-ring is rolled, and thus a stroke distance of the free piston where resistance is applied by the O-ring is allowed to increase (to be larger than the diameter of the O-ring). Thus, the technology disclosed in Japanese Unexamined Utility Model Application, First Publication No. H07-019642 in which the rubber is merely compressed (a stroke distance cannot be taken in excess of a thickness of the rubber in a compressive deformed direction) and the technology of the present embodiment are identical in that both use the rubber. However, as described above, both are different in view of the usage of the rubber, and thus are completely different in view of the technical ideas thereof.

The free piston 57 has the moving direction deformation region, where the O-ring 59 is resiliently deformed in the moving direction of the free piston 57, on the downstream side end within the moving region of the free piston 57. Further, the free piston 57 has a rolling region where the O-ring 59 is rolled, at a position separated from the downstream side end. As such, it is possible to change the damping force more smoothly.

The rolling region is partially overlapped on the moving direction deformation region. For this reason, the resistance caused by the rolling is gradually changed to the resistance caused by the compressive deformation in the moving direction. As such, it is possible to change the damping force more smoothly. Particularly, it is possible to prevent the spring constant from sharply increasing, and to obtain an approximately linear characteristic.

In the present embodiment, the shape of the free piston contact surface of the small-diameter cylindrical surface part 97, the curved surface part 98, the tapered surface part 99 which is in contact with the O-ring 59 and the shape of the housing contact surface of the large-diameter cylindrical surface part 84, the curved surface part 83, and the tapered surface part 82 which is in contact with the O-ring 59 are set so that the direction of the segment connecting the shortest distance between the free piston contact surface and the housing contact surface is changed. As such, even when the direction of the force generated by the O-ring is changed, it is possible to change the damping force more smoothly, because the resistance to the moving direction of the free piston is changed.

The free piston 57 has the moving direction deformation region, where the O-ring 59 is resiliently deformed in the moving direction of the free piston 57, on the downstream side end within the moving region of the free piston 57. Further, the free piston 57 has a moving region, in which the O-ring 59 moves in the moving direction of the free piston 57 in the state where the O-ring 59 is in contact with both the housing 55 and the free piston 57, at the position separated from the downstream side end. As such the stoke distance of the free piston where resistance is applied by the O-ring is allowed to increase, for instance, to be greater than the diameter of the O-ring, and it is possible to change the damping force more smoothly.

Further, since the moving region is partially overlapped on the moving direction deformation region, it is possible to change the damping force more smoothly.

A number of O-rings are provided. The O-ring 58 is compressive deformed in the moving direction in the moving direction deformation region. The O-ring 59 moves in the moving direction of the free piston 57 in the moving region. As such, it is possible to smoothly change the damping force depending on the moving direction of the free piston 57.

Since the passage 110 is installed in the piston 11, it is possible to simplify the constructions.

Since the communicating hole 87 is provided as an orifice upstream and downstream of the passage 111, the resistance to the movement of the free piston also acts on the orifice in addition to the O-ring, and thus it is possible to change the damping force more smoothly. Further, in the aforementioned embodiment, a small orifice is provided in the free piston 57, and thereby it is possible to change characteristics. In addition, the aforementioned embodiment has shown that the housing 55 is configured of the lid member 53 and the housing body 54. However, when the O-ring 58 is adapted to be in contact with the outer circumference of the lower end of the piston rod 16 by shortening the lid cylinder part 62, a portion of the lower end of the piston rod 16 also constitutes the housing 55.

Second Embodiment

Next, a second embodiment will be described focusing on portions different from those of the first embodiment mainly based on FIG. 5. Further, for parts that are in common with the first embodiment, the same names and reference numbers are used.

In the second embodiment, a damping force varying mechanism 35 is partially different from that of the first embodiment. In detail, in comparison with the housing body 54 of the first embodiment, a housing body 54 of the damping force varying mechanism 35 is constructed without a housing bottom part 76 and a part of a housing cylinder part 75 on the side of the housing bottom part 76. Thereby, in the damping force varying mechanism 35 of the second embodiment, the housing body 54 is constructed so that the housing cylinder part 75 and its inner annular protrusion 80 are shorter in axial length than those of the first embodiment, without the communicating hole 87 and the lower chamber communicating chamber 108 of the first embodiment.

Figure 5:
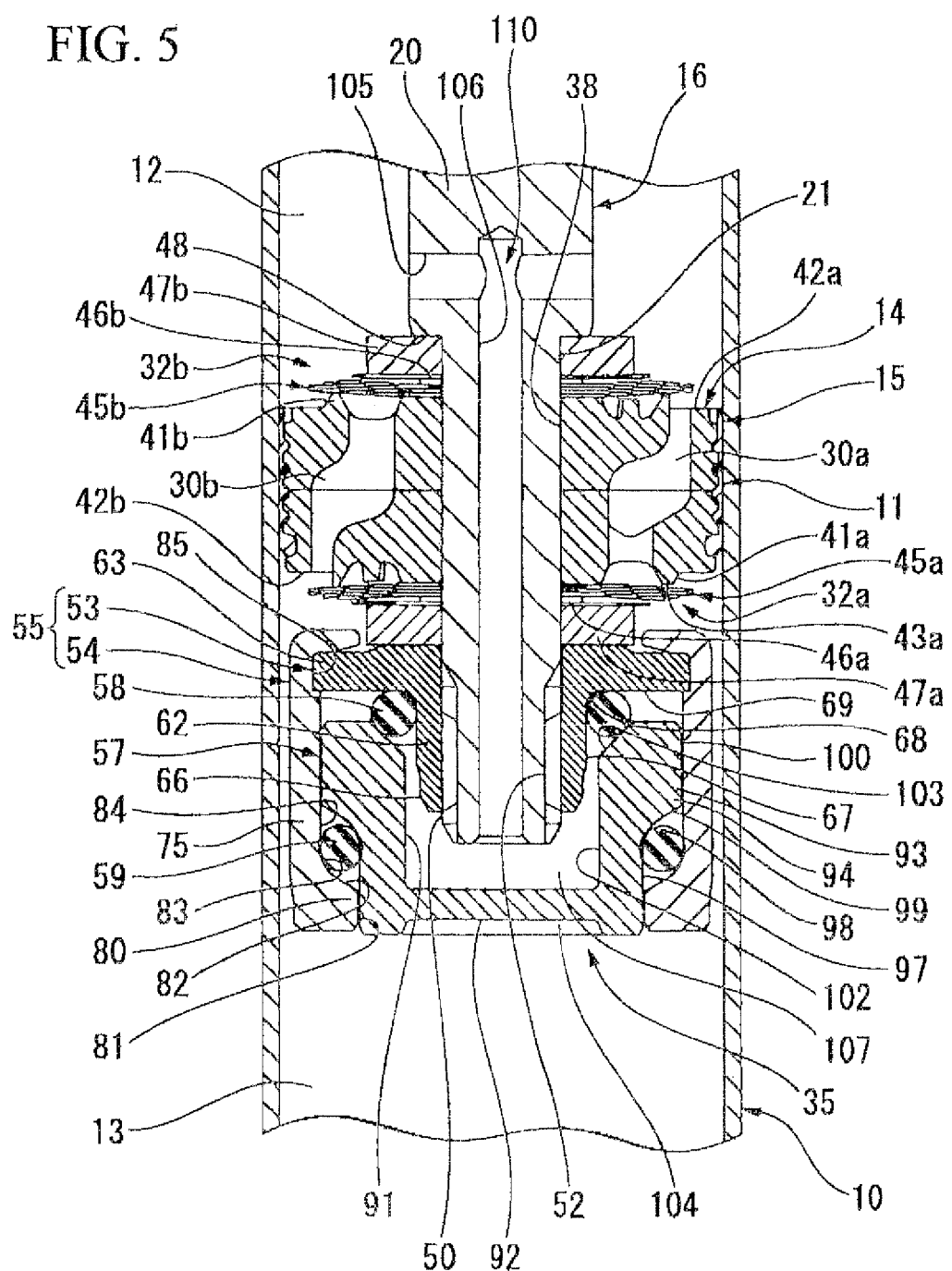
FIG. 5 is a cross-sectional view showing important parts of a shock absorber according to a second embodiment of the present invention.

The damping force varying mechanism 35 of the second embodiment is constructed so that a free piston 57 on the side of the piston bottom part 92 which protrudes outwardly beyond the housing 55 in an axial direction in a state that the free piston 57 is positioned at a neutral position by O-rings 58 and 59 (FIG. 5 shows a natural state). The O-ring 59 always blocks the communication between an upper chamber communicating chamber 107 and a lower chamber 13.

The damping force varying mechanism 35 of the second embodiment is constructed so that, when a piston speed is slow, if the operating frequency of a piston 11 becomes high, the pressure of an upper chamber 12 becomes high in the expansion stroke. As such, oil is caused to flow from the upper chamber 12 into the upper chamber communicating chamber 107 of the damping force varying mechanism 35 via passage holes 105 and 106 of a piston rod 16. In the meantime, the free piston 57 moves toward the lower chamber 13 against a biasing force of the O-ring 59 on the side of the axial lower chamber 13. In this way, as the free piston 57 moves toward the lower chamber 13, the oil flows from the upper chamber 12 into the upper chamber communicating chamber 107, and a flow rate of the oil that flows from the upper chamber 12 into passages 30a and then flows through the damping force generation mechanism 32a into the lower chamber 13 is reduced. Thereby, the oil easily flows in the damping force generation mechanism 32a, and thus the damping force is lowered.

In the following contraction stroke, since a pressure of the lower chamber 13 becomes high, the oil is caused to flow from the upper chamber communicating chamber 107 into the upper chamber 12 via the passage holes 105 and 106 of the piston rod 16. In the meantime, the free piston 57, which has moved toward the lower chamber 13 up to that time, moves toward the upper chamber 12 against a biasing force of the O-ring 58 on the side of the upper chamber 12. In this way, as the free piston 57 moves toward the upper chamber 12, an apparent volume of the lower chamber 13 increases, and a flow rate of the oil that flows from the lower chamber 13 into the passages 30b and then flows through the damping force generation mechanism 32b into the upper chamber 12 is reduced. Thereby, the oil easily flows in the damping force generation mechanism 32b, and thus the damping force is lowered.

In the damping force varying mechanism 35 of the second embodiment, operation of the O-rings 58 and 59 when the free piston 57 moves relative to the housing 55 is the same as in the first embodiment.

According to the second embodiment described above, it is possible to shorten the axial length of the damping force varying mechanism 35, and the weight of the damping force varying mechanism 35 is also reduced.

Third Embodiment

Figure 6A:
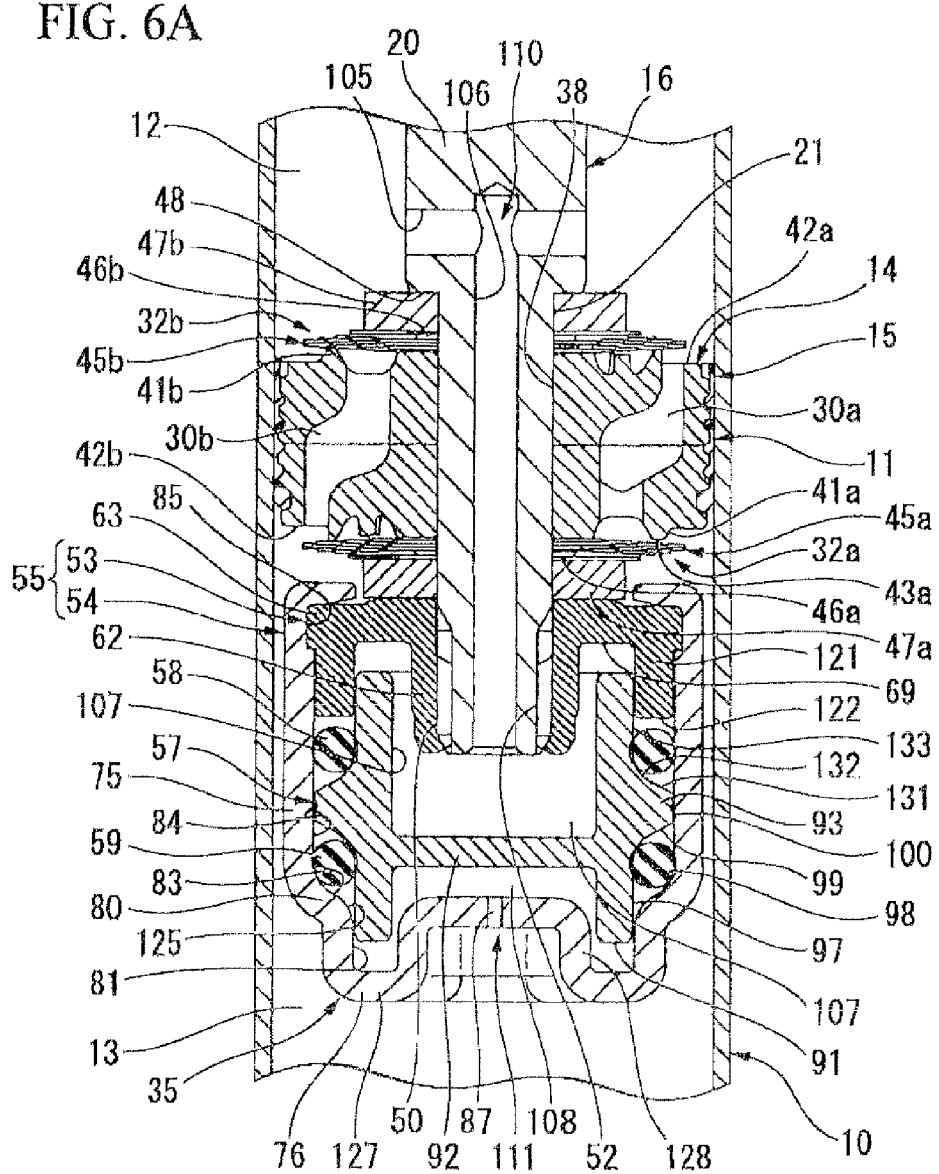
FIG. 6A is a cross-sectional view showing important parts of a shock absorber according to a third embodiment of the present invention.
Figure 6B:
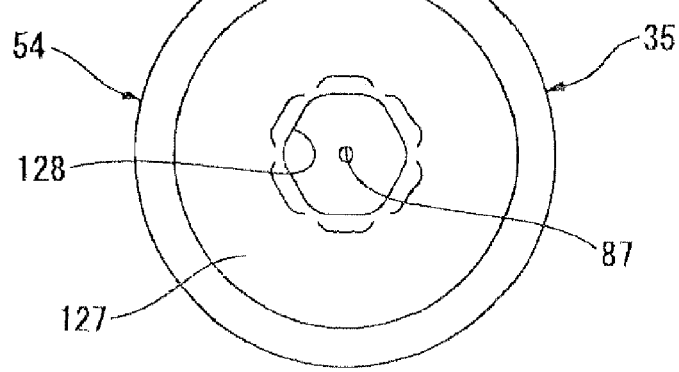
FIG. 6B is a bottom view showing a damping force varying mechanism of the shock absorber according to a third embodiment of the present invention.

Next, a third embodiment will be described focusing on portions different from those of the first embodiment mainly based on FIGS. 6A and 6B. Further, for parts that are in common with the first embodiment, the same names and reference numbers are used.

In the third embodiment, a damping force varying mechanism 35 is partially different from that of the first embodiment. That is, a lid member 53 that is partially different from that of the first embodiment is used. This lid member 53 is provided with a cylinder part (a housing-side annular protrusion) 121 on an outer circumference side of a lid flange part 63. A tip face part 122 of the cylinder part 121 which is opposite to the lid flange part 63 is provided along a direction perpendicular to the axis of the lid member 53.

In the third embodiment, a housing body 54 that is partially different from that of the first embodiment is used. First, the construction of a housing cylinder part 75 on the side of a housing bottom part 76 is different. The inner circumferential surface of an inner annular protrusion 80 of the housing cylinder part 75 is configured as a curved surface part (an inclined surface) 125 between a small-diameter cylindrical surface part 81 and a curved surface part 83. This curved surface part 125 is formed in an annular shape such that its diameter increases with the distance from the small-diameter cylindrical surface part 81, and is formed so that a cross section including the central axis of a housing body 54 has an arcuate shape.

Further, the housing body 54 is constructed so that the housing bottom part 76 is different from that of the first embodiment. The housing bottom part 76 is provided with a concave part 128 in the center thereof which is recessed toward the lid member 53 with respect to a bottom part body 127 on the side of the inner circumference thereof. The concave part 128 is formed in a lidded hexagonal cylindrical shape in which a cross section perpendicular to the axis of the housing body 54 has a hexagonal shape. When the damping force varying mechanism 35 is screwed up to the piston rod 16, a hexagonal wrench is fitted into the concave part 128. The housing bottom part 76 is provided with a communicating hole 87 in the center of a lid portion of the concave part 128.

Further, the housing body 54 is constructed to be formed mainly by pressing. As such, the housing body 54 has a curved surface part 125 between a small-diameter cylindrical surface part 81 and a curved surface part 83.

In the third embodiment, the free piston 57 that is partially different from that of the first embodiment is used. The free piston 57 of the third embodiment has a shape in which a piston cylinder part 91 further extends from a piston bottom part 92 in an axial direction.

The piston cylinder part 91 is provided with an outer annular protrusion (a piston-side annular protrusion) 93 of an annular shape, which protrudes outwardly in a radial direction, on an outer circumference thereof at an axial middle position thereof. A curved surface part 98, a tapered surface part 99, and a large-diameter cylindrical surface part 100 are sequentially formed on an outer circumferential surface of the outer annular protrusion 93 starting from the side of a lower chamber. Furthermore, a tapered surface part (an inclined surface) 131 and a curved surface part (an inclined surface) 132 are formed from the large-diameter cylindrical surface part 100. The tapered surface part 131 connected to the large-diameter cylindrical surface part 100 is configured so that its diameter decreases with the distance from the large-diameter cylindrical surface part 100. The curved surface part 132 connected to the tapered surface part 131 is formed in an annular shape such that its diameter decreases with the distance from the tapered surface part 131. A small-diameter cylindrical surface part 133 is connected to the curved surface part 132. The small-diameter cylindrical surface part 133 has the same diameter as a small-diameter cylindrical surface part 97. The curved surface part 132 is formed so that its cross section including a central axis of the free piston 57 has an arcuate shape. The curved surface parts 98 and 132, the tapered surface parts 99 and 131, and the large-diameter cylindrical surface part 100 are formed on the outer annular protrusion 93. The outer annular protrusion 93 of the third embodiment is symmetrical with respect to a plane going through the axial middle position thereof.

The free piston 57 is slidably fitted in a large-diameter cylindrical surface part 84 of the housing body 54 at the large-diameter cylindrical surface part 100, a small-diameter cylindrical surface part 81 of the housing body 54 at the small-diameter cylindrical surface part 97, and a cylinder part 121 of the lid member 53 at the small-diameter cylindrical surface part 133. In this state, a position of the curved surface part 125 of the housing body 54 and a position of the curved surface part 98 of the free piston 57 are superimposed on each other in radial directions thereof. That is, all of the curved surface part 83 and the curved surface part 125 of the housing body 54, and the curved surface part 98 and the tapered surface part 99 of the free piston 57 are opposite to each other in a moving direction of the free piston 57. Further, a position of the tip face part 122 of the cylinder part 121 of the lid member 53 and a position of the tapered surface part 131 and the curved surface part 132 of the free piston 57 are superimposed on each other in radial directions thereof. That is, the tip face part 122 of the cylinder part 121 and the tapered surface part 131 and the curved surface part 132 of the free piston 57 are opposite to each other in the moving direction of the free piston 57.

Thus, an O-ring 59 (FIG. 6 shows a natural state) is disposed between the tapered surface part 99, the curved surface part 98 and the small-diameter cylindrical surface part 97 of the free piston 57 and the curved surface part 125, the curved surface part 83 and the large-diameter cylindrical surface part 84 of the housing body 54, as in the first embodiment.

In the third embodiment, an O-ring 58 (FIG. 6 shows a natural state) is disposed between the large-diameter cylindrical surface part 84 of the housing body 54, the tip face part 122 of the lid member 53, and the tapered surface part 131, the curved surface part 132 and the small-diameter cylindrical surface part 133 of the free piston 57. When the O-ring 58 is also in the natural state like the O-ring 59, its inner diameter is smaller than an outer diameter of the small-diameter cylindrical surface part 133 of the free piston 57, and its outer diameter is greater than an inner diameter of the large-diameter cylindrical surface part 84 of the housing body 54. That is, the O-ring 58 is also fitted in interference with both the free piston 57 and the housing body 54 in a radial direction.

Both of the O-rings 58 and 59 have the same size. Both of the O-rings 58 and 59 maintain the free piston 57 within a predetermined neutral range with respect to the housing 55, and allow the free piston 57 to axially move toward both of the axial upper and lower chambers 12 and 13 relative to the housing 55.

Accordingly, in the free piston 57 of the third embodiment, the O-ring 58 is in contact with the small-diameter cylindrical surface part 133, the curved surface part 132 and the tapered surface part 131. The curved surface part 132 and the tapered surface part 131 are inclined to the moving direction of the free piston 57. Further, in the housing 55, the O-ring 58 is in contact with the large-diameter cylindrical surface part 84 and the tip face part 122.

In other words, the outer annular protrusion 93 is provided on the outer circumference of the free piston 57. Axially opposite surfaces of the outer annular protrusion 93 constitute the curved surface part 98 and the tapered surface part 99, and the curved surface part 132 and the tapered surface part 131, respectively. The inner annular protrusion 80 and the cylinder part 121 are provided on opposite sides of the outer annular protrusion 93 of the inner circumference of the housing 55. The inner annular protrusion 80 constitutes the curved surface part 125 and the curved surface part 83. The cylinder part 121 protrudes inwardly from the housing 55 in an annular shape, and constitutes the tip face part 122. The O-ring 59 and the O-ring 58 are interposed between the outer annular protrusion 93 and the inner annular protrusion 80 and between the outer annular protrusion 93 and the cylinder part 121, respectively.

The damping force varying mechanism 35 of the third embodiment is assembled by inserting the O-ring 59 into the housing body 54 up to a position of the curved surface 83, fitting the free piston 57 into the inside of the housing body 54 and the O-ring 59, forcibly fitting the O-ring 58 between the free piston 57 and the housing body 54, fitting the cylinder part 121 between the free piston 57 and the housing body 54, and fixing the lid member 53 to the housing body 54.

The O-ring 58 disposed between the housing body 54 and the free piston 57 is disposed to seal between the housing 55 and the free piston 57, and always blocks the communication between an upper chamber communicating chamber 107 and a lower chamber communicating chamber 108.

In the damping force varying mechanism 35 of the third embodiment, the O-rings 58 and 59 located between the housing body 54 and the free piston 57 are positioned between the large-diameter cylindrical surface part 84 of the housing body 54 and the small-diameter cylindrical surface part 97 of the free piston 57 and between the large-diameter cylindrical surface part 84 of the housing body 54 and the small-diameter cylindrical surface part 133 of the free piston 57 at a neutral position of the free position 57.

For example, in the expansion stroke, when the free piston 57 moves from this neutral position toward the lower chamber 13 relative to the housing 55, the large-diameter cylindrical surface part 84 of the housing 55 and the small-diameter cylindrical surface part 97 of the free piston 57 mutually roll the O-ring 59, and move the O-ring 59 toward the lower chamber 13 relative to the housing 55, as in the first embodiment. Afterwards, the curved surface part 83 and the curved surface part 125 of the housing 55 on the side of the axial upper chamber 12 and the curved surface part 98 and the tapered surface part 99 of the free piston 57 on the side of the axial lower chamber 13 roll the O-ring 59, and simultaneously compress the O-ring 59 in the axial and radial directions of the free piston 57. Then, the curved surface part 83 and the curved surface part 125 of the housing 55 on the side of the lower chamber 13 and the curved surface part 98 and the tapered surface part 99 of the free piston 57 on the side of the upper chamber 12 compress the O-ring 59 in the axial and radial directions of the free piston 57. Meanwhile, in the second embodiment, in the expansion stroke, when the free piston 57 moves from this neutral position toward the lower chamber 13 relative to the housing 55, the large-diameter cylindrical surface part 84 of the housing 55 and the small-diameter cylindrical surface part 133 of the free piston 57 mutually roll the O-ring 58, and move the O-ring 58 toward the lower chamber 13 relative to the housing 55.

In the following contraction stroke, when the free piston 57 moves toward the axial upper chamber 12 relative to the housing 55, the curved surface part 83 and the curved surface part 125 of the housing 55 on the side of the lower chamber 13 and the curved surface part 98 and the tapered surface part 99 of the free piston 57 on the side of the upper chamber 12 release the compression of the O-ring 59, as in the first embodiment. Then, the curved surface part 83 and the curved surface part 125 of the housing 55 on the side of the upper chamber 12 and the curved surface part 98 and the tapered surface part 99 of the free piston 57 on the side of the lower chamber 13 roll the O-ring 59, and at the same time, further release the compression of the O-ring 59. Continuously, the large-diameter cylindrical surface part 84 of the housing 55 and the small-diameter cylindrical surface part 97 of the free piston 57 mutually roll the O-ring 59, and simultaneously move the O-ring 59 toward the upper chamber 12 relative to the housing 55. Meanwhile, in the second embodiment, in the contraction stroke, when the free piston 57 moves toward the upper chamber 12 relative to the housing 55, the large-diameter cylindrical surface part 84 of the housing 55 and the small-diameter cylindrical surface part 133 of the free piston 57 mutually roll the O-ring 58, and move the O-ring 58 toward the upper chamber 12 relative to the housing 55. Afterwards, the free piston 57 compresses the O-ring 58 in the axial and radial directions of the free piston 57 by means of the large-diameter cylindrical surface part 84 and the tip face part 122 of the housing 55 and the tapered surface part 131 and the curved surface part 132 of the free piston 57.

At this time, a region where the O-ring 58 is rolled between the large-diameter cylindrical surface part 84 of the housing 55 and the small-diameter cylindrical surface part 133 of the free piston 57 is a rolling region where the O-ring 58 is rolled at a position separated from a downstream side end within a moving region of the free piston 57. Further, at the position separated from the downstream side end, the rolling region is a moving region where the O-ring 58 moves in a moving direction of the free piston 57 in the state where the O-ring 58 is in contact with both the housing 55 and the free piston 57. The term "moving" is defined that at least a downstream end position (a lower end position in FIG. 6) of the O-ring 58 in the moving direction of the free piston is changed.

A region where the O-ring 58 is compressed between the tip face part 122 of the housing 55 and the curved surface part 132 and the tapered surface part 131 of the free piston 57 is a moving direction deformation region where the O-ring 58 undergoes elastic deformation in the moving direction of the free piston 57 on the downstream side end within the moving region of the free piston 57. The term "elastic deformation in the moving direction deformation region" is defined as deformation when an upstream end position (a lower end position in FIG. 6) of the O-ring 58 in the moving direction of the free piston is changed but a downstream end position is not changed. In this embodiment, the rolling region and the moving region are partially overlapped on the moving direction deformation region.

In the expansion stroke following the foregoing, the tip face part 122 of the housing 55, and the tapered surface part 131 and the curved surface part 132 of the free piston 57 release the compression of the O-ring 58. The large-diameter cylindrical surface part 84 of the housing 55 and the small-diameter cylindrical surface part 133 of the free piston 57 mutually roll the O-ring 58, and move the O-ring 58 toward the axial lower chamber 13 relative to the housing 55. Even in the case of the O-ring 59, the large-diameter cylindrical surface part 84 of the housing 55 and the small-diameter cylindrical surface part 97 of the free piston 57 mutually roll the O-ring 59, and move the O-ring 59 toward the axial lower chamber 13 relative to the housing 55. Thus, when the free piston 57 passes through its neutral position, it operates the O-rings 58 and 59 in the same way as described above.

According to the third embodiment described above, axially opposite surfaces of the outer annular protrusion 93 provided on the outer circumference of the free piston 57 constitute the curved surface part 98 and the tapered surface part 99, and the tapered surface part 131 and the curved surface part 132, respectively. The inner annular protrusion 80 having the curved surface parts 83 and 125 and the cylinder part 121 having the tip face part 122 are provided on opposite sides of the outer annular protrusion 93 of the inner circumference of the housing 55. The O-ring 58 and the O-ring 59 are interposed between the outer annular protrusion 93 and the cylinder part 121 and between the outer annular protrusion 93 and the inner annular protrusion 80, respectively. As such, it is possible to commonalize the O-rings 58 and 59.

Since the concave part 128 into which a hexagonal wrench is fitted is formed in the housing 55 of the damping force varying mechanism 35, the workability when the damping force varying mechanism 35 is screwed up to the piston rod 16 is improved.

Further, in the third embodiment, a coil spring may be disposed between the lid flange part 63 of the lid member 53 and the piston bottom part 92 of the free piston 57, and another coil spring may be disposed between the bottom part body 127 of the housing body 54 and the piston bottom part 92 of the free piston 57, thereby the free piston 57 is held at its neutral position. With this construction, even when the stroke of the free piston 57 increases, it is easy to hold the free piston 57 at its neutral position. Meanwhile, in the other embodiments, the coil spring(s) may be provided.

Figure 7A:
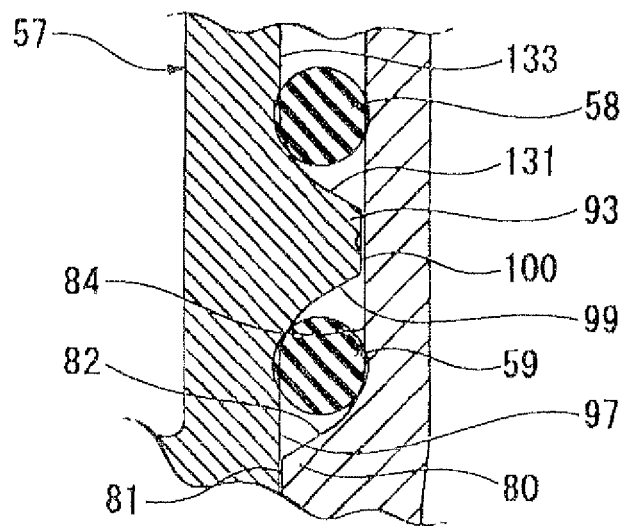
FIG. 7A is a cross-sectional view showing a modification of the important parts of the shock absorber according to a third embodiment of the present invention.

Further, as shown in FIG. 7A, only the tapered surface parts 99 and 131 may be provided on the axially opposite sides of the outer annular protrusion 93 of the free piston 57, or only the tapered surface part 82 may be provided between the small-diameter cylindrical surface parts 81 and large-diameter cylindrical surface parts 84 of the inner annular protrusion 80 of the housing body 54 (in FIG. 7A, the O-rings 58 and 59 are in a natural state).

Figure 7B:
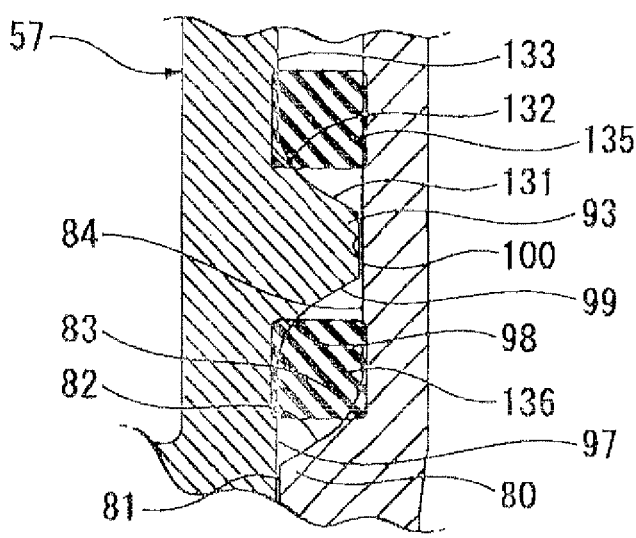
FIG. 7B is a cross-sectional view showing another modification of the important parts of the shock absorber according to a third embodiment of the present invention.

Further, as shown in FIG. 7B, in the natural state, angled rings 135 and 136 (in FIG. 7B, shown in the natural state), whose cross sections including a central axis have a quadrilateral shape, may be provided instead of the O-rings 58 and 59. Even in this case, the angled rings 135 and 136 are constructed to cause interference with the free piston 57 and the housing 55 in a radial direction.

Figure 7C:
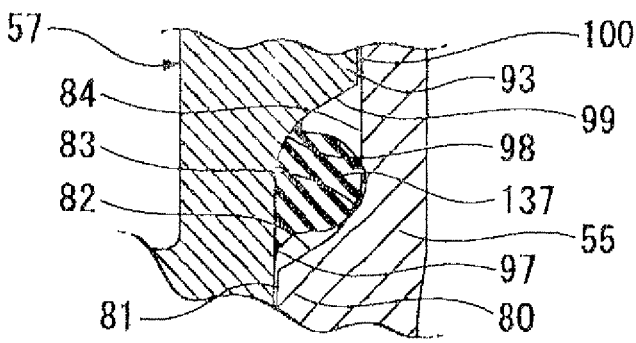
FIG. 7C is a cross-sectional view showing another modification of the important parts of the shock absorber according to a third embodiment of the present invention.

In addition, as shown in FIG. 7C, a seal ring 137 may be fused and adhered to the free piston 57. With this construction, the number of components is reduced, and it is easy to manage the components. Meanwhile, even when the seal ring 137 is adhered to the housing 55, the same effect is obtained. Further, this can be applied to the O-rings 58 and 59 of the first embodiment.

Fourth Embodiment

Next, a fourth embodiment will be described focusing on portions different from those of the first and third embodiments mainly based on FIG. 8. Further, for parts that are in common with the first and third embodiments, the same names and reference numbers are used.

In the fourth embodiment as well, a damping force varying mechanism 35 is partially different from those of the first and third embodiments. That is, in the damping force varying mechanism 35 of the fourth embodiment, a lid member 53 and a free piston 57 are used which are identical to those of the third embodiment. In the damping force varying mechanism 35 of the fourth embodiment, a housing body 54 is partially different from that of the first embodiment.

In the housing body 54, a housing bottom part 76 is provided with an extending shaft part 141 in the center thereof which extends in an axial direction opposite a housing cylinder part 75. The housing bottom part 76 and the extending shaft part 141 are provided with a communicating hole 87 in the center thereof which passes through in an axial direction. On the side of the housing bottom part 76 of the extending shaft part 141 configures a pedestal part 142 having a large diameter. The extending shaft part 141 is made up of an attaching shaft part 143, which is a portion excluding the pedestal part 142 and has a smaller diameter than the pedestal part 142. A male thread 144 is formed on the opposite side of the attaching shaft part 143 from the pedestal part 142.

The free piston 57 that is identical to that of the third embodiment is disposed in the housing body 54. An O-ring 59 (FIG. 8 shows a natural state) is disposed between the tapered surface part 99, the curved surface part 98 and the small-diameter cylindrical surface part 97 of the free piston 57 and the tapered surface part 82, the curved surface part 83 and the large-diameter cylindrical surface part 84 of the housing body 54, as in the third embodiment.

Figure 8:
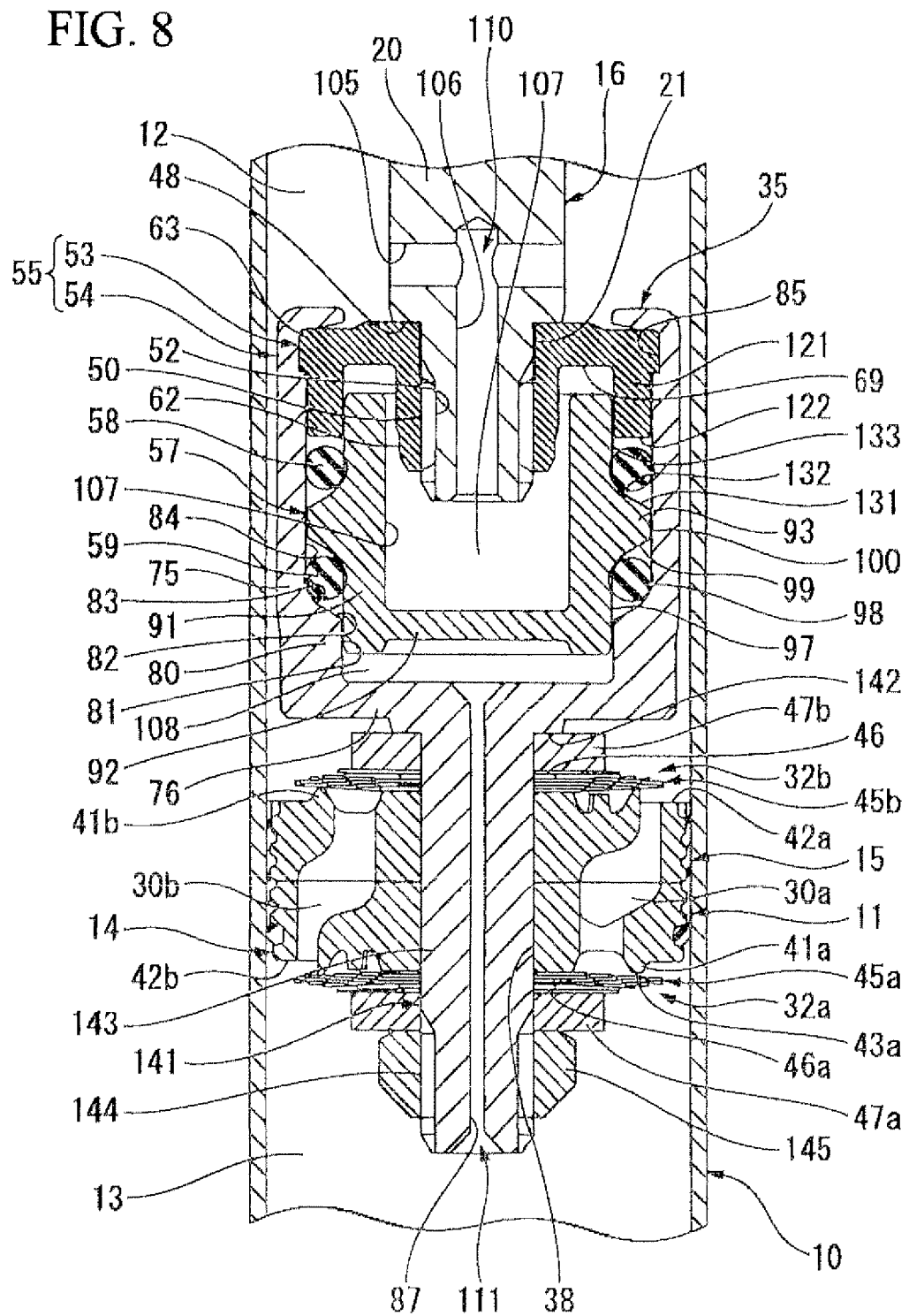
FIG. 8 is a cross-sectional view showing important parts of a shock absorber according to a fourth embodiment of the present invention.

An O-ring 58 (FIG. 8 shows a natural state) is disposed between the large-diameter cylindrical surface part 84 of the housing body 54, the tip face part 122 of the cylinder part 121 of the lid member 53, and the tapered surface part 131, the curved surface part 132 and the small-diameter cylindrical surface part 133 of the free piston 57, as in the third embodiment.

In the fourth embodiment, the attaching shaft part 21 of the piston rod 16 is adapted to have a short axial length. The damping force varying mechanism 35 is screwed to a male thread 50 of the attaching shaft part 21 to come into contact with a shaft step part 48. That is, a piston body 14 is not attached to the piston rod 16. Thus, a damping force generation mechanism 32b, the piston body 14, and a damping force generation mechanism 32a are attached to the attaching shaft part 143 of the damping force varying mechanism 35 by a nut 145. That is, in the state where a valve regulating member 47b of the damping force generation mechanism 32b comes into contact with the pedestal part 142, and where a valve regulating member 47a of the damping force generation mechanism 32a comes into contact with the nut 145, the damping force generation mechanism 32b, the piston body 14, and the damping force generation mechanism 32a are held between the pedestal part 142 and the nut 145.

In the damping force varying mechanism 35 of the fourth embodiment, when the free piston 57 moves relative to the housing 55, operation of the O-rings 58 and 59 is the same as that in the third embodiment.

Fifth Embodiment

Next, a fifth embodiment will be described focusing on portions different from those of the first embodiment mainly based on FIG. 9. Further, for parts that are in common with the first embodiment, the same names and reference numbers are used.

In the fifth embodiment, a damping force varying mechanism 35 is partially different from that of the first embodiment. That is, in the damping farce varying mechanism 35 of the fifth embodiment, a lid member 53 that is identical to that of the first embodiment is used, and a housing body 54 and a free piston 57 that are partially different from those of the first embodiment are used.

A cylindrical surface part 151, a curved surface part (an inclined surface) 152, a curved surface part (an inclined surface) 153, and a cylindrical surface part 154 are formed on the inner circumference of a housing cylinder part 75 of the housing body 54 starting from the side of a housing bottom part 76. The cylindrical surface part 151 has a constant diameter. The curved surface part 152 connected to the cylindrical surface part 151 is formed in an annular shape such that its diameter increases with the distance from the cylindrical surface part 151. The curved surface part 153 connected to the curved surface part 152 is formed in an annular shape such that its diameter decreases with the distance from the curved surface part 152. The cylindrical surface part 154 connected to the curved surface part 153 has a constant diameter that is equal to that of the cylindrical surface part 151. The curved surface parts 152 and 153 have a continuous shape, and are formed so that their cross sections including a central axis of the housing body 54 have an arcuate shape. The cylindrical surface part 151 and the curved surface part 152 on the side of the lower chamber 13 are formed on an inner annular protrusion (a housing-side annular protrusion) 155 that protrudes inwardly in a radial direction. The cylindrical surface part 154 and the curved surface part 153 on the side of the upper chamber 12 are formed on an inner annular protrusion (a housing-side annular protrusion) 156 that protrudes inwardly in a radial direction.

A cylindrical surface part 161, a curved surface part (an inclined surface) 162, a curved surface part (an inclined surface) 163, and a cylindrical surface part 164 are sequentially formed on the outer circumferential surface of a piston cylinder part 91 of the free piston 57 starting from the side of a piston bottom part 92. The cylindrical surface part 161 has a constant diameter. The curved surface part 162 connected to the cylindrical surface part 161 is formed in an annular shape such that its diameter decreases with the distance from the cylindrical surface part 161. The curved surface part 163 connected to the curved surface part 162 is formed in an annular shape such that its diameter increases with the distance from the curved surface part 162. The cylindrical surface part 164 connected to the curved surface part 163 has a constant diameter that is equal to that of the cylindrical surface part 161. The curved surface parts 162 and 163 have a continuous shape, and are formed so that their cross sections including a central axis of the free piston 57 have an arcuate shape. The cylindrical surface part 161 and the curved surface part 162 on the side of the lower chamber 13 are formed on an outer annular protrusion (a free piston-side annular protrusion) 165 that protrudes outwardly in a radial direction. The cylindrical surface part 164 and the curved surface part 163 on the side of the upper chamber 12 are formed on an outer annular protrusion (a free piston-side annular protrusion) 166 that protrudes outwardly in a radial direction. The curved surface parts 162 and 163 of the free piston 57 and the curved surface parts 152 and 153 of the housing body 54 are formed with the same curvature.

Figure 9:
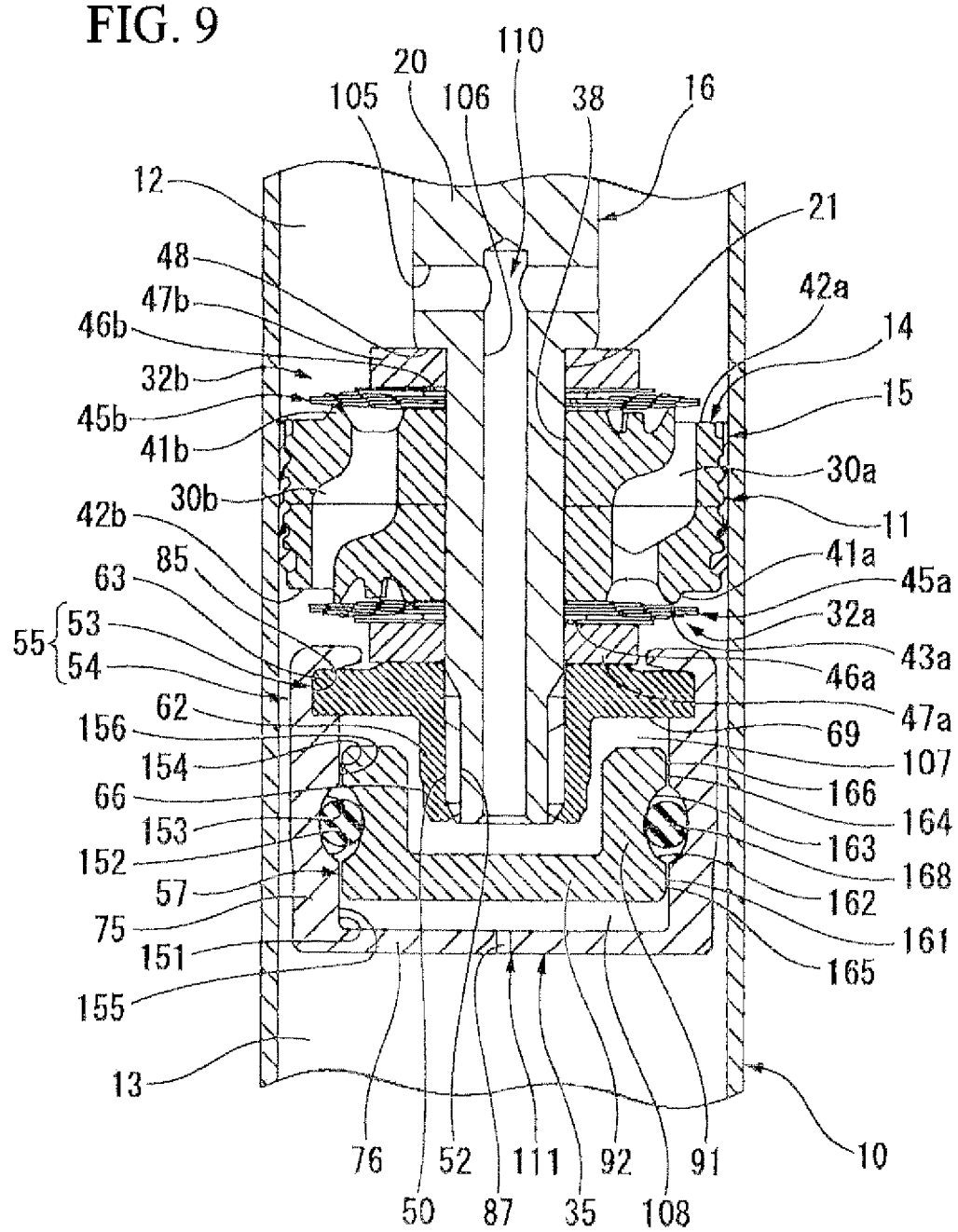
FIG. 9 is a cross-sectional view showing important parts of a shock absorber according to a fifth embodiment of the present invention.

In the damping force varying mechanism 35, only one O-ring (an elastic body, FIG. 9 shows a natural state) 168 is disposed between the curved surface parts 162 and 163 of the free piston 57 and the curved surface parts 152 and 153 of the housing body 54. In a natural state, the O-ring 168 is constructed so that its cross section including a central axis has a circular shape, and it has an inner diameter smaller than the smallest diameter of the curved surface parts 162 and 163 of the free piston 57, and an outer diameter greater than the largest diameter of the curved surface parts 152 and 153 of the housing body 54. That is, the O-ring 168 is fitted in interference with both the free piston 57 and the housing body 54 in a radial direction. The O-ring 168 maintains the free piston 57 at a neutral position with respect to the housing 55. Simultaneously, the O-ring 168 allows the free piston 57 to axially move toward both the upper chamber 12 and the lower chamber 13 relative to the housing 55, and undergoes compressive deformation against the bidirectional movement of the free piston 57. Further, the radii of curvature of the curved surface parts 152, 153, 162 and 163 are greater than a cross-sectional radius of the O-ring 168 having a circular cross section.

Accordingly, in the housing 55, the O-ring 168 is in contact with the curved surface parts 152 and 153. The curved surface parts 152 and 153 are inclined to a moving direction of the free piston 57. Further, in the free piston 57, the O-ring 168 is in contact with the curved surface parts 162 and 163. The curved surface parts 162 and 163 are inclined to the moving direction of the free piston 57.

The damping force varying mechanism 35 may be assembled by disposing the O-ring 168 on the curved surface part 153 in the housing body 54, fitting the free piston 57 into the inside of the housing body 54 and the O-ring 168, fitting the lid member 53 into the housing body 54, and swaging the housing body 54.

In the damping force varying mechanism 35 of the fifth embodiment, an upper chamber communicating chamber 107 that communicates with the upper chamber 12 via passage holes 105 and 106 of the piston rod 16 and a lower chamber communicating chamber 108 that communicates with the lower chamber 13 via a communicating hole 87 of the housing bottom part 76 are partitioned by the housing 55, the O-ring 168, and the free piston 57.

In the damping force varying mechanism 35 of the fifth embodiment, the O-ring 168 is positioned between the curved surface parts 152 and 153 of the housing body 54 and the curved surface parts 162 and 163 of the free piston 57 at a neutral position of the free position 57. For example, in the expansion stroke, when the free piston 57 moves from the neutral position toward the lower chamber 13, the curved surface part 152 of the housing body 54 on the side of the lower chamber 13 and the curved surface part 163 of the free piston 57 on the side of the upper chamber 12 roll the O-ring 168, and simultaneously compress the O-ring 168 in axial and radial directions of the free piston 57.

In the following contraction stroke, when the free piston 57 moves toward the upper chamber 12, the curved surface part 152 of the housing body 54 on the side of the lower chamber 13 and the curved surface part 163 of the free piston 57 on the side of the upper chamber 12 roll the O-ring 168, and simultaneously release the Compression of the O-ring 168. Then, the curved surface part 153 of the housing body 54 on the side of the upper chamber 12 and the curved surface part 162 of the free piston 57 on the side of the lower chamber 13 roll the O-ring 168, and simultaneously compress the O-ring 168 in axial and radial directions of the free piston 57.

In the following expansion stroke, the curved surface part 153 of the housing body 54 on the side of the upper chamber 12 and the curved surface part 162 of the free piston 57 on the side of the lower chamber 13 roll the O-ring 168, and simultaneously release the compression of the O-ring 168. When the free piston 57 passes through its neutral position, the curved surface part 152 of the housing body 54 on the side of the lower chamber 13 and the curved surface part 163 of the free piston 57 on the side of the upper chamber 12 roll the O-ring 168, and simultaneously compress the O-ring 168 in axial and radial directions of the free piston 57 in the same way as described above.

According to the fifth embodiment described above, since the O-ring 168 undergoes compressive deformation against the bidirectional movement of the free piston 57, it is possible to cope with the bidirectional movement of the free piston 57 using one O-ring 168.

Sixth Embodiment

Next, a sixth embodiment will be described focusing on portions different from those of the first embodiment mainly based on FIG. 10. Further, for parts that are in common with the first embodiment, the same names and reference numbers are used.

In the sixth embodiment, a damping force varying mechanism 35 is partially different from that of the first embodiment. That is, in the damping force varying mechanism 35 of the sixth embodiment, a housing body 54 that is identical to that of the first embodiment is used, and a lid member 53 and a free piston 57 that are partially different from those of the first embodiment are used.

The lid member 53 has a lid cylinder part 62 that is different from that of the first embodiment. The lid cylinder part 62 is provided with an outer annular protrusion (a housing-side annular protrusion) 171, which protrudes outwardly in a radial direction, on the side of a lid flange part 63 thereof. A small-diameter cylindrical surface part 172, a curved surface part (an inclined surface) 173, a tapered surface part (an inclined surface) 174, and a large-diameter cylindrical surface part 175 are sequentially formed on an outer circumferential surface of the lid cylinder part 62 starting from the opposite side thereof from the lid flange part 63. The small-diameter cylindrical surface part 172 has a constant diameter. The curved surface part 173 connected to the small-diameter cylindrical surface part 172 is formed in an annular shape such that its diameter increases with the distance from the small-diameter cylindrical surface part 172. The tapered surface part 174 connected to the curved surface part 173 is configured so that its diameter increases with the distance from the curved surface part 173. The large-diameter cylindrical surface part 175 connected to the tapered surface part 174 has a constant diameter that is greater than a diameter of the small-diameter cylindrical surface part 172. The curved surface part 173, the tapered surface part 174, and the large-diameter cylindrical surface part 175 are formed on the outer annular protrusion 171. The curved surface part 173 is formed so that its cross section including a central axis of the lid member 53 has an arcuate shape.

The free piston 57 has a piston cylinder part 91 that is partially different from that of the first embodiment. The piston cylinder part 91 is provided with an inner annular protrusion (a free piston-side annular protrusion) 181 that protrudes inwardly in a radial direction, in addition to an outer annular protrusion 93 that protrudes outwardly in a radial direction at an axial middle position thereof. A small-diameter cylindrical surface part 182, a tapered surface part (an inclined surface) 183, a curved surface part (an inclined surface) 184, and a large-diameter cylindrical surface part 185 are sequentially formed on an inner circumferential surface of the piston cylinder part 91 starting from the side of a piston bottom part 92. The small-diameter cylindrical surface part 182 has a constant diameter. The tapered surface part 183 connected to the small-diameter cylindrical surface part 182 is formed so that its diameter increases with the distance from the small-diameter cylindrical surface part 182. The curved surface part 184 connected to the tapered surface part 183 is formed in an annular shape such that its diameter increases with the distance from the tapered surface part 183. The large-diameter cylindrical surface part 185 connected to the curved surface part 184 has a constant diameter that is greater than a diameter of the small-diameter cylindrical surface part 182. The curved surface part 184 is formed so that its cross section including a central axis of the free piston 57 has an arcuate shape. The curved surface part 184, the tapered surface part 183, and the large-diameter cylindrical surface part 185 are formed on the inner annular protrusion 181. The piston cylinder part 91 is provided with a tapered surface part 186, whose diameter decreases with the distance from a large-diameter cylindrical surface part 100, on an outer circumferential surface thereof on the opposite side of the large-diameter cylindrical surface part 100 from a tapered surface part 99.

The free piston 57 is slidably fitted in a small-diameter cylindrical surface part 81 of the housing body 54 at the small-diameter cylindrical surface part 97, and a large-diameter cylindrical surface part 84 of the housing body 54 at the large-diameter cylindrical surface part 100. In this state, a position of the tapered surface part 174 of the lid member 53 and a position of the curved surface part 184 of the free piston 57 are superimposed on each other in radial directions thereof. Further, in this state, a position of the curved surface part 173 of the lid member 53 and a position of the tapered surface part 183 of the free piston 57 are superimposed an each other in radial directions thereof. That is, both the curved surface part 173 and the tapered surface part 174 of the lid member 53, and both the tapered surface part 183 and the curved surface part 184 of the free piston 57 are opposite to each other in a moving direction of the free piston 57. Furthermore, the tapered surface part 174 of the lid member 53 and the tapered surface part 183 of the free piston 57 are inclined to the axes thereof at the same angle. The curved surface part 184 of the free piston 57 has the same cross-sectional curvature as that of the curved surface part 173 of the lid member 53. Furthermore, the curved surface parts 173 and 184 have the radii of curvature that are greater than a cross-sectional radius of the O-ring 58 having a circular cross section.

Figure 10:
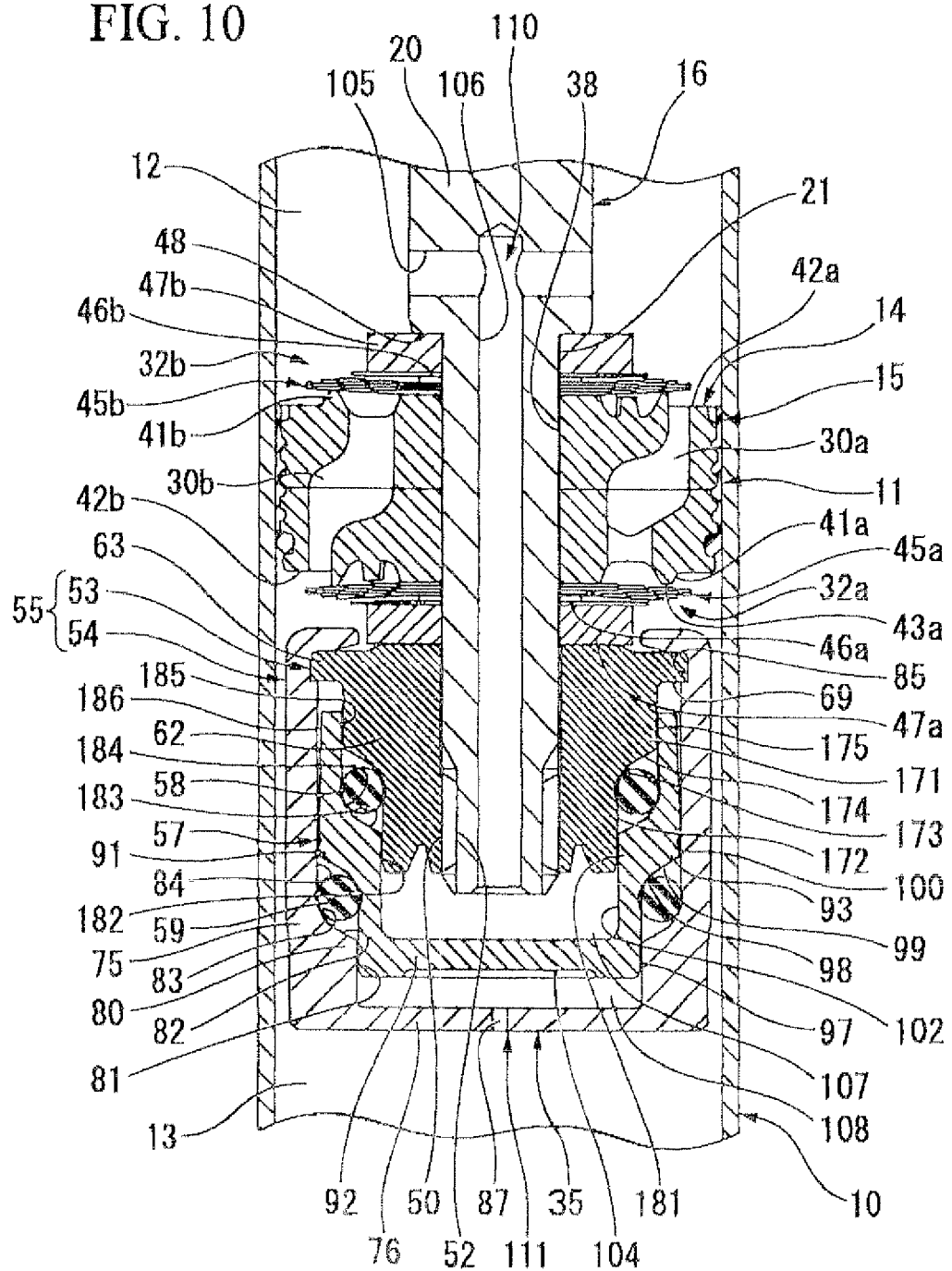
FIG. 10 is a cross-sectional view showing important parts of a shock absorber according to a sixth embodiment of the present invention.

Thus, the O-ring 58 (FIG. 10 shows a natural state) is disposed between the tapered surface part 183, the curved surface part 184 and the large-diameter cylindrical surface part 185 of the free piston 57 and the tapered surface part 174, the curved surface part 173 and the small-diameter cylindrical surface part 172 of the lid member 53. In a natural state, the O-ring 58 is configured so that its cross section including a central axis has a circular shape, and it has a smaller inner diameter than the small-diameter cylindrical surface part 172 of the lid member 53, and a greater outer diameter than the large-diameter cylindrical surface part 185 of the free piston 57. That is, the O-ring 58 is fitted in interference with both the free piston 57 and the lid member 53 in a radial direction.

Accordingly, in the free piston 57, the O-ring 58 is in contact with the tapered surface part 183, the curved surface part 184, and the large-diameter cylindrical surface part 185. The tapered surface part 183 and the curved surface part 184 are inclined to the moving direction of the free piston 57.

In the housing 55, the O-ring 58 is in contact with the small-diameter cylindrical surface part 172, the curved surface part 173, and the tapered surface part 174. The curved surface part 173 and the tapered surface part 174 are inclined to the moving direction of the free piston 57.

The shortest distance between a free piston contact surface (a portion where the large-diameter cylindrical surface part 185, the curved surface part 184 and the tapered surface part 183 of the free piston 57 are in contact with the O-ring 58) and a housing contact surface (a portion where the small-diameter cylindrical surface part 172, the curved surface part 173 and the tapered surface part 174 of the housing 55 are in contact with the O-ring 58), each of which is in contact with the O-ring 58, is changed by the movement of the free piston 57. When the shortest distance is reduced, an inclined angle of a segment representing the shortest distance increases. In other words, shapes of the large-diameter cylindrical surface part 185, the curved surface part 184, and the tapered surface part 183 and shapes of the small-diameter cylindrical surface part 172, the curved surface part 173, and the tapered surface part 174 are set so that a direction of the segment representing the shortest distance between the free piston contact surface of the free piston 57 and the housing contact surface of the housing 55 is changed. In detail, when the free piston 57 is positioned on the side of the lower chamber 13 with respect to the housing 55, the shortest distance between the free piston contact surface and the housing contact surface, each of which is in contact with the O-ring 58, is a difference in radius between the large-diameter cylindrical surface part 185 and the small-diameter cylindrical surface part 172, and the inclined angle of the segment representing the shortest distance is 0 (zero). When the free piston 57 moves toward the upper chamber 12 relative to the housing 55, the contact position of the O-ring 58 is moved to the curved surface part 173 and the curved surface part 184, and the shortest distance therebetween is gradually reduced, and simultaneously the inclined angle of the segment representing the shortest distance increases.

In the damping force varying mechanism 35 of the sixth embodiment, an O-ring 59 operates in the same way as in the first embodiment.

At a neutral position of the free piston 57, the O-ring 58 is located between the large-diameter cylindrical surface part 185 of the housing 55 and the small-diameter cylindrical surface part 172 of the free piston 57.

For example, in the expansion stroke, when the free piston 57 moves from the neutral position toward the lower chamber 13, the large-diameter cylindrical surface part 185 of the housing 55 and the small-diameter cylindrical surface part 172 of the free piston 57 roll the O-ring 58, and thus move the O-ring 58 toward the lower chamber 13 relative to the housing 55.

In the following contraction stroke, when the free piston 57 moves toward the upper chamber 12, the large-diameter cylindrical surface part 185 of the housing 55 and the small-diameter cylindrical surface part 172 of the free piston 57 roll the O-ring 58, and thus move the O-ring 58 toward the upper chamber 12 relative to the housing 55. Afterwards, the tapered surface part 183 and the curved surface part 184 on the side of the upper chamber 12 and the curved surface part 173 and the tapered surface part 174 on the side of the lower chamber 13 roll and compress the O-ring 58. Further, the tapered surface part 183 and the curved surface part 184 on the side of the lower chamber 13 and the curved surface part 173 and the tapered surface part 174 on the side of the upper chamber 12 compress the O-ring 58.

In the following expansion stroke, the tapered surface part 183 and the curved surface part 184 on the side of the lower chamber 13 and the curved surface part 173 and the tapered surface part 174 on the side of the upper chamber 12 release the compression of the O-ring 58. The tapered surface part 183 and the curved surface part 184 on the side of the upper chamber 12 and the curved surface part 173 and the tapered surface part 174 on the side of the lower chamber 13 roll the O-ring 58, and simultaneously release the compression of the O-ring 58. The large-diameter cylindrical surface part 185 of the housing 55 and the small-diameter cylindrical surface part 172 of the free piston 57 roll the O-ring 58, and thus move the O-ring 58 toward the axial lower chamber 13 relative to the housing 55. When the free piston 57 passes through its neutral position, the O-ring 58 operates in the same way as described above. In the damping force varying mechanism 35 of the sixth embodiment, it is possible to insert the O-ring 58 into the lid cylinder part 62, and to assemble the free piston 57, the O-ring 59, and the housing 55 in that order in one direction, and thus assembly efficiency of each component is improved.

Seventh Embodiment

Next, a seventh embodiment will be described focusing on portions different from those of the first embodiment mainly based on FIGS. 11, 12A and 12B. Further, for parts that are in common with the first embodiment, the same names and reference numbers are used.

In the seventh embodiment, a passage area varying mechanism 311 that adjusts damping characteristics from the outside using an actuator or manual operation and can adjust a passage area is provided in the passage 110 selected from the passages 110 and 111 partitioned into the upstream side and the downstream side by the free piston 57. Hereinafter, the passage area varying mechanism 311 will be described.

The aforementioned passage holes 105 and 106 constituting the passage 110 are formed in a piston holding member 304 of the piston rod 16. That is, the piston holding member 304 is provided with a female thread 303 screwed on a male thread 301 of a rod body 302. The female thread 303 on the side of the lower chamber 13 is formed as a lower hole 312. A receiving hole 315 having a smaller diameter than the lower hole 312 is formed in the lower hole 312 on the side of the lower chamber 13. The aforementioned passage hole 106 is formed to pass through from a bottom part of the receiving hole 315 toward the lower chamber 13. Further, the aforementioned passage holes 105 are formed to pass through from a wall part of the receiving hole 315 in a radial direction. Accordingly, the receiving hole 315 is formed between the passage holes 105 and 106.

An opening area varying member body 318 is received in the receiving hole 315 of the piston holding member 304. The opening area varying member body 318 has the shape of a lidded cylinder that includes a cylinder part 319 and a lid part 320 provided in a radial inward direction to close one end of the cylinder part 319. As shown in FIG. 12B, the cylinder part 319 is provided with orifices 321 to 324 made up of linear holes at a plurality of places, particularly four places, in a radial direction, wherein the orifices 321 to 324 are formed in that order in a circumferential direction of the cylinder part 319. All of the orifices 321 to 324 have different hole diameters. In detail the hole diameter of the orifice 321 is the largest, the hole diameter of the orifice 322 is the next largest, the hole diameter of the orifice 323 is the next largest, and the hole diameter of the orifice 324 is the smallest. The orifices 321 to 324 are formed at the same position in an axial direction of the cylinder part 319 and at different positions in a circumferential direction of the cylinder part 319. Here, the orifices 321 to 324 having different diameters at four places are formed at equal intervals, and thus the orifices 321 to 324 are formed at pitches of 90°. The orifice 321 having the largest diameter has a smaller diameter than the passage holes 105.

Figure 12A:
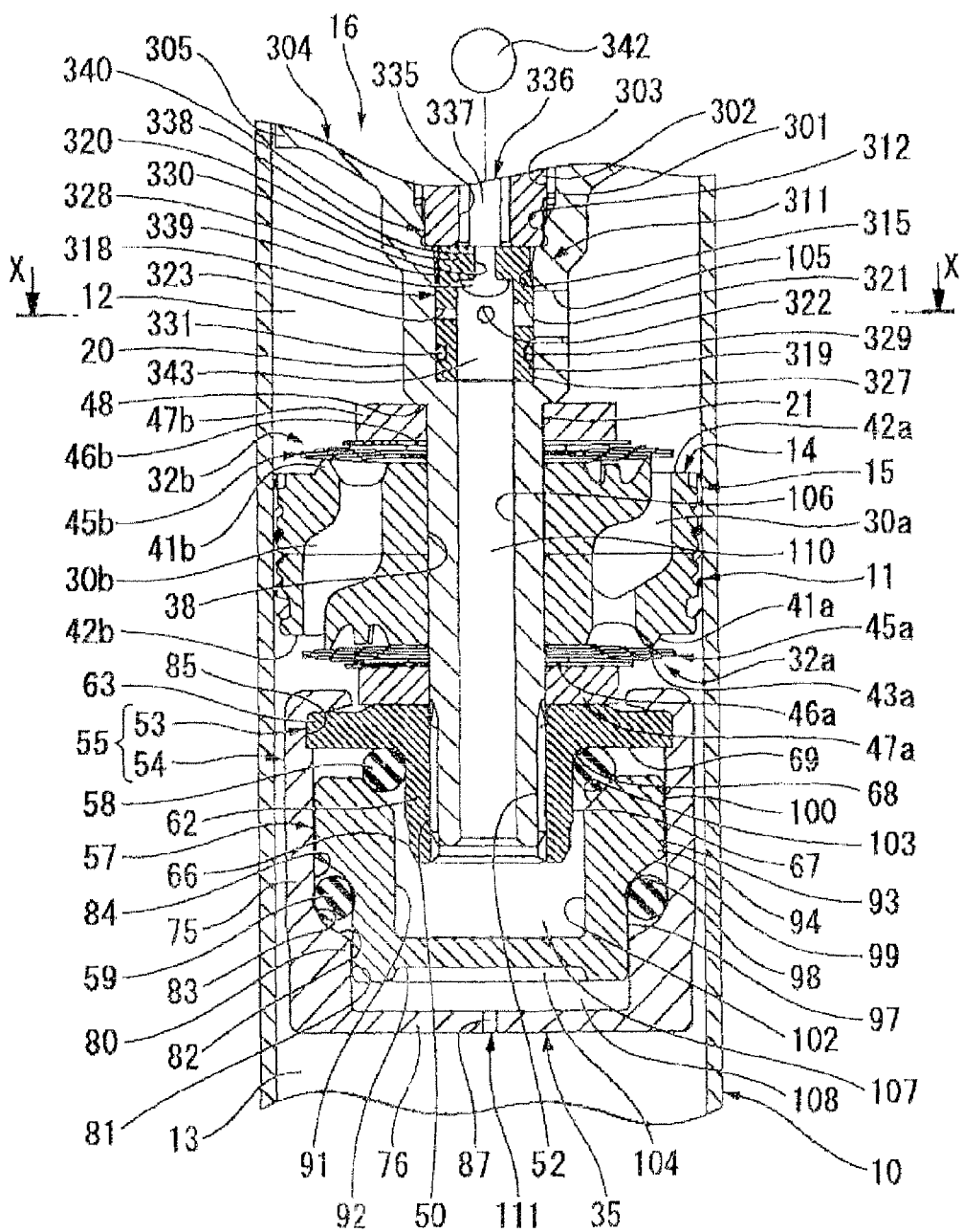
FIG. 12A is a main cross-sectional view showing important parts of the shock absorber according to a seventh embodiment of the present invention.

As shown in FIG. 12A, an annular seal groove 329 is formed in an outer circumference side of the cylinder part 319 in the circumferential direction of the cylinder part 319. The seal groove 329 is located on the opposite side from the lid part 320 beyond the orifices 321 to 324. In addition, the lid part 320 is provided with an attaching hole 330 in the radial center thereof which passes through in an axial direction.

This opening area varying member body 318 is received in the receiving hole 315 of the piston holding member 304 in a posture where the lid part 320 is disposed on the opposite side from the passage hole 106 in the state where an O-ring 331 is held in the seal groove 329. In this state, the orifices 321 to 324 are flush with the passage holes 105 in an axial direction of the piston holding member 304. The O-ring 331 in the seal groove 329 seals a gap between the opening area varying member body 318 and the receiving hole 315.

The rod body 302 of the piston rod 16 is provided with a through hole 335 in the radial center thereof which passes through in an axial direction. An operating rod 336 is inserted into the through-hole 335. The operating rod 336 includes an insertion shaft part 337 disposed in the rod body 302, and a tip shaft part 338 having a smaller diameter than the insertion shaft part 337. The tip shaft part 338 is fitted from the opposite side of the cylinder part 319 into the attaching hole 330 of the lid part 320 of the opening area varying member body 318 and swaged. A large-diameter swaged part 339 is formed on the tip shaft part 338 by the swaging. The operating rod 336 holds the lid part 320 of the opening area varying member body 318 by means of the swaged part 339 and the insertion shaft part 337. Thereby, the opening area varying member body 318 is fixed to the operating rod 336 so as not to be rotated.

The operating rod 336 and the opening area varying member body 318, both of which are integrally formed with each other, rotate to selectively communicate the orifices 321 to 324 with the passage hole 105. That is, the operating rod 336 and the opening area varying member body 318 constitute an opening area varying member 340 that enables to vary an opening area with respect to the passage hole 105. The opening area varying member 340 is disposed in the piston rod 16.

The opening area varying member 340 is adapted to be rotated with its angle of rotation controlled by a pivotable actuator 342 connected to the opposite side of the operating rod 336 from the opening area varying member body 318. The actuator 342 is controlled by a controller (not shown), and rotates the opening area varying member 340 at a proper angle. Thereby, one of the orifices 321 to 324 having different diameters described above is caused to selectively communicate with the passage hole 105. One of the orifices 321 to 324 which communicates with the passage hole 105 and a space part 343 in the opening area varying member body 318 makes the passage hole 105 to communicate with the passage hole 106, thereby constituting the passage 110. As shown in FIG. 11, an O-ring 344 is installed in the through-hole 335 of the piston rod body 302, to seal a gap between the through-hole 335 and the operating rod 336.

Figure 11:
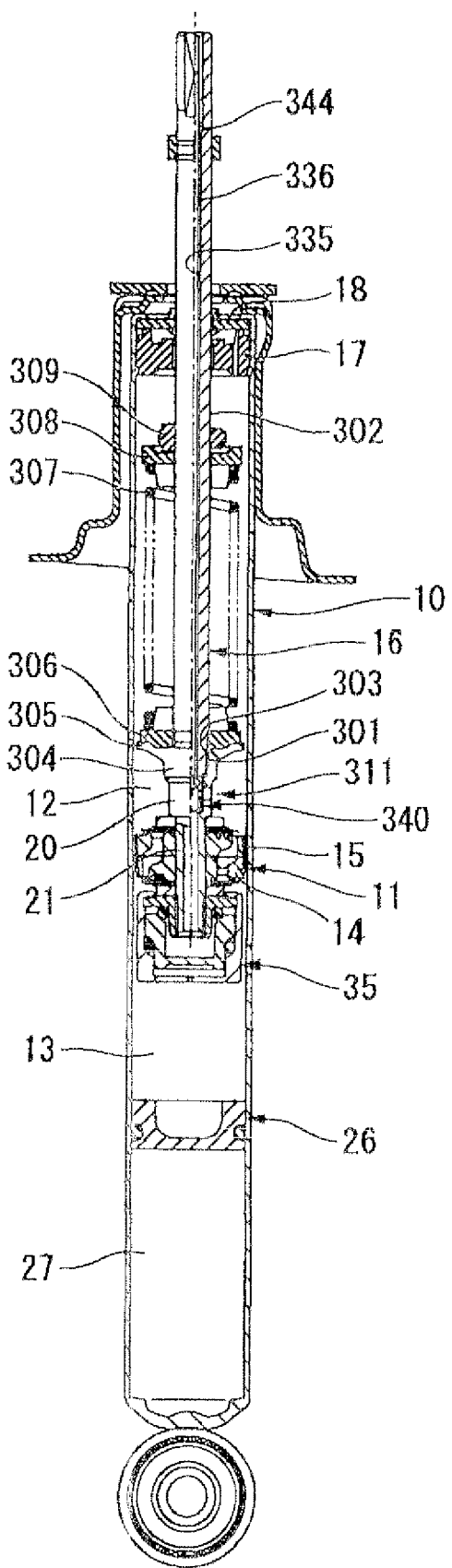
FIG. 11 is a cross-sectional view showing a shock absorber according to a seventh embodiment of the present invention.

As shown in FIG. 11, the piston rod 16 is configured of the rod body 302 having the male thread 301 formed at one end thereof, and the piston holding member 304, one end of which is screwed up to the male thread 301 of the rod body 302 by the female thread 303. An attaching shaft part 21 to which a piston body 14 is attached, a main shaft part 20 having a larger diameter than the attaching shaft part 21, and a stopper part 305 extending beyond the main shaft part 20 in a radial direction are sequentially formed in the piston holding member 304 starting from the opposite side from the axial female thread 303. A spring seat 306 is disposed on the stopper part 305 to be opposite to the piston 11. A coil spring 307 is disposed on the spring seat 306 to be opposite to the stopper part 305. A spring seat 308 is disposed on the coil spring 307 to be opposite to the spring seat 306. A buffer 309 is provided on the spring seat 308 at the opposite side from the coil spring 307. When the piston rod 16 protrudes from the cylinder 10 by a predetermined amount, the buffer 309 comes into contact with the rod guide 17. When the piston rod 16 further protrudes, the buffer 309 and the spring seat 308 slide on the piston rod 16, and simultaneously reduce a length of the coil spring 307 between the spring seat 308 and the spring seat 306. Thereby, the coil spring 307 generates a force resistant to the protrusion of the piston rod 16.

Figure 12B:
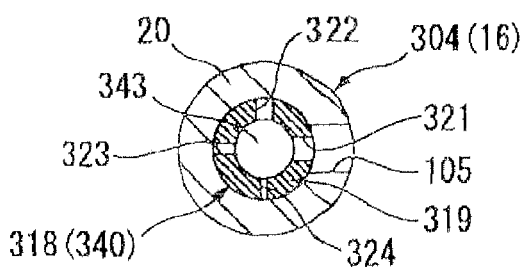
FIG. 12B is a cross-sectional view showing important parts of the shook absorber according to a seventh embodiment of the present invention taken along line X-X of FIG. 12A with respect to a piston holding member and an opening area varying member body.

The opening area varying member 340 and the actuator 342 shown in FIGS. 12A and 12B constitute the passage area varying mechanism 311. The passage area varying mechanism 311 is allowed to adjust a passage area of the passage 110 formed in the piston rod 16 by selecting the orifices 321 to 324 constituting this passage 110. The passage area varying mechanism 311 is adapted to vary the passage area of the passage 110 in four steps, because it has the orifices 321 to 324 having four different diameters.

When the passage area varying mechanism 311 is incorporated into the piston rod 16, for example, the operating rod 336 of the opening area varying member 340 is inserted into the through-hole 335 of the rod body 302. Thus, the opening area varying member body 318 on which the O-ring 331 of the opening area varying member 340 has been mounted is fitted into the receiving hole 315, and simultaneously the piston holding member 304 is screwed up to the rod body 302.

When the passage area varying mechanism 311 makes the orifice 321 to communicate with the passage hole 105, the passage area varying mechanism 311 maximizes the passage area of the passage 110, i.e. the passage area of the smallest portion. When the passage area varying mechanism 311 makes the orifice 322 to communicate with the passage hole 105, the passage area varying mechanism 311 makes the passage area of the passage 110 smaller than the case where it makes the orifice 321 to communicate with the passage hole 105. When the passage area varying mechanism 311 makes the orifice 323 to communicate with the passage hole 105, the passage area varying mechanism 311 makes the passage area of the passage 110 smaller than the case where it makes the orifice 322 to communicate with the passage hole 105. When the passage area varying mechanism 311 makes the orifice 324 to communicate with the passage hole 105, the passage area varying mechanism 311 makes the passage area of the passage 110 smaller than the case where it makes the orifice 323 to communicate with the passage hole 105.

When a piston speed is within a minute low-speed region (e.g. 0.05 m/s), a maximum damping force is obtained in a low frequency region. When a frequency increases, a damping force is reduced. However, if the passage area of the passage 110 is reduced, a cutoff frequency at which the damping force begins to be reduced can be lowered. Further, when the piston speed is within the minute low-speed region (e.g. 0.05 m/s), the smaller the passage area of the passage 110 becomes, the higher the damping force obtained in a high frequency region can become. Thus, when a damping force characteristic is tuned at the piston speed around 0.05 m/s, the improvement of ride comfort and the improvement of steering stability are compatible with each other.

In the shock absorber disclosed in Japanese Unexamined Utility Model Application, First Publication No. H07-019642, a passage to which a working fluid flows out from one chamber in a cylinder through the inside of a piston rod by means of movement of a piston is formed. A free piston is provided to partition this passage into an upstream side and a downstream side. Thereby, a damping force is variable.

In contrast, according to the seventh embodiment described above, the passages 110 and 111 to which the working fluid flows out from the upper chamber 12 in the cylinder 10 through the inside of the piston rod 16 by means of the movement of the piston 11 are formed. The free piston 57 is provided to partition these passages 110 and 111 into the upstream side and the downstream side. Thereby, the damping force is adapted to be changed. In addition, the passage area varying mechanism 311 capable of adjusting the passage area of the passage 110 is provided in the passage 110. As such, the damping force characteristic can be controlled with higher precision.

Further, the passage 110 is formed in the piston rod 16, and the passage area varying mechanism 311 includes the opening area varying member 340 disposed in the piston rod 16 and the actuator 342 rotating the opening area varying member 340. Accordingly, the passage area of the passage 110 can be adjusted by a simple and compact structure.

Eighth Embodiment

Figure 13:
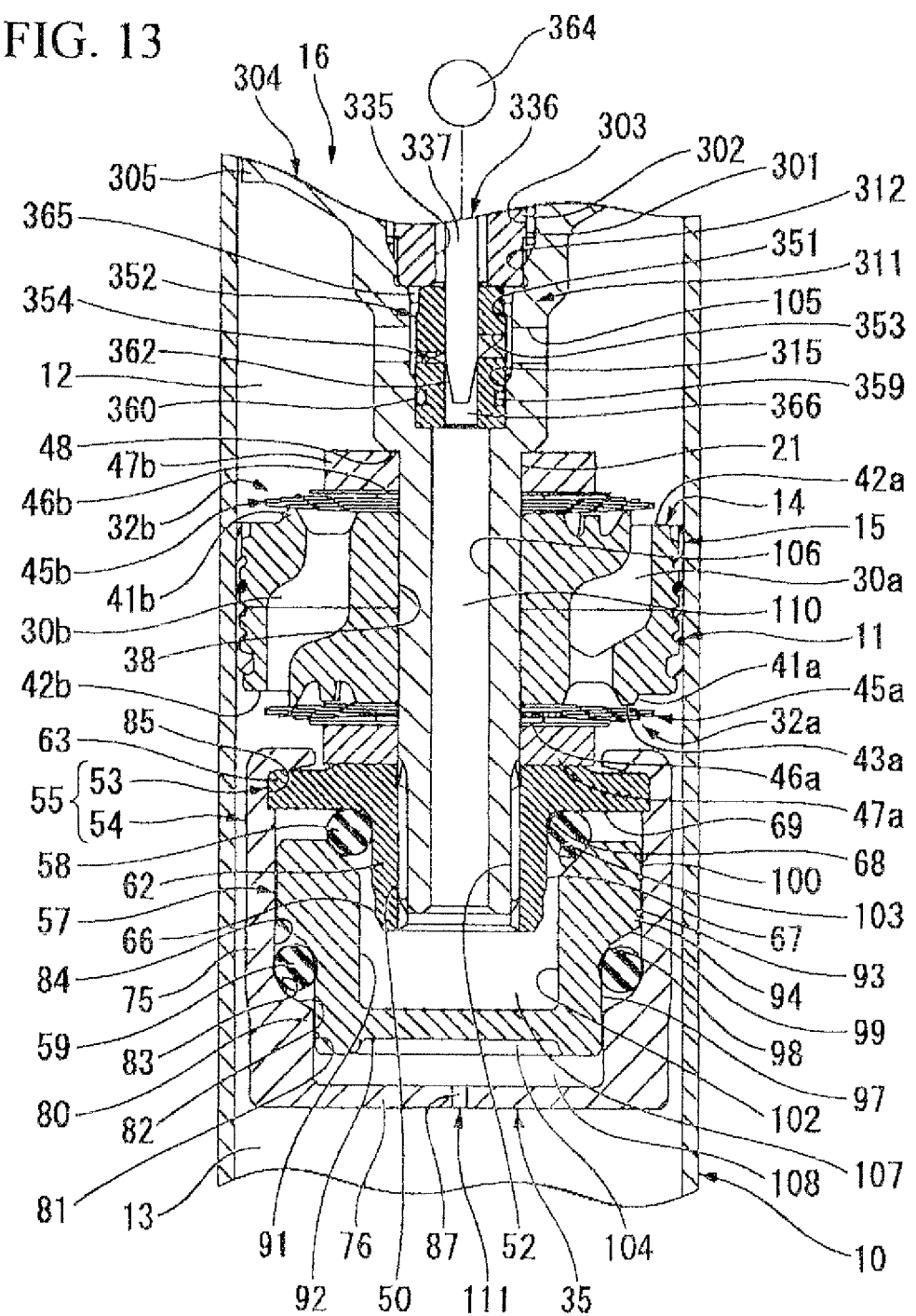
FIG. 13 is a cross-sectional view showing important parts of a shock absorber according to an eighth embodiment of the present invention.

Next, an eighth embodiment will be described focusing on portions different from those of the seventh embodiment mainly based on FIG. 13. Further, for parts that are in common with the seventh embodiment, the same names and reference numbers are used.

In the eighth embodiment, a passage area varying mechanism 311 is partially different from that of the seventh embodiment. In detail, a passage hole 351 is formed between a lower hole 312 and a receiving hole 315 of a piston holding member 304. The passage hole 351 has a smaller diameter than the lower hole 312, and a larger diameter than the receiving hole 315. A plurality of passage holes 105 are formed from a wall part of the passage hole 351 along a radial direction.

A cylindrical passage forming member 352 is disposed in the passage hole 351 and the receiving hole 315 of the piston holding member 304. The passage forming member 352 is provided with orifices 353 and 354 at a plurality of places, particularly two places, along a radial direction. These orifices 353 and 354 have different passage areas from each other. In detail, the passage area of the orifice 353 is large, and the passage area of the orifice 354 is small. These orifices 353 and 354 are formed at different positions in axial and circumferential directions of the passage forming member 352. An annular seal groove 359 is formed in an outer circumferential side of the passage forming member 352 in a circumferential direction on the opposite side from the orifice 353 beyond the orifice 354 in the axial direction of the passage forming member 352.

This passage forming member 352 is fitted into the receiving hole 315 of the piston holding member 304 in a posture where the orifice 354 having the small passage area is positioned on the side of the receiving hole 315 beyond the orifice 353 having the large passage area in the state where an O-ring 360 is held in the seal groove 359. In this state, the orifices 353 and 354 are disposed in the passage hole 351, and are aligned with the passage holes 105 in an axial direction of the piston holding member 304. Further, in this state, the O-ring 360 seals a gap between the passage forming member 352 and the receiving hole 315.

In the eighth embodiment, an operating rod 336 is provided with a tapered shaft part 362 at a tip of an insertion shaft part 337 of a rod body 302. The operating rod 336 is fitted so that the tapered shaft part 362 is inserted into the passage forming member 352, and the insertion shaft part 337 on the side of the tapered shaft part 362 can slide on an inner circumferential surface of the passage forming member 352.

The operating rod 336 is controlled over its axial position by a linear motion type actuator 364 connected to the opposite side from the tapered shaft part 362 thereof, and simultaneously moves in an axial direction, i.e. moves linearly. The actuator 364 is controlled by a controller (not shown), and stops the operating rod 336 at a proper position. Thereby, an effective volume of the plurality of orifices 353 and 354 having different passage areas which is used to communicate with the passage hole 106 is controlled. A gap 365 between the passage hole 351 and the passage forming member 352, the orifices 353 and 354, and a space part 366 on the side of the passage hole 106 beyond the operating rod 336 in the passage forming member 352 cause the passage holes 105 and the passage hole 106 to communicate with each other, thereby constituting the passage 110.

The passage forming member 352 and the operating rod 336 constitute the passage area varying mechanism 311 of the eighth embodiment which is capable of adjusting the passage area of the passage 110 formed in the piston rod 16. The passage area varying mechanism 311 changes an amount of openings of the orifices 353 and 354 constituting the passage 110 open to the space part 366. The passage area varying mechanism 311 can control the operating rod 336 in the state where only a part of the orifice 354 communicates with the space part 366, in the state where a part of the orifice 354 and a part of the orifice 353 communicate with the space part 366, in the state where the entire orifice 354 and a part of the orifice 353 communicate with the space part 366, or in the state where the entire orifice 354 and the entire orifice 353 communicate with the space part 366. Furthermore, even in each of these states, the amount of communication of the orifices 353 and 354 with the space part 366 can be adjusted by a position of the operating rod 336. That is, the operating rod 336 is disposed in the piston rod 16, and moves linearly to vary the opening area in the passage 110.

When the passage area varying mechanism 311 of the eighth embodiment is incorporated into the piston rod 16, for example, the O-ring 360 is mounted on the passage forming member 352, the passage forming member 352 is fitted into the receiving hole 315, and then the piston holding member 304 is screwed up to the rod body 302. Afterwards, the operating rod 336 is inserted into the rod body 302 from the opposite side from the piston holding member 304.

When the passage area varying mechanism 311 of the eighth embodiment advances the operating rod 336 to the maximum extent to position the tapered shaft part 362 on the side of the passage hole 106 beyond the orifice 354, the orifices 353 and 354 are not in communication with the space part 366 and the passage hole 106. In this state, the passage area of the passage 110 becomes zero (0), the smallest area. On the other hand, when the passage area varying mechanism 311 retracts the operating rod 336 to the maximum extent to position the tapered shaft part 362 on the opposite side from the passage hole 106 beyond the orifice 353, all of the orifices 353 and 354 are in communication with the space part 366 and the passage hole 106. In this state, the passage area of the passage 110 becomes the largest area.

Ninth Embodiment

Figure 14:
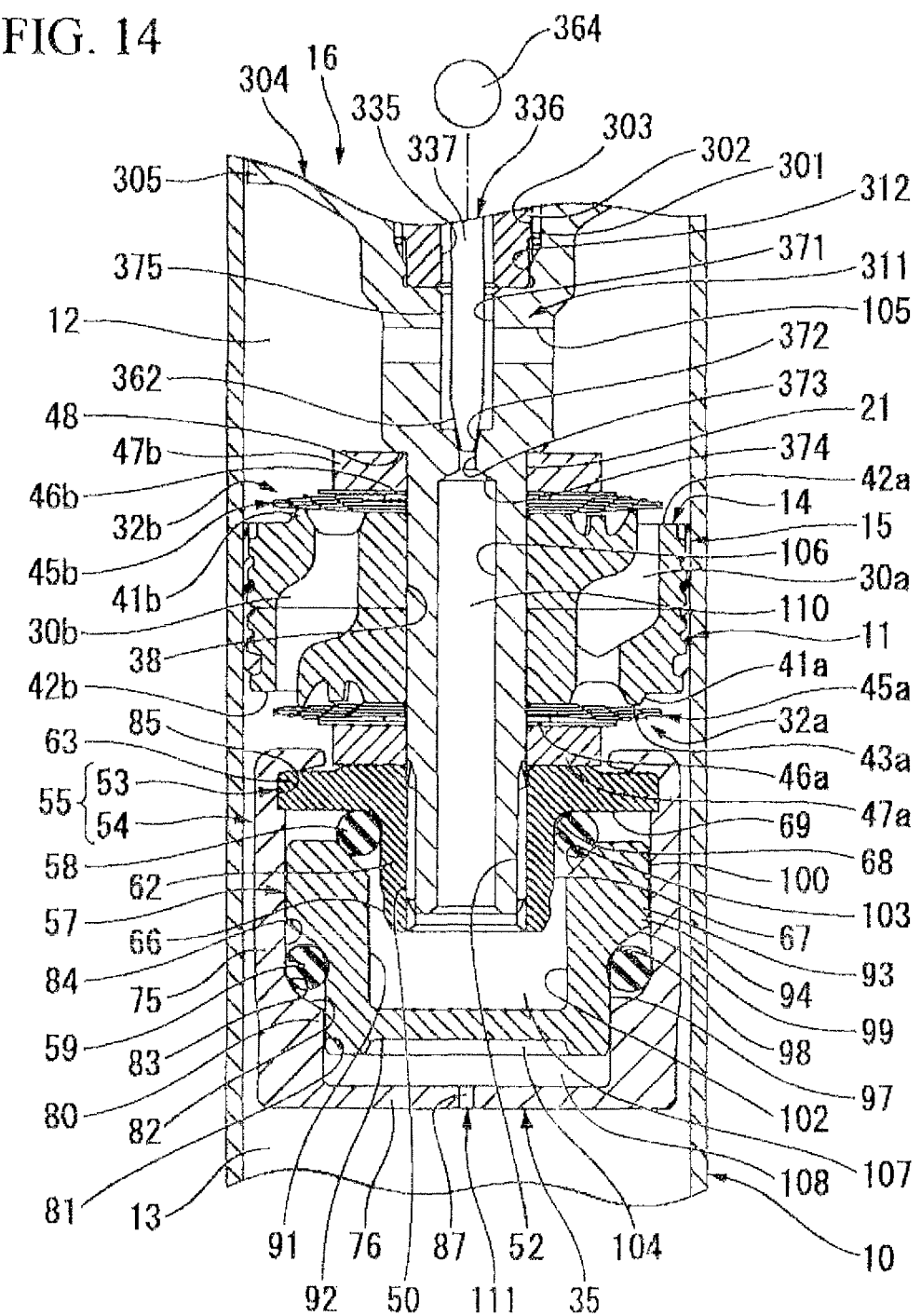
FIG. 14 is a cross-sectional view showing important parts of a shock absorber according to a ninth embodiment of the present invention.

Next, a ninth embodiment will be described focusing on portions different from those of the eighth embodiment mainly based on FIG. 14. Further, for parts that are in common with the eighth embodiment, the same names and reference numbers are used.

In the ninth embodiment, a passage area varying mechanism 311 is partially different from that of the eighth embodiment. In detail, on an interior side of a lower hole 312 of a piston holding member 304, a passage hole 371 having a smaller diameter than the lower hole 312 is formed. On an interior side of the passage hole 371, a tapered hole 372 which has a smaller diameter than the passage hole 371 as a whole and whose diameter decreases as approaches to the interior side is formed. Furthermore, on an interior side of the tapered hole 372, an orifice 373 that has the same diameter as the tapered hole 372 on the side of the small diameter is formed. On an interior side of the orifice 373, a tapered hole 374 whose diameter increases as approaches to the interior side is formed. Thus, a passage hole 106 is formed on the interior side of the tapered hole 374. Further, passage holes 105 are formed from a wall part of the passage hole 371 along a radial direction.

An operating rod 336 of the ninth embodiment includes an insertion shaft part 337 and a tapered shaft part 362 formed at an end of the insertion shaft part 337, as in the eighth embodiment. The insertion shaft part 337 is inserted into the passage hole 371, and the tapered shaft part 362 is capable of coming into contact with the tapered hole 372 and separating from the tapered hole 372.

The operating rod 336 is controlled over its axial position by a linear motion type actuator 364 connected to the opposite side from the tapered shaft part 362 thereof, and simultaneously moves in an axial direction. The actuator 364 is controlled by a controller (not shown), and stops the operating rod 336 at a proper position. Thereby, the tapered shaft part 362 controls an effective volume of a gap between the tapered shaft part 362 and the tapered hole 372 which is used to communicates with the passage holes 105. A gap 375 between the passage hole 371 and the tapered hole 372 and the operating rod 336, the orifice 373, and the tapered hole 374 cause the passage holes 105 and the passage hole 106 to communicate with each other, thereby constituting the passage 110.

The piston holding member 304 and the operating rod 336 constitute the passage area varying mechanism 311 that is capable of adjusting the passage area of the passage 110 formed in the piston rod 16. The passage area varying mechanism 311 is capable of adjusting the passage area of the passage 110 by changing the gap between the tapered shaft part 362 and the tapered hole 372 constituting the passage 110.

When the passage area varying mechanism 311 advances the operating rod 336 to the maximum extent to bring the tapered shaft part 362 into contact with the tapered hole 372, the orifice 373 does not communicate with the passage holes 105. In this state, the passage area of the passage 110 becomes zero (0), the smallest area. On the other hand, when the passage area varying mechanism 311 retracts the operating rod 336 to the maximum extent to separate the tapered shaft part 362 from the tapered hole 372 to the maximum extent, the entire orifice 373 communicates with the passage holes 105 in this state, the passage area of the passage 110 becomes a passage area of the orifice 373, that is to increase to the maximum extent. Thus, the passage area between them is adjusted by adjusting a gap amount between the tapered shaft part 362 and the tapered hole 372. That is, even in this case, the operating rod 336 is disposed in the piston rod 16, and moves linearly to vary an opening area in the passage 110. With the construction of the ninth embodiment, the gap is adjusted linearly, compared to the mechanism that varies the passage area in the four steps of the seventh embodiment. Accordingly, it is possible to change the damping force more smoothly.

Tenth Embodiment

Figure 15:
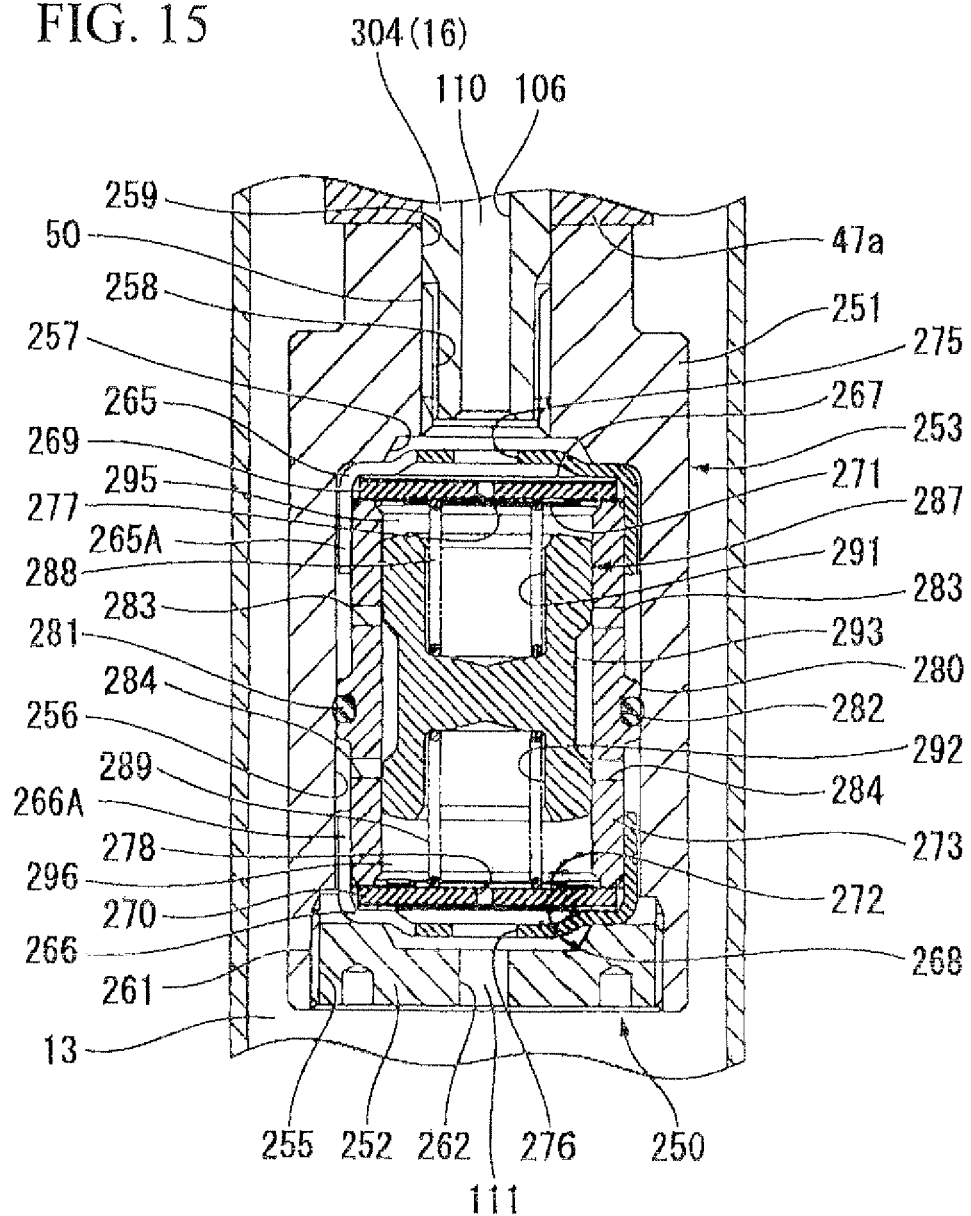
FIG. 15 is a cross-sectional view showing important parts of a shock absorber according to a tenth embodiment of the present invention.

Next, a tenth embodiment will be described focusing on portions different from those of the seventh to ninth embodiments mainly based on FIG. 15. Further, for parts that are in common with the seventh to ninth embodiments, the same names and reference numbers are used.

The tenth embodiment is a modification of a damping force varying mechanism in relation to the seventh to ninth embodiments. A damping force varying mechanism 250 of the tenth embodiment may also be applied to one of the seventh to ninth embodiments.

The damping force varying mechanism 250 of the tenth embodiment includes a housing 253 made up of a housing body 251 having an approximately cylindrical shape and a bottom lid member 252 attached to one end of the housing body 251 in an axial direction. The housing body 251 has a cylindrical shape. A female thread 255 up to which the bottom lid member 252 is screwed, a receiving hole part 256 having a smaller diameter than the female thread 255, a tapered hole 257 having a smaller diameter than the receiving hole part 256, a female thread 258 screwed up to a male thread 50 of a piston rod 16, and an attaching hole part 259 having a larger diameter than the female thread 258 are sequentially formed in an axial direction in the center of the housing body 251 starting from the side where the bottom lid member 252 is attached. The bottom lid member 252 is provided with a male thread 261 on an outer circumferential surface thereof which is screwed up to the female thread 255. The bottom lid member 252 is provided with a communicating hole 262 in the center thereof which passes through in an axial direction.

The housing 253 includes: a pair of retainers 265 and 266 that are disposed in the receiving hole part 256 of the housing body 251, come into contact with a bottom surface of the receiving hole part 256 and an inner surface of the bottom lid member 252, and have a bottomed cylindrical shape; a pair of spacers 267 and 268 that are disposed inside the retainers 265 and 266 respectively; a pair of disc-shaped base plates 269 and 270 that are disposed on the opposite sides from the retainers 265 and 266 in axial directions of the spacers 267 and 268; a pair of sheet-shaped elastic members 271 and 272 that are disposed on the opposite sides from the spacers 267 and 268 in axial directions of the base plates 269 and 270 and are formed of rubber; and a guide member 273 that is axially disposed between the elastic members 271 and 272, holds the elastic members 271 and 272 by means of the base plates 269 and 270, and has an approximately cylindrical shape.

The retainers 265 and 266 are provided with through-holes 275 and 276 in the centers of bottom parts thereof in an axial direction. Further, the retainers 265 and 266 are provided with slits 265A and 266A in lateral portions thereof extending from the bottom parts thereof into a radial gap between the guide member 273 and the housing body 251, and the slits 265A and 266A extend in a radial direction, and then extend in an axial direction to exit on the opposite sides from the bottom parts of the retainers 265 and 266. Further, the base plates 269 and 270 are also provided with through-holes (orifices) 277 and 278 in the centers of bottom parts thereof in an axial direction. The spacers 267 and 268 are held between the retainers 265 and 266 and the base plates 269 and 270 in the state where the through-holes 275 and 276 of the retainers 265 and 266 can always communicate with the through-holes 277 and 278 of the base plates 269 and 270. The through-holes 277 and 278 have a smaller diameter than the through-holes 275 and 276.

The guide member 273 is provided with an annular protrusion part 280 that protrudes outwardly at a predetermined axial intermediate position. The protrusion part 280 is provided with an annular holding groove 282 in an outer circumference thereof which holds a seal ring 281 sealing a gap between the housing body 251 and the protrusion part 280. Further, the guide member 273 is provided with a plurality of through-holes 283 and a plurality of through-holes 284, both of which pass through in a radial direction, on axially opposite sides of the protrusion part 280.

In addition, the damping force varying mechanism 250 includes a free piston 287 that is fitted into the guide member 273 to be slidable in an axial direction of the guide member 273, and a pair of coil springs (resistance elements) 288 and 289 that are disposed between the free piston 287 and the base plate 269 and between the free piston 287 and the base plate 270, maintain the free piston 287 at a neutral position, and generate resistance to displacement of the free piston 287. The free piston 287 is provided with a pair of spring holding holes 291 and 292 for holding the coil springs 288 and 289 on axially opposite sides thereof in the axial direction. The free piston 287 is provided with an annular groove part 293 in an outer circumferential surface thereof which is radially recessed within an axial intermediate predetermined range. The groove part 293 switches communication and blockage with respect to the through-holes 283 and 284 according to a position of the free piston 287 relative to the guide member 273.

The coil springs 288 and 289 bias the free piston 267 in the housing 253 from the axially opposite sides of the free piston 287 to maintain the free piston 287 at its neutral position, and generate resistance to the displacement of the free piston 287. When the free piston 287 moves from its neutral position to a direction which shortens the coil spring 288, the elastic member 271 comes into contact with one end face of the free piston 287 in an axial direction, thereby regulating reduction of a length of the coil spring 288 to the shortest length and contact of the free piston 287 with the base plate 269. When the free piston 287 moves from its neutral position to a direction which shorten the coil spring 289, the elastic member 272 comes into contact with the other end face of the free piston 287 in an axial direction, thereby regulating reduction of a length of the coil spring 289 to the shortest length and contact of the free piston 287 with the base plate 270.

In the damping force varying mechanism 250 of the tenth embodiment, an upper chamber communicating chamber 295 is formed between the guide member 273, the free piston 287, and the base plate 269 on the side of the piston rod 16. The upper chamber communicating chamber 295 communicates with an upper chamber 12 (not shown in FIG. 15) via a passage hole 106 of the piston rod 16, the through-hole 275 of the retainer 265 on the side of the piston rod 16, and the through-hole 277 of the base plate 269 on the side of the piston rod 16. A lower chamber communicating chamber 296 is formed between the guide member 273, the free piston 287, and the base plate 270 on the opposite side from the piston rod 16. The lower chamber communicating chamber 269 communicates with a lower chamber 13 via the through-hole 278 of the base plate 270, the through-hole 276 of the retainer 266 on the opposite side from the piston rod 16, and the communicating hole 262 of the bottom lid member 252. The upper chamber communicating chamber 295 and the through-hole 277 constitute a passage 110, and the lower chamber communicating chamber 296 and the through-hole 278 constitute a passage 111.

In the damping force varying mechanism 250 of the tenth embodiment, when the free piston 287 is located at its neutral position, the groove part 293 of the free piston 287 communicates with all of the through-holes 283 and 284 of the guide member 273 and the slits 265A and 266A of the retainers 265 and 266. From this state, for example, in an expansion stroke, when the free piston 287 moves from its neutral position toward the axial lower chamber 13 relative to the housing 253, the free piston 287 stretches the coil spring 288 on the opposite side from the axial lower chamber 13, and simultaneously contracts the coil spring 289 on the side of the axial lower chamber 13, thereby causing oil on the side of the upper chamber 12 (not shown in FIG. 15) to flow into the upper chamber communicating chamber 295. At this time, the free piston 287 causes the groove part 293 to close the through-holes 283 on the opposite side from the axial lower chamber 13 and to communicate with only the through-holes 284 on the side of the axial lower chamber 13.

In the following contraction stroke, when the free piston 287 moves to the opposite side from the axial lower chamber 13, the free piston 287 stretches the coil spring 289 on the side of the axial lower chamber 13, and simultaneously contracts the coil spring 288 on the opposite side from the axial lower chamber 13, thereby causing oil on the side of the lower chamber 13 to flow into the lower chamber communicating chamber 296. At this time, the free piston 287 causes the groove part 293 to close the through-holes 284 on the side of the lower chamber 13 and to communicate with only the through-holes 283 on the opposite side from the axial lower chamber 13, after the groove part 293 has communicated with the through-holes 283 and 284 on the axially opposite sides thereof.

In the expansion stroke, when the free piston 287 moves to the side of the lower chamber 13 relative to the housing 253, the free piston 287 stretches the coil spring 288 on the opposite side from the lower chamber 13, and simultaneously contracts the coil spring 289 on the side of the lower chamber 13. After the free piston 287 passes through its neutral position where the groove part 293 communicates with the through-holes 283 and 284 on the axially opposite sides thereof, the free piston 287 operates in the same way as described above.

According to the tenth embodiment described above, since the resistance to the displacement of the free piston 287 is generated by the coil springs 288 and 289, it is possible to improve durability.

Further, in the tenth embodiment, the elastic members 271 and 272 may be formed of a material that has elasticity such as rubber, gel enclosed in a bag, and so on, in addition to a coil spring or a leaf spring.

Eleventh Embodiment

Next, an eleventh embodiment will be described focusing on portions different from those of the seventh to ninth embodiments mainly based on FIG. 16. Further, for parts that are in common with the seventh to ninth embodiments, the same names and reference numbers are used.

The eleventh embodiment is a modification of a damping farce varying mechanism in relation to the seventh to ninth embodiments. A damping force varying mechanism 400 of the eleventh embodiment may also be applied to one of the seventh to ninth embodiments.

The damping force varying mechanism 400 of the eleventh embodiment includes a housing 405, a free piston 407 slidably fitted into the housing 405, an O-ring (a resistance element, an elastic body, or one elastic body) 408 serving as a contraction-side elastic body interposed between the free piston 407 and a lid member 402 of the housing 405, and art O-ring (a resistance element, an elastic body, or the other elastic body) 409 serving as an expansion-side elastic body interposed between the free piston 407 and a housing body 403 of the housing 405. The housing 405 is made up of the lid member 402 and the housing body 403. The lid member 402 is provided with a female thread 401 screwed up to a male thread 50 of a piston holding member 304 constituting a piston rod 16. The housing body 403 has an approximately cylindrical shape, and is attached to the lid member 402 such that an opening side of one end thereof is closed. The O-ring 408 undergoes compressive deformation when the free piston 407 moves toward the axial lid member 402 relative to the housing 405. The O-ring 409 undergoes compressive deformation when the free piston 407 moves to the opposite side from the side described above relative to the housing 405. Further, the O-rings 408 and 409 are also shown in a natural state in FIG. 16 for the sake of convenience. In particular, since the O-ring 409 functions as a seal, the O-ring 409 is preferably disposed to be usually deformed (a non-circular cross section) in a mounted state.

The lid member 402 is formed mainly by cutting. The lid member 402 includes a lid inner cylinder part 412 has an approximately cylindrical shape, a disc-shaped lid base plate part 413 that extends from an axial end of the lid inner cylinder part 412 in a radial outward direction, and a lid outer cylinder part 414 that extends from an outer circumferential side of the lid base plate part 413 in the same direction as the lid inner cylinder part 412.

The female thread 401 is formed on an inner circumference of the lid inner cylinder part 412. The female thread 401 protrudes in a radial inward direction at an axial intermediate position. Further, a small-diameter cylindrical surface part 416, a curved surface part 417, and a large-diameter cylindrical surface part 418 are sequentially formed on an inner circumferential surface of the lid outer cylinder part 414 starting from the side of the lid base plate part 413. The small-diameter cylindrical surface part 416 has a constant diameter. The curved surface part 417 connected to the small-diameter cylindrical surface part 416 is formed in an annular shape such that its diameter increases with the distance from the small-diameter cylindrical surface part 416. The large-diameter cylindrical surface part 418 connected to the curved surface part 417 has a constant diameter larger than that of the small-diameter cylindrical surface part 416. The curved surface part 417 is formed so that its cross section including a central axis of the lid member 402 has an arcuate shape.

The housing body 403 is formed mainly by cutting. The housing body 403 has an approximately cylindrical shape, and is provided with an inner annular protrusion 420 on one axial side thereof which protrudes in a radial inward direction. A small-diameter cylindrical surface part 421, a curved surface part 422, a large-diameter cylindrical surface part 423, and a large-diameter-side fitting cylindrical surface part 424 having a larger diameter than the large-diameter cylindrical surface part 423 are sequentially formed on an inner circumferential surface of the housing body 403 starting from one axial side of the housing body 403. The small-diameter cylindrical surface part 421 has a constant diameter. The curved surface part 422 connected to the small-diameter cylindrical surface part 421 is formed in an annular shape such that its diameter increases with the distance from the small-diameter cylindrical surface part 421. The large-diameter cylindrical surface part 423 connected to the curved surface part 422 has a constant diameter larger than the small-diameter cylindrical surface part 421. The large-diameter-side fitting cylindrical surface part 424, which abuts the large-diameter cylindrical surface part 423 in an axial direction, has a larger diameter than the large-diameter cylindrical surface part 423. The curved surface part 422 is formed so that its cross section including a central axis of the housing body 403 has an arcuate shape. The small-diameter cylindrical surface part 421 and the curved surface part 422 are formed on the inner annular protrusion 420.

The lid outer cylinder part 414 of the lid member 402 is fitted into the large-diameter-side fitting cylindrical surface part 424 of this housing body 403 throughout its length. By fitting the lid outer cylinder part 414 into the large-diameter-side fitting cylindrical surface part 424, the large-diameter cylindrical surface part 418 of the lid outer cylinder part 414 continues with the large-diameter cylindrical surface part 423 of the housing body 403 without a height difference. The curved surface part 417 is formed on an inner annular protrusion 425 of the lid member 402 which protrudes in a radial inward direction beyond the large-diameter cylindrical surface part 418 and the large-diameter cylindrical surface part 423. Meanwhile, the housing body 403 has been described to approximate a cylinder, though the inner circumferential surface thereof preferably has a circular cross section, the outer circumferential surface of the housing body 403 may have a non-circular cross section such as a polygonal cross section.

In the housing body 403, the lid member 402 is fitted into the large-diameter-side fitting cylindrical surface part 424 by the lid outer cylinder part 414 with the lid outer cylinder part 414 directed to a destination. In this state, an end portion, which forms a part of the large-diameter-side fitting cylindrical surface part 424 of the housing body 403 and protrudes from the lid member 402, is swaged on the inside. Thereby, the lid member 402 is fixed to and integrated with the housing body 403. In this way, the housing body 403 and the lid member 402 integrated with each other constitute the housing 405.

The free piston 407 is formed mainly by cutting. The free piston 407 includes a piston cylinder part 428 having an approximately cylindrical shape, and a piston closing plate part 429 that closes on an axial end of the piston cylinder part 428. The piston cylinder part 428 is provided with an outer annular protrusion 430 at the axial middle thereof which protrudes in a radial outward direction.

A small-diameter cylindrical surface part 433, a curved surface part 434, a large-diameter cylindrical surface part 435, a curved surface part 436, and a small-diameter cylindrical surface part 437 are sequentially formed on an outer circumferential surface of the piston cylinder part 428 starting from the side of the axial piston closing plate part 429. The curved surface part 434, the large-diameter cylindrical surface part 435, and the curved surface part 436 are formed on the outer annular protrusion 430.

The small-diameter cylindrical surface part 433 has a constant diameter. The curved surface part 434 connected to the small-diameter cylindrical surface part 433 is formed in an annular shape such that its diameter increases with the distance from the small-diameter cylindrical surface part 433. The large-diameter cylindrical surface part 435 connected to the curved surface part 434 has a constant diameter larger than that of the small-diameter cylindrical surface part 433. The curved surface part 434 is formed so that its cross section including a central axis of the free piston 407 has an arcuate shape.

The curved surface part 436 connected to the large-diameter cylindrical surface part 435 is formed in an annular shape such that its diameter decreases with the distance from the large-diameter cylindrical surface part 435. The curved surface part 436 is connected to the small-diameter cylindrical surface part 437. The small-diameter cylindrical surface part 437 has a constant diameter equal to that of the small-diameter cylindrical surface part 433. The curved surface part 436 is formed so that its cross section including a central axis of the free piston 407 has an arcuate shape. The outer annular protrusion 430 is symmetrical with respect to a plane passing through the axial middle position thereof. The free piston 407 is provided with a plurality of passage holes 438 at the axial middle position of the outer annular protrusion 430 at a plurality of places. The passage holes 438 pass through the outer annular protrusion 430 in a radial direction, and are spaced in a circumferential direction of the free piston 407 at predetermined intervals.

After the free piston 407 is disposed in the housing 405, the large-diameter cylindrical surface part 435 of the free piston 407 is slidably fitted into the large-diameter cylindrical surface part 423 of the housing body 403 and the large-diameter cylindrical surface part 418 of the lid member 402. The free piston 407 is adapted so that one small-diameter cylindrical surface part 433 and the other small-diameter cylindrical surface part 437 are capable of sliding on the small-diameter cylindrical surface part 421 of the housing body 403 and the small-diameter cylindrical surface part 416 of the lid outer cylinder part 414 of the lid member 402, respectively. After the free piston 407 is disposed in the housing 405, a position of the curved surface part 422 of the housing body 403 and a position of the curved surface part 434 of the free piston 407 are superimposed on each other in radial directions thereof. Thus, the curved surface part 422 of the housing body 403 and the curved surface part 434 of the free piston 407 are opposite to each other in a moving direction of the free piston 407. In addition, a position of the curved surface part 417 of the lid outer cylinder part 414 of the lid member 402 and a position of the curved surface part 436 of the free piston 407 are superimposed on each other in radial directions thereof. Thus, the curved surface part 417 of the lid member 402 and the curved surface part 436 of the free piston 407 are opposite to each other in a moving direction of the free piston 407.

Figure 16:
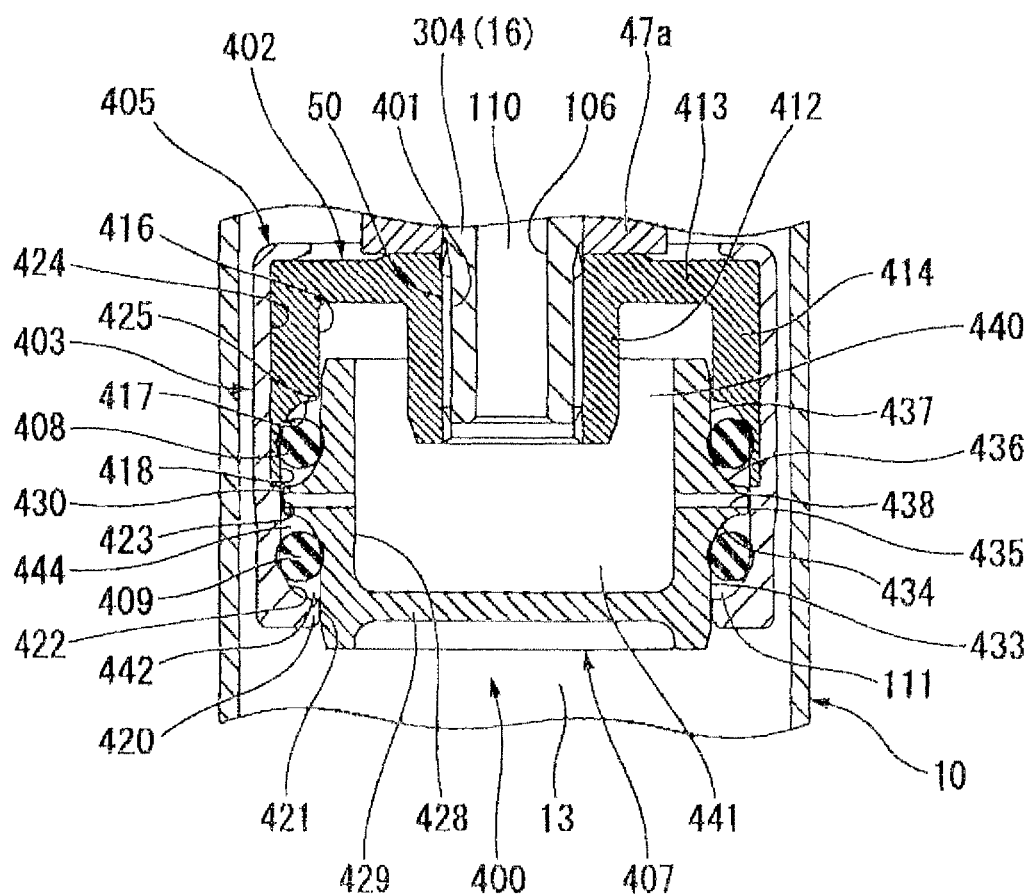
FIG. 16 is a cross-sectional view showing important parts of a shock absorber according to an eleventh embodiment of the present invention.

Thus, between the small-diameter cylindrical surface part 433 and the curved surface part 434 of the free piston 407 and the curved surface part 422 and the large-diameter cylindrical surface part 423 of the housing body 403, in other words, between the outer annular protrusion 430 of the free piston 407 and one inner annular protrusion 420 of the housing 405, an O-ring 409 (FIG. 16 shows a natural state) is disposed. In a natural state, the O-ring 409 is configured so that its cross section including a central axis has a circular shape, has a smaller inner diameter than the small-diameter cylindrical surface part 433 of the free piston 407, and has a greater outer diameter than the large-diameter cylindrical surface part 423 of the housing body 403. That is the O-ring 409 is fitted in interference with both the free piston 407 and the housing body 403 in a radial direction.

Further, between the large-diameter cylindrical surface part 418 and the curved surface part 417 of the lid member 402 and the curved surface part 436 and the small-diameter cylindrical surface part 437 of the free piston 407, in other words, between the outer annular protrusion 430 of the free piston 407 and the other inner annular protrusion 425 of the housing 405, an O-ring 408 (FIG. 16 shows a natural state) is disposed. In a natural state, the O-ring 408 is also configured so that its cross section including a central axis has a circular shape, and it has a smaller inner diameter than the small-diameter cylindrical surface part 437 of the free piston 407, and a greater outer diameter than the large-diameter cylindrical surface part 418 of the lid member 402. That is, the O-ring 408 is also fitted in interference with both the free piston 407 and the housing 405 in a radial direction.

Both of the O-rings 408 and 409 have the same size. Both of the O-rings 408 and 409 maintain the free piston 407 at a predetermined neutral position with respect to the housing 405, and allow the free piston 57 to axially move toward both of the axial upper and lower chambers 12 and 13 relative to the housing 405.

In the free piston 407, the O-ring 408 is in contact with the small-diameter cylindrical surface part 437 and the curved surface part 436. The curved surface part 436 is inclined to the moving direction of the free piston 407. Further, in the housing 405, the O-ring 408 is in contact with the large-diameter cylindrical surface part 418 and the curved surface part 417. The curved surface part 417 is inclined to the moving direction of the free piston 407.

In other words, the outer annular protrusion 430 is provided on the outer circumference of the free piston 407. Axially opposite surfaces of the outer annular protrusion 430 constitute the curved surface part 434 and the curved surface part 436, respectively. In the inner circumference of the housing 405, the inner annular protrusion 420 constituting the curved surface part 422 and the inner annular protrusion 425 constituting the curved surface part 417 are provided on the opposite sides of the outer annular protrusion 430. The O-ring 409 and the O-ring 408 are interposed between the outer annular protrusion 430 and the inner annular protrusion 420 and between the outer annular protrusion 430 and the inner annular protrusion 425, respectively.

The shortest distance between portions where the O-ring 409 is in contact with a free piston contact surface (a portion where the small-diameter cylindrical surface part 433 and the curved surface part 434 of the free piston 407 are in contact with the O-ring 409) and a housing contact surface (a portion where the large-diameter cylindrical surface part 423 and the curved surface part 422 of the housing 405 are in contact with the O-ring 409) is changed by the movement of the free piston 407. When the shortest distance changes, the direction of a segment representing the shortest distance changes. In other words, shapes of the small-diameter cylindrical surface part 433 and the curved surface part 434 and shapes of the large-diameter cylindrical surface part 423 and the curved surface part 422 are set so that the direction of the segment representing the shortest distance between the portions where the O-ring 409 is in contact with the free piston contact surface of the free piston 407 and the housing contact surface of the housing 405 changes. In detail, when the free piston 407 is positioned on the side of the axial upper chamber 12 (an upper side of FIG. 16) with respect to the housing 405, the shortest distance between the portions where the O-ring 409 is in contact with the free piston contact surface and the housing contact surface is a difference in radius between the large-diameter cylindrical surface part 423 and the small-diameter cylindrical surface part 433 (because a difference in radius between outer and inner diameters of the O-ring 409 is greater than the difference in radius between the large-diameter cylindrical surface part 423 and the small-diameter cylindrical surface part 433, the O-ring 409 is compressive deformed by the difference, and the deformed portion, i.e. the segment of the shortest distance, has an inclined angle equal to zero (0)). On the other hand, when the free piston 407 moves toward the axial lower chamber 13 (a lower side of FIG. 16) relative to the housing 405, the portions in contact with the O-ring 409 are the curved surface part 434 and the curved surface part 422, and the position where the O-ring 409 is compressive deformed to the maximum extent, i.e. the segment of the shortest distance, has an inclined angle other than zero (0).

Similarly, the shortest distance between portions where the O-ring 408 is in contact with, a free piston contact surface (a portion where the small-diameter cylindrical surface part 437 and the curved surface part 436 of the free piston 407 are in contact with the O-ring 408) and a housing contact surface (a portion where the large-diameter cylindrical surface part 418 and the curved surface part 417 of the housing 405 are in contact with the O-ring 408) is changed by the movement of the free piston 407. When the shortest distance changes, the direction of a segment representing the shortest distance changes. In other words, shapes of the small-diameter cylindrical surface part 437 and the curved surface part 436 and shapes of the large-diameter cylindrical surface part 418 and the curved surface part 417 are set so that the direction of the segment representing the shortest distance between the portions where the O-ring 408 is in contact with the free piston contact surface of the free piston 407 and the housing contact surface of the housing 405 changes. In detail, when the free piston 407 is positioned on the side of the axial lower chamber 13 (a lower side of FIG. 16) with respect to the housing 405, the shortest distance between the portions where the O-ring 408 is in contact with the free piston contact surface and the housing contact surface is a difference in radius between the large-diameter cylindrical surface part 418 and the small-diameter cylindrical surface part 437 (because a difference in radius between the outer and inner diameters of the O-ring 408 is greater than a difference in radius between the large-diameter cylindrical surface part 418 and the small-diameter cylindrical surface part 437, the O-ring 408 is compressive deformed by the difference, and the deformed portion, i.e. the segment of the shortest distance, has an inclined angle equal to zero (0)). On the other hand, when the free piston 407 moves toward the axial upper chamber 12 (an upper side of FIG. 16) relative to the housing 405, the portions in contact with the O-ring 408 are the curved surface part 417 and the curved surface part 436, and the position where the O-ring 408 is compressive deformed to the maximum extent, i.e. the segment of the shortest distance, has an inclined angle other than zero (0).

Further, the damping force varying mechanism 400 may be assembled, for instance, by inserting the O-ring 409 into the housing body 403 up to a position of the curved surface part 422, fitting the free piston 407 on the inside of the housing body 403 and the O-ring 409; inserting the O-ring 408 up to a position of the curved surface part 436 between the housing body 403 and the free piston 407, and swaging the lid member 402 to the housing body 403. Thus, the damping force varying mechanism 400 pre-assembled in this way is attached by screwing the female thread 401 on the male thread 50 of the attaching shaft part 21 of the piston rod 16. At this time, the lid base plate part 413 of the housing 405 comes into contact with a valve regulating member 47a. The outer diameter of the damping force varying mechanism 400, i.e. the outer diameter of the housing body 403, is set to be smaller than the inner diameter of the cylinder 10 to an extent that it does not serve as flow passage resistance.

The upper chamber 12 communicates with a pressure chamber 440 formed in the housing 405 of the damping force varying mechanism 400 by means of the passage holes 105 and 106 of the piston holding member 304 of the piston rod 16. In detail, the upper chamber 12 communicates with an upper chamber communicating chamber 441 of the pressure chamber 440 which is defined by the housing 405, the O-ring 408, and the free piston 407. Further, the lower chamber 13 is allowed to communicate with the housing 405 via a gap between the piston cylinder part 428 of the free piston 407 that protrudes from the housing 405 and the inner annular protrusion 420 of the housing 405. In detail, the lower chamber 13 is allowed to communicate with a lower chamber communicating chamber 442 of the pressure chamber 440 in the housing 405, and the lower chamber communicating chamber 442 is defined by the housing 405, the O-ring 409, and the free piston 407.

In the eleventh embodiment, the plurality of passage holes 438 passing through the outer annular protrusion 430 in a radial direction are formed at the axial middle position of the outer annular protrusion 430 of the free piston 407. Thereby, the upper chamber communicating chamber 441 always communicates with a chamber 444, which is surrounded by the housing 405, the O-ring 408, the O-ring 409 and the free piston 407, via the passage holes 438. In other words, the passage holes 43S guide oil from the upper chamber communicating chamber 441 into the chamber 444 between the one O-ring 408 and the other O-ring 409. Further, since the passage holes 438 are formed in the outer annular protrusion 430 of the free piston 407, the passage holes 438 are in contact with neither the one O-ring 408 nor the other O-ring 409 throughout a movement range of the free piston 407 relative to the housing 405.

The O-ring 409 disposed between the housing body 403 and the free piston 407 is disposed to seal between the housing 405 and the free piston 407 at all times, and blocks the communication between the upper chamber communicating chamber 441 and the lower chamber communicating chamber 442 and between the chamber 444 and the lower chamber communicating chamber 442 at all times.

The passage holes 105 and 106 and the upper chamber communicating chamber 441 constitute the passage 110 to which the oil flows out from one chamber, the upper chamber 12, in the cylinder 10 due to the movement of the piston 11 toward the upper chamber 12. The lower chamber communicating chamber 442 constitutes the passage 111 to which the oil flows out from the other chamber, the lower chamber 13, in the cylinder 10 due to the movement of the piston 11 toward the lower chamber 13. Accordingly, the housing 405 has a part of the passage 110 formed therein as a flow passage, and has the entire passage 111 formed therein as a flow passage. The free piston 407 is movably inserted into the pressure chamber 440 in the housing 405, where the pressure chamber 440 is provided in-between in the passages 110 and 111. The free piston 407 partitions the passages 110 and 111 into two regions, i.e., upstream and downstream regions. The O-rings 408 and 409, which are provided between the free piston 407 and the housing 405 and are disposed on opposite sides in a sliding direction of the free piston 407, generate resistance to the displacement of the free piston 407. That is, the O-ring 408 generates an elastic force when the free piston 407 moves toward one chamber, the upper chamber 12, relative to the housing 405, and the O-ring 409 generates an elastic force when the free piston 407 moves toward the other chamber, the lower chamber 13, relative to the housing 405.

In the eleventh embodiment as well, as described above, the O-rings 408 and 409 formed of a rubber material are used as components for applying a biasing force to the free piston 407 so as to return the free piston 407 to its neutral position. At the neutral position of the free piston 407, the O-rings 408 and 409 located between the free piston 407 and the housing 405 are positioned between the large-diameter cylindrical surface part 418 of the lid member 402 and the small-diameter cylindrical surface part 437 of the free piston 407, and between the large-diameter cylindrical surface part 423 of the housing body 403 and the small-diameter cylindrical surface part 433 of the free piston 407.

For example, in the expansion stroke, when the free piston 407 moves from this neutral position toward the lower chamber 13 relative to the housing 405, the large-diameter cylindrical surface part 423 of the housing 405 and the small-diameter cylindrical surface part 433 of the free piston 407 mutually roll the O-ring 409, i.e. rotate the O-ring 409 such that inner and outer diameter sides move in the opposite direction, and move the O-ring 409 toward the lower chamber 13 relative to the housing 405. Afterwards, the curved surface part 422 of the housing 405 on the side of the upper chamber 12 and the curved surface part 434 of the free piston 407 on the side of the lower chamber 13 roll the O-ring 409, and simultaneously compress the O-ring 409 in axial and radial directions of the free piston 407. Then, the curved surface part 422 of the housing 405 on the side of the lower chamber 13 and the curved surface part 434 of the free piston 407 on the side of the upper chamber 12 compress the O-ring 409 in the axial and radial directions of the free piston 407. Further, in the expansion stroke, when the free piston 407 moves from this neutral position toward the lower chamber 13 relative to the housing 405, the large-diameter cylindrical surface part 418 of the housing 405 and the small-diameter cylindrical surface part 437 of the free piston 407 mutually roll the O-ring 408, and move the O-ring 408 toward the lower chamber 13 relative to the housing 405.

At this time, a region where the O-ring 409 is rolled between the large-diameter cylindrical surface part 423 of the housing 405 and the small-diameter cylindrical surface part 433 of the free piston 407 and a region where the O-ring 409 is rolled between the curved surface part 422 of the housing 405 and the curved surface part 434 of the free piston 407 are rolling regions where the O-ring 409 is rolled at a position separated from a downstream side end within a moving region of the free piston 407. Further, at the position separated from the downstream side end, the rolling region is a moving region where the O-ring 409 moves in a moving direction of the free piston 407 in the state where the O-ring 409 is in contact with both the housing 405 and the free piston 407. The term "moving" is defined that at least a downstream end position (a lower end position in FIG. 16) of the O-ring 409 in the moving direction of the free piston is moved.

Further, a region where the O-ring 409 is compressed between the curved surface part 422 of the housing 405 and the curved surface part 434 of the free piston 407 is a moving direction deformation region where the O-ring 409 undergoes elastic deformation in the moving direction of the free piston 407 on the downstream side end within the moving region of the free piston 407. The term "elastic deformation in the moving direction deformation region" is defined as deformation when an upstream end position (an upper end position in FIG. 16) of the O-ring 409 in the moving direction of the free piston is moved but a downstream end position is not changed. In this embodiment, the rolling region and the moving region are partially overlapped on the moving direction deformation region.

In the following contraction stroke, when the free piston 407 moves toward the upper chamber 12 relative to the housing 405, the curved surface part 422 of the housing 405 on the side of the lower chamber 13 and the curved surface part 434 of the free piston 407 on the side of the upper chamber 12 release the compression of the O-ring 409. Then, the curved surface part 422 of the housing 405 on the side of the upper chamber 12 and the curved surface part 434 of the free piston 407 on the side of the lower chamber 13 roll the O-ring 409, and at the same time, further release the compression of the O-ring 409. Then, the large-diameter cylindrical surface part 423 of the housing 405 and the small-diameter cylindrical surface part 433 of the free piston 407 mutually roll the O-ring 409, and simultaneously move the O-ring 409 toward the upper chamber 12 relative to the housing 405. Further, at this time, in the case of the O-ring 408, the large-diameter cylindrical surface part 418 of the housing 405 and the small-diameter cylindrical surface part 437 of the free piston 407 mutually roll the O-ring 408, and move the O-ring 408 toward the upper chamber 12 relative to the housing 405. Afterwards, the curved surface part 417 of the housing 405 on the side of the lower chamber 13 and the curved surface part 436 of the free piston 407 on the side of the upper chamber 12 mutually roll the O-ring 408, and simultaneously compress the O-ring 408 in the axial and radial directions of the free piston 407. Then, the curved surface part 417 of the housing 405 on the side of the upper chamber 12 and the curved surface part 436 of the free piston 407 on the side of the lower chamber 13 compress the O-ring 408 in the axial and radial directions of the free piston 407.

At this time, a region where the O-ring 408 is rolled between the large-diameter cylindrical surface part 418 of the housing 405 and the small-diameter cylindrical surface part 437 of the free piston 407 and a region where the O-ring 408 is roiled between the curved surface part 417 of the housing 405 and the curved surface part 436 of the free piston 407 are rolling regions where the O-ring 408 is rolled at a position separated from an upstream side end within the moving region of the free piston 407. Further, at the position separated from the upstream side end, the rolling region is a moving region where the O-ring 408 moves in the moving direction of the free piston 407 in the state where the O-ring 408 is in contact with both the housing 405 and the free piston 407. The term "moving" is defined that at least an upstream end position (an upper end position in FIG. 16) of the O-ring 408 in the moving direction of the free piston is moved.

Further, a region where the O-ring 408 is compressed between the curved surface part 417 of the housing 405 and the curved surface part 436 of the free piston 407 is a moving direction deformation region where the O-ring 408 undergoes elastic deformation in the moving direction of the free piston 407 on the downstream side end within the moving region of the free piston 407. The term "elastic deformation in the moving direction deformation region" is defined as deformation when a downstream end position (a lower end position in FIG. 16) of the O-ring 408 in the moving direction of the free piston is moved but an upstream end position is not changed. In this embodiment, the rolling region and the moving region are partially overlapped on the moving direction deformation region.

In the following expansion stroke, the curved surface part 417 of the housing 405 on the side of the upper chamber 12 and the curved surface part 436 of the free piston 407 on the side of the lower chamber 13 release the compression of the O-ring 408. Then, the curved surface part 417 of the housing 405 on the side of the lower chamber 13 and the curved surface part 436 of the free piston 407 on the side of the upper chamber 12 roll the O-ring 408, and at the same time, further release the compression of the O-ring 408. Then, the large-diameter cylindrical surface part 418 of the housing 405 and the small-diameter cylindrical surface part 437 of the free piston 407 mutually roll the O-ring 408, and move the O-ring 408 toward the lower chamber 13 relative to the housing 405. At this time, in the case of the O-ring 409, the large-diameter cylindrical surface part 423 of the housing 405 and the small-diameter cylindrical surface part 433 of the free piston 407 mutually roll the O-ring 409, and move the O-ring 409 toward the lower chamber 13 relative to the housing 405. Thus, when the free piston 407 passes through its neutral position, the O-rings 408 and 409 operate in the same way as described above.

Thereby, the O-rings 408 and 409 are compressive deformed in the moving direction in the moving direction deformation region.

Here, the characteristic of a load over the displacement of the free piston 407 caused by the O-rings 408 and 409 formed of a rubber material has a nonlinear characteristic. That is, the load characteristic approaches a linear characteristic within a predetermined range in front of and behind the neutral position of the free piston 407. When beyond the predetermined range, an increasing rate of the load smoothly increases with respect to the displacement. As described above, since the amplitude of the piston 11 is also small in the region where the operating frequency of the piston 11 is high, the displacement of the free piston 407 also becomes small, and the free piston 407 operates within the linear characteristic range in front of and behind its neutral position. Thereby, the free piston 407 moves easily, and vibrates in resonance with the vibration of the piston 11 to contribute to reduction of the generated damping force of the damping force generation mechanisms 32a and 32b.

On the other hand, since the amplitude of the piston 11 increases in the region where the operating frequency of the piston 11 is low, the displacement of the free piston 407 increases, and the free piston 407 operates within a non-linear characteristic range. Thereby, it is difficult for the free piston 407 to move in a gradual and smooth manner, and it is difficult to reduce the generated damping force of the damping force generation mechanisms 32a and 32b.

According to the eleventh embodiment described above, the passage holes 438 are provided to guide the working fluid into the chamber 444 between the O-ring 408 and the O-ring 409. As such, in the process of assembling the shock absorber, it is possible to extract air from the chamber 444 and then to fill the chamber 444 with the working fluid. Thereby, it is possible to easily change the damping force in response to the frequency as described above. That is, when the air is not extracted from the chamber 444, the air is compressed when the free piston 407 operates, and an internal pressure of the chamber 444 is raised. Thus, there is a possibility of increasing a straining force of the O-rings 408 and 409, thereby the operation of the free piston 407 could be impeded. However, in this embodiment, the passage holes 438 are provided, thereby making it possible to prevent the operation of the free piston 407 from being impeded.

Further, the passage holes 438 are formed in the free piston 407 at positions which are in contact with neither one O-ring 408 nor the other O-ring 409. As such, it is possible to prevent the durability of the O-rings 408 and 409 from being reduced by the contact of the passage holes 438 with the O-rings 408 and 409. Accordingly, the durability of the O-rings 408 and 409 is expected to increase.

According to the embodiments described above, the shock absorber includes: a cylinder in which a working fluid is enclosed; a piston that is slidably fitted into the cylinder and partitions an interior of the cylinder into two chambers; a piston rod that is connected to the piston and extends to an exterior of the cylinder; first and second passages to which the working fluid flows out from one of the chambers of the interior of the cylinder by movement of the piston; a damping force generation mechanism that is installed in the first passage and generates a damping force; a housing in which a flow passage of at least a part of the second passage is formed; a free piston that is movably installed in the housing and partitions the second passage into an upstream side and a downstream side; and one or more elastic bodies that are disposed between the free piston and the housing. The shock absorber is constructed so that at least one of a free piston contact surface of the free piston with which the elastic body is in contact and a housing contact surface of the housing with which the elastic body is in contact includes an inclined surface that is inclined to a moving direction of the free piston, and a shortest distance between a portion that is in contact with the elastic body within the free piston contact surface and a portion that is in contact with the elastic body within the housing contact surface is changed by movement of the free piston. As such, when the damping force is changed in response to the operating frequency of the piston, it is possible to smoothly change the damping force.

Further, the inclined surface of at least one of the free piston contact surface and the housing contact surface has a curved surface. As such, it is possible to change the damping force more smoothly.

Further, the elastic body has a circular cross section, and the radius of curvature of the curved surface of the inclined surface is greater than a cross-sectional radius of the elastic body. As such, it is possible to change the damping force more smoothly.

The inclined surface of at least one of the free piston contact surface and the housing contact surface is adapted so that, when the shortest distance between the free piston contact surface and the housing contact surface becomes small, an inclined angle increases. As such, it is possible to change the damping force more smoothly.

The free piston contact surface and the housing contact surface have a portion that is opposite to the moving direction of the free piston. As such, it is possible to compress the elastic body adequately.

The elastic body includes one elastic body that undergoes compressive deformation when the free piston moves in one direction, and the other elastic body that undergoes compressive deformation when the free piston moves in the other direction. As such, in both the expansion stroke and the contraction stroke, it is possible to smoothly change the damping force.

A flange part where inner and outer circumferences serve as the inclined surface is provided on one end of the free piston. An extension part that extends into a cylinder part of the free piston is provided at a part of the housing. The one elastic body is disposed to come into contact with an inner circumferential surface of the flange part and the extension part, and the other elastic body is disposed to come into contact with an outer circumferential surface of the flange part and an inner circumferential surface of the housing. As such, assembly efficiency of each component becomes good.

A free-piston-side annular protrusion is formed on the outer circumference of the free piston. Axially opposite surfaces of the free-piston side annular protrusion constitute the free piston contact surface. Housing-side annular protrusions constituting the housing contact surface are provided on the opposite sides of the annular protrusion of the inner circumference of the housing. The elastic bodies are disposed between the free-piston-side annular protrusion and one of the housing-side annular protrusion and between the free-piston-side annular protrusion and the other housing-side annular protrusion, respectively. As such it is possible to make the elastic bodies in common.

The elastic bodies undergo compressive deformation due to bidirectional movement of the free piston. As such, it is possible to cope with the bidirectional movement of the free piston by means of one elastic body.

The elastic body is provided as an O-ring, and is disposed to seal between the housing and the free piston. As such, it is possible to reduce the number of components.

The elastic body is fixed to the housing or the free piston. As such, the number of components is reduced, and the management of components is made easy.

The elastic body is rolled between the free piston and the housing. As such it is possible to change the damping force more smoothly.

The free piston includes a moving direction deformation region where the elastic body undergoes elastic deformation in the moving direction of the free piston on a downstream side end within the moving region of the free piston, and a rolling region where the elastic body is rolled at a position separated from the downstream side end. As such, it is possible to change the damping force more smoothly.

The rolling region is partially overlapped on the moving direction deformation region. As such, it is possible to change the damping force more smoothly.

Shapes of the free piston contact surface and the housing contact surface are set so that the direction of a segment representing the shortest distance between the free piston contact surface and the housing contact surface changes. As such, it is possible to change the damping force more smoothly.

The shock absorber includes: a cylinder in which a working fluid is enclosed; a piston that is slidably fitted into the cylinder and partitions an interior of the cylinder into two chambers; a piston rod that is connected to the piston and extends to an exterior of the cylinder; first and second passages to which the working fluid flows out from one of the chambers of the interior of the cylinder by movement of the piston; a damping force generation mechanism that is installed in the first passage and generates a damping force; a housing in which a flow passage of at least a part of the second passage is formed; a free piston that is movably installed in the housing and partitions the second passage into an upstream side and a downstream side; and one or more elastic bodies that are disposed between the free piston and the housing. In the shock absorber, the free piston includes a moving direction deformation region where the elastic body undergoes elastic deformation in a moving direction of the free piston on a downstream side end within a moving region of the free piston, and a moving region where the elastic body moves in the moving direction of the free piston in the state where the elastic body is in contact with both the housing and the free piston at a position separated from the downstream side end. As such, it is possible to change the damping force more smoothly.

The moving region is partially overlapped on the moving direction deformation region. As such, it is possible to change the damping force more smoothly.

The elastic body is provided in plural number. One of the elastic bodies is at least compressive deformed in the moving direction in the moving direction deformation region, and the other elastic body at least moves in the moving direction of the free piston in the moving region. As such, it is possible to change the damping force more smoothly according to the moving direction of the free piston.

The first passage and the second passage are formed in the piston. As such, it is possible to simplify the construction.

An orifice is provided on at least one of the upstream side and the downstream side of the second passage. As such it is possible to change the damping force more smoothly.

The shock absorber includes: a cylinder in which a working fluid is enclosed; a piston that is slidably fitted into the cylinder and partitions an interior of the cylinder into two chambers; a piston rod that is connected to the piston and extends to an exterior of the cylinder; first and second passages to which the working fluid flows out from one of the chambers of the interior of the cylinder by movement of the piston; a damping valve that is installed in the first passage and regulates a flow of the working fluid, which is generated by sliding of the piston, to generate a damping force; and a free piston that is movably installed in the second passage and partitions the second passage into an upstream side and a downstream side. A passage area varying mechanism that makes a passage area of the second passage adjustable is installed in the second passage. Thereby, a damping force characteristic can be controlled with higher precision.

Further, the second passage is formed in the piston rod. The passage area varying mechanism is made up of an opening area varying member disposed in the piston rod, and an actuator rotating or linearly moving the opening area varying member. Thereby, the passage area of the second passage can be adjusted by a simple and compact structure.

Further, a resistance element generating resistance to displacement of the free piston is provided. As such, when the damping force is changed in response to the operating frequency of the free piston, it is possible to smoothly change the damping force.

Further, since the resistance element is a spring, it is possible to improve durability.

Each of the aforementioned embodiments has shown an example where the present invention is used in a mono-tube type hydraulic shock absorber, but is not limited thereto. The present invention may be used in a double-tube type hydraulic shock absorber in which an outer barrel is installed on the outer circumference of a cylinder, and a reservoir is installed between the outer barrel and the cylinder, and may be used in all shock absorbers. Further, in the case of the double-tube type hydraulic shock absorber, a bottom valve communicating between a lower chamber and the reservoir is installed on the bottom of the cylinder, and the aforementioned housing is installed on the bottom valve. Thereby, the present invention can be applied to the bottom valve. Further, when an oil passage communicating with the cylinder is installed on an exterior of the cylinder, and a damping force generation mechanism is installed in the oil passage, the aforementioned housing is installed on the exterior of the cylinder. Further, while the embodiments have shown a hydraulic shock absorber by way of example, water or air may be used as a fluid.

Thus, in each embodiment, one or two O-rings have been shown by way of example. However, if necessary, three or more O-rings may be used on the basis of the same technical idea. Further, while each embodiment has shown an example where a ring formed of rubber (resin) is used as an elastic body, a plurality of balls formed of rubber may be provided at predetermined intervals in a circumferential direction. Further, the elastic body that can be used in the present invention may not be formed of rubber as long as it has elasticity in a plurality of axial directions rather than one axial direction.

Further, in the seventh embodiment, the passage area varying mechanism is constructed to have the orifices having four different diameters, and vary the passage area in four steps. However, as disclosed in Japanese Unexamined Patent Application, First Publication No. H07-077233, a wedge type orifice whose diameter increases toward one side may be used. With this construction, since the passage area is gradually changed, it is possible to change the damping force more smoothly.

While exemplary embodiments of the invention have been described and illustrated above, it should be understood that the invention is not limited to these embodiments. Additions, omissions, substitutions, and other modifications can be made without, departing from the spirit or scope of the present invention. Accordingly, the invention is not to be considered as being limited by the foregoing description, and is only limited by the scope of the appended claims.

What is claimed is:

1. A shock absorber comprising:
a cylinder in which a working fluid is enclosed;
a piston slidably fitted into the cylinder and configured to partition an interior of the cylinder into two chambers;
a piston rod connected to the piston and configured to extend to an exterior of the cylinder;
first and second passages to which the working fluid flows out from one of the chambers of the interior of the cylinder by movement of the piston;
a damping force generation mechanism installed in the first passage and configured to generate a damping force;
a housing in which a flow passage corresponding to at least a part of the second passage is formed;
a free piston movably installed in the housing and configured to partition the second passage into an upstream side and a downstream side; and
an elastic body disposed between the free piston and the housing,
wherein at least one of a free piston contact surface of the free piston with which the elastic body is in contact and a housing contact surface of the housing with which the elastic body is in contact includes an inclined surface that is inclined to a moving direction of the free piston,
a shortest distance between a portion of the free piston contact surface that is in contact with the elastic body and a portion of the housing contact surface that is in contact with the elastic body is changed by movement of the free piston, and
the free piston contact surface and the housing contact surface have a shape set to change a direction of a segment representing the shortest distance between the portion of the free piston contact surface that is in contact with the elastic body and the portion of the housing contact surface that is in contact with the elastic body.

2. The shock absorber according to claim 1, wherein the inclined surface of at least one of the free piston contact surface and the housing contact surface has a curved surface.

3. The shock absorber according to claim 2, wherein the elastic body has a circular cross section, and the curved surface of the inclined surface has a radius of curvature greater than a cross-sectional radius of the elastic body.

4. The shock absorber according to claim 1, wherein the inclined surface of at least one of the free piston contact surface and the housing contact surface is adapted so that, when a shortest distance between a portion that is in contact with the elastic body within the free piston contact surface and a portion that is in contact with the elastic body within the housing contact surface becomes small, an inclined angle increases.

5. The shock absorber according to claim 1, wherein the free piston contact surface and the housing contact surface have a portion opposite to the moving direction of the free piston.

6. The shock absorber according to claim 1, wherein the elastic bodies include one elastic body that undergoes compressive deformation when the free piston moves in one direction, and another elastic body that undergoes compressive deformation when the free piston moves in the other direction.

7. The shock absorber according to claim 6, wherein the free piston includes a flange part whose inner and outer circumferences serve as the inclined surface on one end thereof, the housing includes an extension part that extends into a cylinder part of the free piston at a part thereof, the one elastic body is disposed to come into contact with an inner circumferential surface of the flange part and the extension part, and the other elastic body is disposed to come into contact with an outer circumferential surface of the flange part and an inner circumferential surface of the housing.

8. The shock absorber according to claim 6, wherein the free piston includes a free-piston-side annular protrusion formed on an outer circumference thereof, the free-piston-side annular protrusion has axially opposite surfaces constituting the free piston contact surface, the housing includes housing-side annular protrusions constituting the housing contact surface on an inner circumference thereof on opposite sides of the free-piston-side annular protrusion, and the elastic bodies are disposed between the free-piston-side annular protrusion and each of the housing-side annular protrusions, respectively.

9. The shock absorber according to claim 1, wherein the elastic body undergoes compressive deformation due to bidirectional movement of the free piston.

10. The shock absorber according to claim 1, wherein the elastic body includes an 0-ring, and is disposed to seal between the housing and the free piston.

11. The shock absorber according to claim 1, wherein the elastic body is rolled between the free piston and the housing.

12. The shock absorber according to claim 11, wherein the free piston includes a moving direction deformation region where the elastic body undergoes elastic deformation in the moving direction of the free piston on a downstream side end within a moving region of the free piston, and a rolling region where the elastic body is rolled at a position separated from the downstream side end.

13. The shock absorber according to claim 12, wherein the rolling region is partially overlapped on the moving direction deformation region.

14. The shock absorber according to claim 1, wherein the first and second passages are installed in the piston.

15. The shock absorber according to claim 1, wherein at least one of the upstream side and the downstream side of the second passage includes an orifice.

16. The shock absorber according to claim 1, further comprising a passage area varying mechanism installed in the second passage and configured to make a passage area of the second passage adjustable.

17. A shock absorber according to claim 1, further comprising:
- a damping valve installed in the first passage and configured to regulate a flow of the working fluid, which is generated by sliding of the piston, to generate a damping force; and
- wherein a passage area varying mechanism that makes a passage area of the second passage adjustable is installed in the second passage.

18. The shock absorber according to claim 17, wherein the second passage is formed in the piston rod, and
the passage area varying mechanism includes an opening area varying member disposed in the piston rod, and an actuator configured to rotate or linearly move the opening area varying member.

* * * * *